(12) United States Patent
Chen et al.

(10) Patent No.: US 12,154,373 B2
(45) Date of Patent: Nov. 26, 2024

(54) FACIAL RECOGNITION METHOD AND ELECTRONIC DEVICE

(71) Applicant: Honor Device Co., Ltd., Guangdong (CN)

(72) Inventors: Guoqiao Chen, Shenzhen (CN); Jiangfeng Yuan, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 877 days.

(21) Appl. No.: 17/289,666

(22) PCT Filed: Oct. 22, 2019

(86) PCT No.: PCT/CN2019/112406
§ 371 (c)(1),
(2) Date: Apr. 28, 2021

(87) PCT Pub. No.: WO2020/088296
PCT Pub. Date: May 7, 2020

(65) Prior Publication Data
US 2021/0406350 A1 Dec. 30, 2021

(30) Foreign Application Priority Data
Oct. 30, 2018 (CN) .......................... 201811281139.2

(51) Int. Cl.
*G06V 40/16* (2022.01)
*G06T 7/521* (2017.01)
*H04N 23/45* (2023.01)

(52) U.S. Cl.
CPC ............ *G06V 40/161* (2022.01); *G06T 7/521* (2017.01); *G06V 40/172* (2022.01); *H04N 23/45* (2023.01);

(Continued)

(58) Field of Classification Search
CPC .... G06V 40/161; G06V 40/172; G06T 7/521; G06T 2207/10024; G06T 2207/10028; G06T 2207/10048; H04N 23/45
See application file for complete search history.

(56) References Cited

U.S. PATENT DOCUMENTS 11,503,228 B2 * 11/2022 Zhang ................. G06V 20/64
2008/0088944 A1 * 4/2008 Watanabe ...... G02B 15/144113
359/687

(Continued)

FOREIGN PATENT DOCUMENTS

CN 201159818 Y 12/2008
CN 101216881 B 7/2011

(Continued)

OTHER PUBLICATIONS

Bader, How to enable iris scanning and face unlock on the Galaxy S8, May 23, 2017 (Year: 2017).*

(Continued)

*Primary Examiner* — Barbara D Reinier
(74) *Attorney, Agent, or Firm* — Conley Rose, P.C.

(57) ABSTRACT

A facial recognition method includes receiving, by an electronic device, a first instruction triggering the electronic device to perform facial recognition, emitting in response to the first instruction, infrared light with a light spot using an infrared projector, collecting first image information of a first object using a first camera, collecting second image information of the first object using a second camera, calculating depth information of the first object based on the first image information, the second image information, the first length, a lens focal length of the first camera, and a lens focal length of the second camera, and performing user identity verification on the first object using the first image information and the depth information of the first object.

20 Claims, 35 Drawing Sheets

(52) U.S. Cl.
CPC ............... *G06T 2207/10024* (2013.01); *G06T 2207/10028* (2013.01); *G06T 2207/10048* (2013.01)

(56) References Cited

U.S. PATENT DOCUMENTS

| | | | |
|---|---|---|---|
| 2013/0279588 A1 | 10/2013 | Wu et al. | |
| 2020/0151425 A1* | 5/2020 | Zhou | H04N 5/33 |
| 2020/0293754 A1 | 9/2020 | Huang et al. | |
| 2021/0304428 A1* | 9/2021 | Cao | H04N 13/257 |
| 2021/0406350 A1 | 12/2021 | Chen et al. | |
| 2022/0020165 A1* | 1/2022 | Chen | G06T 7/593 |

FOREIGN PATENT DOCUMENTS

| | | | | | |
|---|---|---|---|---|---|
| CN | 103400108 | A | 11/2013 | | |
| CN | 104394306 | A | 3/2015 | | |
| CN | 105513221 | B | 4/2016 | | |
| CN | 103345301 | B | 8/2016 | | |
| CN | 205490848 | U | 8/2016 | | |
| CN | 106067947 | A | 11/2016 | | |
| CN | 106407914 | A | 2/2017 | | |
| CN | 106444222 | A | 2/2017 | | |
| CN | 106454053 | A | 2/2017 | | |
| CN | 108052878 | A | 5/2018 | | |
| CN | 108089321 | A | 5/2018 | | |
| CN | 108107662 | A | 6/2018 | | |
| CN | 108108704 | A | 6/2018 | | |
| CN | 108195305 | A | 6/2018 | | |
| CN | 207530934 | U | 6/2018 | | |
| CN | 108388071 | A | 8/2018 | | |
| CN | 108419017 | A | 8/2018 | | |
| CN | 108490634 | A | 9/2018 | | |
| CN | 108513661 | A | 9/2018 | | |
| CN | 108521821 | A | 9/2018 | | |
| CN | 108563936 | A | 9/2018 | | |
| CN | 108564041 | A | * | 9/2018 | ......... G06K 9/00201 |
| CN | 108595928 | A | 9/2018 | | |
| CN | 109544618 | A | 3/2019 | | |
| CN | 109635539 | A | 4/2019 | | |
| JP | 2013250856 | A | 12/2013 | | |
| WO | 9828593 | A1 | 7/1998 | | |

OTHER PUBLICATIONS

Zheng, H., et al., "Embedded DSP Application System Design and Example Analysis—Based on TMS320C/DM64X platform," Beijing University of Aeronautics and Astronautics Press, Jan. 31, 2021, 16 pages. With English Translation.

* cited by examiner

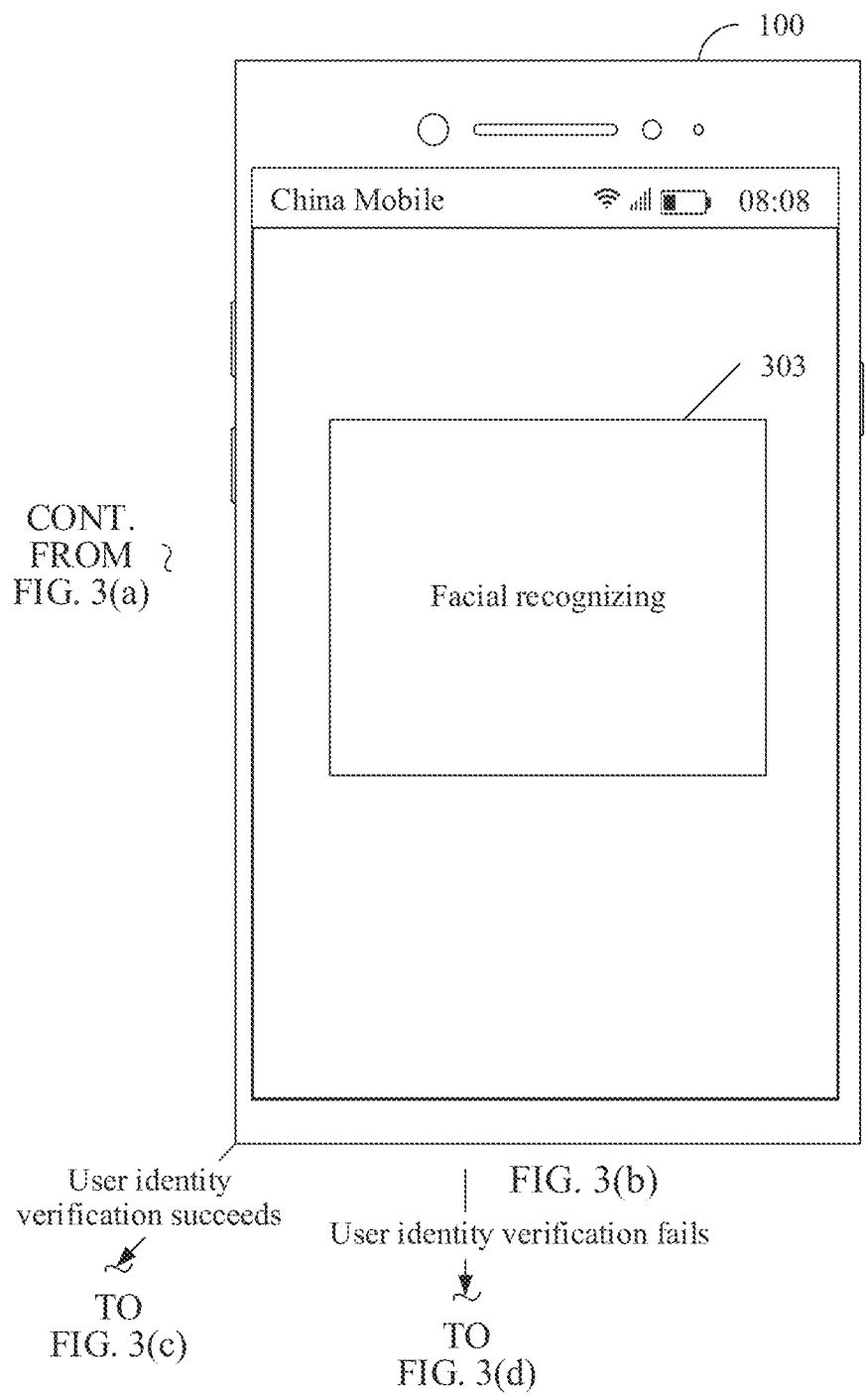

702

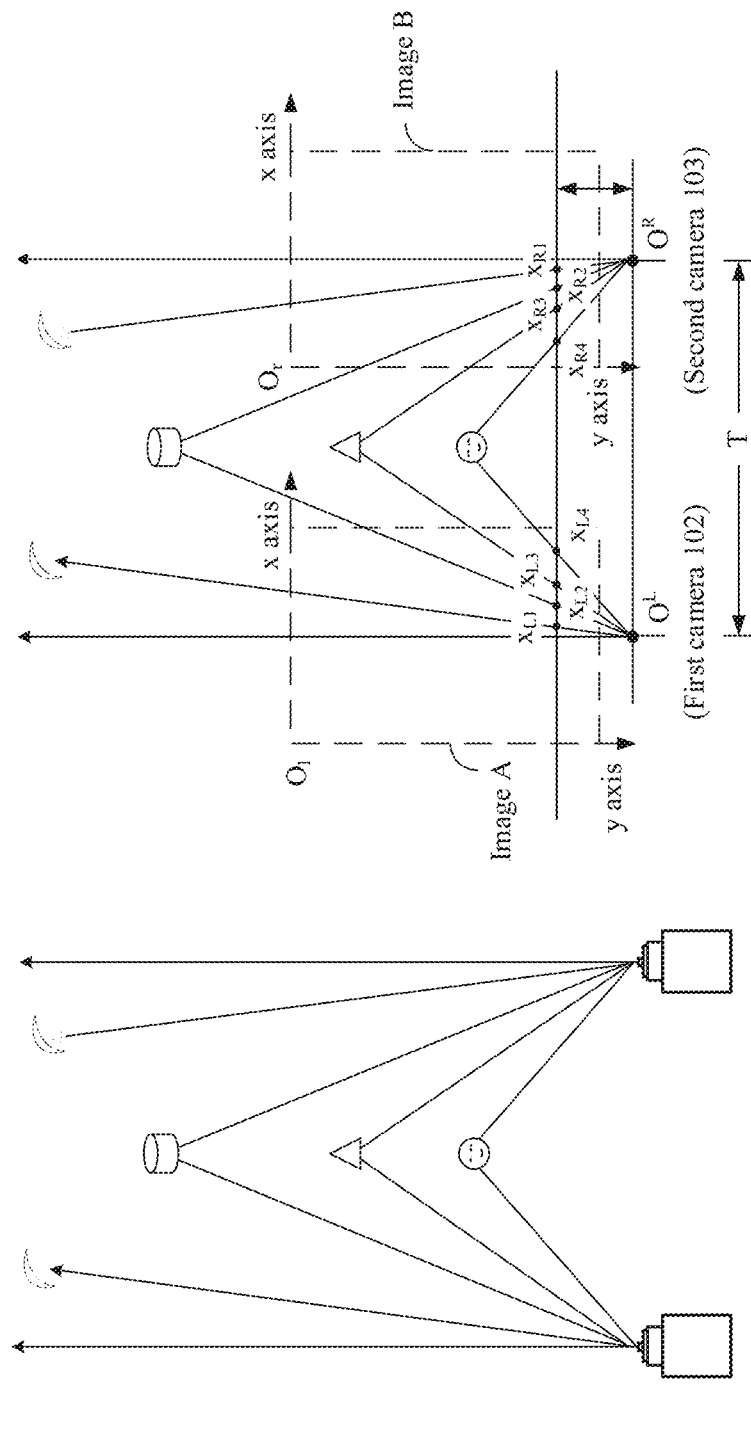

CONT. FROM FIG. 17(a)

TO FIG. 17(c)

FACIAL RECOGNITION METHOD AND ELECTRONIC DEVICE

CROSS-REFERENCE TO RELATED APPLICATIONS

This application is a U.S. National Stage of International Patent Application No. PCT/CN2019/112406 filed on Oct. 22, 2019, which claims priority to Chinese Patent Application No. 201811281139.2 filed on Oct. 30, 2018. Both of the aforementioned applications are hereby incorporated by reference in their entireties.

TECHNICAL FIELD

Embodiments of this application relate to the field of image processing technologies, and in particular, to a facial recognition method and an electronic device.

BACKGROUND

With development of electronic technologies, functions of an electronic device become increasingly diversified. For example, the electronic device may have functions such as facial recognition and augmented reality (augmented reality, AR). The facial recognition may be applied to a face-based unlocking scenario, a face-based payment scenario, and the like.

In the face-based unlocking scenario and the face-based payment scenario, the electronic device may perform user identity verification through facial recognition. Specifically, the electronic device may collect a two-dimensional image of a current object (for example, a face), and compare the two-dimensional image of the current object with a two-dimensional image that is prestored in the electronic device and that is used to perform user identity verification (prestored two-dimensional image for short). If the two-dimensional image of the current object matches the prestored two-dimensional image, the user identity verification succeeds. If the two-dimensional image of the current object does not match the prestored two-dimensional image, the user identity verification may fail.

A photo of an object (for example, a face) may also include a feature in a two-dimensional image of the object. If user identity verification is performed on the electronic device using the photo, including a feature in the prestored two-dimensional image, the user identity verification may succeed. In this case, the electronic device may be successfully unlocked or complete payment, which may cause leakage of information stored in the electronic device or a property loss of a user. Consequently, facial recognition performed by the electronic device has relatively low security.

SUMMARY

Embodiments of this application provide a facial recognition method and an electronic device, to ensure information security of the electronic device and improve security performance of the electronic device.

According to a first aspect, an embodiment of this application provides a facial recognition method. The method may be applied to an electronic device, the electronic device includes an infrared projector, a first camera, and a second camera, and a distance between the first camera and the second camera is a first length. The method may include: The electronic device receives a first instruction that is used to trigger the electronic device to perform facial recognition on a first object; in response to the first instruction, emits infrared light with a light spot by using the infrared projector, collects first image information of the first object by using the first camera, and collects second image information of the first object by using the second camera; calculates depth information of the first object based on the first image information, the second image information, the first length, a lens focal length of the first camera, and a lens focal length of the second camera; and performs user identity verification on the first object by using the first image information and the depth information of the first object.

When performing the user identity verification through facial recognition, the electronic device not only uses a two-dimensional image of a photographed object (for example, a face), but also uses depth information of the photographed object. Specifically, the electronic device may compare the two-dimensional image of the photographed object with a two-dimensional face image prestored in the electronic device, and determine whether the depth information of the photographed object has a depth feature of a real face. When the two-dimensional image of the photographed object matches the prestored two-dimensional face image, and the depth information of the photographed object has the depth feature of the real face, the electronic device can determine that user identity verification on the photographed object succeeds.

In other words, the facial recognition performed by the electronic device may include two-dimensional image authentication and depth anti-counterfeiting authentication. Depth information of a photo does not have the depth feature of the real face. Therefore, according to the method in this embodiment of this application, user identity verification performed by the electronic device on the photo fails, so that information in the electronic device can be prevented from being leaked, or a property loss caused to the user can be avoided, thereby ensuring information security of the electronic device, and improving security performance of the electronic device.

Further, a larger quantity of features and a more prominent feature in the image information collected by the first camera and the image information collected by the second camera indicate a larger quantity of same features recognized by the electronic device in the first image information and the second image information. A larger quantity of same features recognized by the electronic device indicates that the electronic device can calculate depths of more points at which features are located. Because the depth information of the first object includes depths of a plurality of points of the first object, a larger quantity of depths of points calculated by the electronic device indicates more accurate depth information of the first object.

In this embodiment, the first image information and the second image information each include a feature of the first object and a texture feature formed when the infrared light with the light spot is irradiated onto the first object. In other words, the first image information and the second image information not only include the feature of the first object, but also include the texture feature formed when the infrared light with the light spot is irradiated onto the first object.

After a quantity of features in images of the first object that are collected by the first camera and the second camera is increased, the electronic device can more accurately recognize a same feature in the image information collected by the first camera and the image information collected by the second camera. The electronic device can further determine parallax between the first camera and the second camera for the same feature and calculate a depth of each point, to obtain the depth information of the first object. This can improve accuracy of the depth information of the first object that is calculated by the electronic device.

With reference to the first aspect, in a possible design manner, the method for performing, by the electronic device, user identity verification on the first object by using the first image information and the depth information of the first object may include: The electronic device compares the first image information with an original image, where the original image is a two-dimensional image that is stored in the electronic device, and that is used to perform the user identity verification. The electronic device determines whether the depth information of the first object has the depth feature of the real face. If the first image information matches the original image, and the depth information of the first object has the depth feature of the real face, the electronic device determines that the user identity verification succeeds. Alternatively, if the first image information does not match the original image, or the depth information of the first object does not have the depth feature of the real face, the electronic device determines that the user identity verification fails.

If the first image information does not match the original image, it indicates that the first image information does not include a two-dimensional image of a second object. In this case, the electronic device may determine that the user identity verification fails. If the depth information of the first object does not have the depth feature of the real face, it indicates that the first object photographed by the electronic device is not a real face. The first object may be a photo, including a two-dimensional face image. In this case, the electronic device may determine that the user identity verification fails. If the depth information of the first object has the depth feature of the real face, it indicates that the first object photographed by the electronic device is a real face, instead of a photo including a two-dimensional face image. In addition, if the first image information matches the original image, it indicates that the first image information includes a two-dimensional image of an object (namely, the second object) to which the original image corresponds when the electronic device records the original image, and the electronic device may determine that the user identity verification succeeds.

With reference to the first aspect, in another possible design manner, the first object may be a head model of the second object. The second object is an object photographed by the electronic device when the electronic device records the two-dimensional image (the original image) used to perform the facial recognition. Depth information of the head model of the second object is highly similar to depth information of the second object (for example, the real face). Therefore, through the two-dimensional image authentication and the depth anti-counterfeiting authentication, the electronic device may not recognize that the first object is not a real face. In this case, the method for performing, by the electronic device, user identity verification on the first object by using the first image information and the depth information of the first object may include: The electronic device compares the first image information with the original image. The electronic device determines whether the depth information of the first object has the depth feature of the real face. The electronic device determines whether the feature in the first image information matches a feature of the real face in infrared light. If the first image information matches the original image, the depth information of the first object has the depth feature of the real face, and the feature in the first image information matches the feature of the real face in infrared light, the electronic device determines that the user identity verification succeeds. Alternatively, if the first image information does not match the original image, the depth information of the first object does not have the depth feature of the real face, or the feature in the first image information does not match the feature of the real face in infrared light, the electronic device determines that the user identity verification fails. That is, the facial recognition performed by the electronic device may not only include the two-dimensional image authentication and the depth anti-counterfeiting authentication, but also include infrared anti-counterfeiting authentication. A principle of the infrared anti-counterfeiting authentication is as follows: There is a great difference between images of the head model and the real face in infrared light. In this embodiment of this application, the infrared anti-counterfeiting authentication may be performed on the first image information based on this feature.

In this embodiment of this application, the electronic device may perform the user identity verification through triple recognition: the two-dimensional image recognition, the depth anti-counterfeiting authentication, and the infrared anti-counterfeiting authentication. According to the method in this embodiment of this application, user identity verification performed by the electronic device on the photo and the head model fails, so that information in the electronic device can be prevented from being leaked, or a property loss caused to the user can be avoided, thereby ensuring information security of the electronic device, and improving security performance of the electronic device.

With reference to the first aspect, in another possible design manner, the electronic device further includes a third camera, the third camera is a red-green-blue (red green blue, RGB) camera, and the third camera is configured to collect an image in visible light. Before the electronic device receives the first instruction of the user, the method in this embodiment of this application further includes: In response to a second instruction of the user, the electronic device displays a first interface, where the first interface is used to record the two-dimensional image used to perform the user identity verification, emits the infrared light with the light spot by using the infrared projector, collects an RGB image of the second object by using the third camera, and collects third image information of the second object by using the first camera, where the third image information includes a feature of the second object and a texture feature formed when the infrared light with the light spot is irradiated onto the second object. The electronic device displays the RGB image in the first interface. The electronic device stores the third image information, where the third image information is the original image used to perform the user identity verification.

The third camera is configured to collect image information in visible light. Therefore, the electronic device displays, on a display, the image information collected by the third camera. This avoids a problem that the image information displayed on the display of the electronic device is slightly red, and ensures visual experience of the user.

With reference to the first aspect, in another possible design manner, the method in this embodiment of this application may further include: In response to the second instruction, the electronic device collects fourth image information of the second object by using the second camera, where the fourth image information includes the feature of the second object and a texture feature formed when the infrared light with the light spot is irradiated onto the second object. The electronic device calculates depth information of the second object based on the third image information, the fourth image information, the first length, the lens focal length of the first camera, and the lens focal length of the second camera. The electronic device determines whether the depth information of the second object has the depth feature of the real face. If the depth information of the second object has the depth feature of the real face, the electronic device stores the third image information.

When recording the two-dimensional face image used to perform the user identity verification, the electronic device may perform depth anti-counterfeiting authentication on the two-dimensional face image. In this way, a possibility that the two-dimensional face image that is stored in the electronic device and that is used to perform the user identity verification is the two-dimensional face image in the photo can be reduced, thereby ensuring information security of the electronic device, and improving security performance of the electronic device.

With reference to the first aspect, in another possible design manner, if the depth information of the second object does not have the depth feature of the real face, the electronic device sends first prompt information. The first prompt information is used to indicate that the image recorded by the electronic device is unavailable.

With reference to the first aspect, in another possible design manner, before the electronic device stores the third image information, the method in this embodiment of this application may further include: The electronic device determines whether the feature in the third image information matches the feature of the real face in infrared light. If the depth information of the second object has the depth feature of the real face, and the feature in the third image information matches the feature of the real face in infrared light, the electronic device stores the third image information.

If the depth information of the second object does not have the depth feature of the real face, or the feature in the third image information does not match the feature of the real face in infrared light, the electronic device sends the first prompt information, where the first prompt information is used to indicate that the image recorded by the electronic device is unavailable.

When recording the two-dimensional face image used to perform the user identity verification, the electronic device may perform infrared anti-counterfeiting authentication on the two-dimensional face image. In this way, a possibility that the two-dimensional face image that is stored in the electronic device and that is used to perform the user identity verification is a two-dimensional face image of the head model can be reduced, thereby ensuring information security of the electronic device, and improving security performance of the electronic device.

With reference to the first aspect, in another possible design manner, to improve security performance of the electronic device and protect the original image from being stolen, the electronic device may store the third image information in a trusted execution environment (trust execution environment, TEE) of the electronic device.

With reference to the first aspect, in another possible design manner, the electronic device may perform the user identity verification on the first object by using the first image information and the depth information of the first object in the TEE of the electronic device.

With reference to the first aspect, in a possible design manner, the lens focal length of the first camera is the same as that of the second camera.

With reference to the first aspect, in another possible design manner, a method for calculating, by the electronic device, depth information of the first object based on the first image information, the second image information, the first length, a lens focal length of the first camera, and a lens focal length of the second camera may include: The electronic device calculates parallax between the first camera and the second camera for a plurality of first features in the first image information and the second image information, where the first features are same features in the first image information and the second image information. For each first feature, the electronic device calculates a depth Z of a point at which the first feature is located according to the following formula (2) based on parallax between the first camera and the second camera for the first feature, the first length, and the lens focal length, to obtain the depth information of the first object:

$$Z = \frac{f \times T}{d} \qquad \text{formula (2)}$$

where f is the lens focal length, d is the parallax between the first camera and the second camera for the first feature, and T is the first length.

It can be understood that distances between features (for example, a nasal tip and an eye of a person) of the first object and a camera may be different. A distance between each feature of the first object and the camera is referred to as a depth of the feature (or a point at which the feature is located). Depths of points of the first object form the depth information of the first object. The depth information of the first object may represent a three-dimensional feature of the first object.

With reference to the first aspect, in another possible design manner, the plurality of first features are some of same features in the first image information and the second image information. The electronic device 100 may select a plurality of first features from the first image information based on preset feature frequency, then search the second image information for features that are the same as the plurality of first features, and finally calculate a depth of each first feature, to obtain the depth information of the first object. Alternatively, the electronic device may select some first features from the first image information randomly or at an interval.

The feature frequency may be a quantity of same first features that appear in a preset area. The feature frequency, reflected on an image, may be a distance (referred to as a feature distance) between two adjacent first features selected by the electronic device. A method for selecting, by the electronic device, the plurality of first features from the first image information based on the preset feature frequency may include: The electronic device selects one first feature from all features in the first image information at an interval of one feature distance. In other words, the electronic device does not need to calculate a depth of a point at which each of same features in the first image information and the second image information is located, but selects one feature at an interval of one feature distance, and calculates a depth of a point at which the selected feature is located.

With reference to the first aspect, in another possible design manner, the infrared light with the light spot includes a plurality of light spots, and the plurality of light spots include a plurality of speckle lattice groups. One speckle lattice group includes one or more speckle lattices, and the speckle lattice includes a plurality of speckles.

With reference to the first aspect, in another possible design manner, at least two of the plurality of speckle lattice groups are different. If at least two of the plurality of speckle lattice groups are different, repetition of speckle lattice groups in the plurality of light spots can be reduced, thereby helping the electronic device recognize different features.

With reference to the first aspect, in another possible design manner, the first speckle lattice group is any one of the plurality of speckle lattice groups, and at least two of a plurality of speckle lattices included in the first speckle lattice group are different. If at least two of the plurality of speckle lattices are different, repetition of speckle lattices in the plurality of light spots can be reduced, thereby helping the electronic device recognize different features.

With reference to the first aspect, in another possible design manner, the first speckle lattice is any one of the plurality of speckle lattices. All of a plurality of speckles in the first speckle lattice have a same shape. If all of the plurality of speckles have the same shape, the electronic device may identify different speckles based on locations of the speckles in the speckle lattice.

At least two of a plurality of speckles in the first speckle lattice have different shapes. If at least two of the plurality of speckles have different shapes, repetition of a plurality of speckles in the speckle lattice can be reduced, thereby helping the electronic device recognize different features.

With reference to the first aspect, in another possible design manner, the electronic device selects a plurality of first features from the first image information and the second image information based on the preset feature frequency. The feature frequency is greater than or equal to repetition frequency of speckle lattices in the plurality of light spots. The feature frequency is represented by a quantity of same first features selected by the electronic device from an image with a preset area, and the repetition frequency is represented by a quantity of same speckle lattices that appear in a preset area.

The feature distance used when the electronic device selects the first feature may be less than or equal to a repetition interval of the speckle lattices in the plurality of light spots. In other words, the feature frequency is greater than or equal to the repetition frequency of the speckle lattices in the plurality of light spots. In this way, it can be ensured as far as possible that two adjacent first features selected by the electronic device from the first image information correspond to speckles in different speckle lattices, so that the electronic device can distinguish between the two adjacent first features. This can reduce a possibility of a feature matching error, and improve accuracy of the depth information calculated by the electronic device.

With reference to the first aspect, in another possible design manner, two sides of each lens of the first camera and the second camera each include an antireflection coating, and light filters of the first camera and the second camera each include a cut-off coating. The antireflection coating is used to increase a transmittance of the infrared light. The cut-off coating is used to filter out light other than the infrared light and the visible light, and increase the transmittance of the infrared light.

A common RGB camera can sense only visible light, and cannot sense infrared light. To reduce hardware costs of the electronic device, an antireflection coating may be plated on each of two sides of each lens of the RGB camera, and a cut-off coating may be plated on (one side or each of two sides of) a light filter of the RGB camera, to obtain a dual-pass camera (namely, the first camera and the second camera) in which each of two sides of each lens includes an antireflection coating and a light filter includes a cut-off coating.

With reference to the first aspect, in another possible design manner, the infrared light is 890 nanometers (nm)-990 nm infrared light. For example, the infrared light may be specifically 940 nm infrared light. Correspondingly, the antireflection coating may be an antireflection coating for the 890 nm-990 nm infrared light, for example, an antireflection coating for the 940 nm infrared light.

With reference to the first aspect, in another possible design manner, the first length ranges from 20 millimeters to 30 millimeters.

According to a second aspect, an embodiment of this application provides an electronic device. The electronic device includes one or more processors, a memory, an infrared projector, a first camera, and a second camera. A distance between the first camera and the second camera is a first length. The memory, the infrared projector, the first camera, and the second camera are coupled to the processor. The memory is configured to store information. The processor is configured to receive a first instruction of a user, where the first instruction is used to trigger the electronic device to perform facial recognition on a first object. The processor is further configured to: in response to the first instruction, emit infrared light with a light spot by using the infrared projector, collect first image information of the first object by using the first camera, and collect second image information of the first object by using the second camera, where the first image information and the second image information each include a feature of the first object and a texture feature formed when the infrared light with the light spot is irradiated onto the first object. The processor is further configured to calculate depth information of the first object based on the first image information, the second image information, the first length, a lens focal length of the first camera, and a lens focal length of the second camera. The processor is further configured to perform user identity verification on the first object by using the first image information and the depth information of the first object.

With reference to the second aspect, in a possible design manner, that the processor is configured to perform user identity verification on the first object by using the first image information and the depth information of the first object includes: The processor is configured to: compare the first image information with an original image, where the original image is a two-dimensional image that is stored in the electronic device and that is used to perform the user identity verification; determine whether the depth information of the first object has a depth feature of a real face; and if the first image information matches the original image, and the depth information of the first object has the depth feature of the real face, determine that the user identity verification succeeds; or if the first image information does not match the original image, or the depth information of the first object does not have the depth feature of the real face, determine that the user identity verification fails.

With reference to the second aspect, in another possible design manner, that the processor is configured to perform user identity verification on the first object by using the first image information and the depth information of the first object includes: The processor is configured to: compare the first image information with an original image, where the original image is a two-dimensional image that is stored in the electronic device and that is used to perform the user identity verification; determine whether the depth information of the first object has a depth feature of a real face; determine whether the feature in the first image information matches a feature of the real face in infrared light; and if the first image information matches the original image, the depth information of the first object has the depth feature of the real face, and the feature in the first image information matches the feature of the real face in infrared light, determine that the user identity verification succeeds; or if the first image information does not match the original image, the depth information of the first object does not have the depth feature of the real face, or the feature in the first image information does not match the feature of the real face in infrared light, determine that the user identity verification fails.

With reference to the second aspect, in another possible design manner, the electronic device further includes a third camera and a display, the third camera is a red-green-blue RGB camera, and the third camera is configured to collect an image in visible light. The display is configured to: before the processor receives the first instruction, display a first interface in response to a second instruction, where the first interface is used to record the two-dimensional image that is used to perform the user identity verification. The processor is further configured to: in response to the second instruction, emit the infrared light with the light spot by using the infrared projector, collect an RGB image of the second object by using the third camera, and collect third image information of the second object by using the first camera, where the third image information includes a feature of the second object and a texture feature formed when the infrared light with the light spot is irradiated onto the second object.

The display is further configured to display the RGB image in the first interface. The memory is further configured to store the third image information, where the third image information is the original image used to perform the user identity verification.

With reference to the second aspect, in another possible design manner, the processor is further configured to; in response to the second instruction, collect fourth image information of the second object by using the second camera, where the fourth image information includes the feature of the second object and a texture feature formed when the infrared light with the light spot is irradiated onto the second object. The processor is further configured to calculate depth information of the second object based on the third image information, the fourth image information, the first length, the lens focal length of the first camera, and the lens focal length of the second camera. The processor is further configured to determine whether the depth information of the second object has the depth feature of the real face. That the memory is configured to store the third image information includes. The memory is configured to: if the depth information of the second object has the depth feature of the real face, store the third image information.

With reference to the second aspect, in another possible design manner, the processor is further configured to: if the depth information of the second object does not have the depth feature of the real face, send first prompt information, where the first prompt information is used to indicate that the image recorded by the electronic device is unavailable.

With reference to the second aspect, in another possible design manner, the processor is further configured to: before the processor stores the third image information, determine whether the feature in the third image information matches the feature of the real face in infrared light. The memory is specifically configured to: if the depth information of the second object has the depth feature of the real face, and the feature in the third image information matches the feature of the real face in infrared light, store the third image information.

With reference to the second aspect, in another possible design manner, the processor is further configured to: if the depth information of the second object does not have the depth feature of the real face, or the feature in the third image information does not match the feature of the real face in infrared light, send the first prompt information, where the first prompt information is used to indicate that the image recorded by the electronic device is unavailable.

With reference to the second aspect, in another possible design manner, the memory is specifically configured to store the third image information in a TEE of the electronic device.

With reference to the second aspect, in another possible design manner, that the processor is further configured to perform user identity verification on the first object by using the first image information and the depth information of the first object includes: The processor is configured to perform the user identity verification on the first object by using the first image information and the depth information of the first object in the TEE of the electronic device.

It should be noted that, in the second aspect and the possible design manners of the second aspect, for a speckle lattice group, a speckle lattice, a plurality of speckles in the speckle lattice, and a wavelength of the infrared light emitted by the infrared projector, reference may be made to related descriptions in the possible design manners of the first aspect. Details are not described herein again.

According to a third aspect, an embodiment of this application provides a dual-pass camera (namely, the first camera or the second camera). The dual-pass camera is configured to receive visible light and infrared light. Two sides of each lens of the dual-pass camera each include an antireflection coating, and a light filter of the dual-pass camera includes a cut-off coating. The antireflection coating is used to increase a transmittance of the infrared light. The cut-off coating is used to filter out light other than the infrared light and the visible light, and increase the transmittance of the infrared light.

With reference to the third aspect, in a possible design manner, the dual-pass camera includes: an RGB camera, an antireflection coating plated on each of two sides of each lens of the RGB camera, and a cut-off coating plated on (one side or each of two sides of) a light filter of the RGB camera.

According to a fourth aspect, an embodiment of this application provides a computer storage medium, including a computer instruction. When the computer instruction is run on an electronic device, the electronic device is enabled to perform the facial recognition method according to the first aspect and the possible design manners of the first aspect.

According to a fifth aspect, an embodiment of this application provides a computer program product. When the computer program product is run on a computer, the computer is enabled to perform the facial recognition method in the first aspect and the possible design manners of the first aspect.

It can be understood that the electronic device in the second aspect and the possible design methods of the second aspect, the computer storage medium in the third aspect, and the computer program product in the fourth aspect are all configured to perform the corresponding methods provided above. Therefore, for beneficial effects that can be achieved by the electronic device, the computer storage medium, and the computer program product, refer to the beneficial effects of the corresponding methods provided above. Details are not described herein again.

BRIEF DESCRIPTION OF DRAWINGS

FIG. 3(a) to FIG. 3(d) are a schematic diagram 1 of an example of graphical user interfaces according to an embodiment of this application;

FIG. 10A-1 and FIG. 10A-2 are a schematic diagram 2 of a principle of calculating depth information according to an embodiment of this application;

DESCRIPTION OF EMBODIMENTS

Figure 1A:
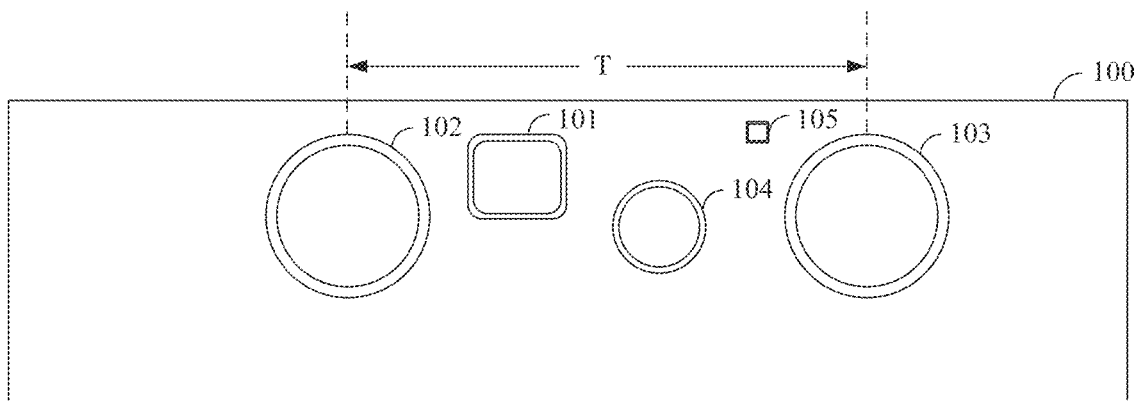
FIG. 1A is a partial schematic diagram of an electronic device according to an embodiment of this application.

The embodiments of this application provide a facial recognition method. The method may be applied to a face-based unlocking scenario, a face-based payment scenario, and the like, or may be applied to another scenario in which facial verification is performed. An electronic device may perform user identity verification through facial recognition in the face-based unlocking scenario, the face-based payment scenario, and the like. Specifically, when performing the user identity verification through the facial recognition, the electronic device not only uses a two-dimensional image of a photographed object (for example, a face), but also uses depth information of the photographed object. Specifically, the electronic device may compare the two-dimensional image of the photographed object with a two-dimensional face image prestored in the electronic device, and determine whether the depth information of the photographed object has a depth feature of a real face. When the two-dimensional image of the photographed object matches the prestored two-dimensional face image, and the depth information of the object has the depth feature of the real face, the electronic device can determine that user identity verification on the photographed object succeeds.

Generally, a face is in a three-dimensional form. When a camera of the electronic device photographs a face, distances between features (for example, a nasal tip and an eye) of the face and the camera are different. A distance between each feature of the face and the camera is referred to as a depth of the feature (or a point at which the feature is located). Depths of points of the face constitute depth information of the face. The depth information of the face may represent a three-dimensional feature of the face.

For a binocular camera (namely, two cameras, for example, a first camera and a second camera), the distance between each feature of the face and the camera (namely, the depth of the point) may be a vertical distance from the point at which each feature of the face is located to a connection line between the two cameras. For example, as shown in FIG. 1B, it is assumed that P is a feature of the photographed face, and a depth of the feature P is a vertical distance Z from P to $O^L O^R$. $O^L$ is a location of the first camera, and $O^R$ is a location of the second camera.

In the embodiments of this application, a depth feature of a real face is obtained by the electronic device by analyzing and learning a large amount of depth information of real faces. The depth information of each real face has the depth feature of the real face.

It can be understood that, even if a photo includes a two-dimensional image that matches the two-dimensional face image prestored in the electronic device, depth information of the photo does not have the depth feature of the real face. In other words, there is a great difference between the depth information of the photo and depth information of an object that has the depth feature of the real face. Therefore, according to the solutions in the embodiments of this application, the electronic device can determine whether a two-dimensional image of an object collected by the electronic device is an image of a real face by determining whether depth information of the object has the depth feature of the real face. That is, depth anti-counterfeiting authentication may be performed on the two-dimensional image of the object collected by the electronic device. In the embodiments of this application, facial recognition performed by the electronic device by comparing the two-dimensional image of the photographed object with the two-dimensional face image prestored in the electronic device may be referred to as two-dimensional image authentication.

In conclusion, depth information of a photo does not have the depth feature of the real face. Therefore, according to the method in the embodiments of this application, user identity verification performed by the electronic device on the photo fails, so that information in the electronic device can be prevented from being leaked, or a property loss caused to the user can be avoided, thereby ensuring information security of the electronic device, and improving security performance of the electronic device.

There is a great difference between depth information of a real face and depth information of the following photos that include a face image of the object. For example, the photo may be an electronic photo that includes the face image of the photographed object, a paper photo that includes the face image of the photographed object, and the paper photo that is pasted on a head model of the photographed object.

The head model in the embodiments of this application is a human head model made of a material such as silica gel, gypsum, or clay. The human head model may be made in proportion to dimensions of organs on the real face. Although the human head model can reflect the three-dimensional feature of the real face, there is a great difference between an image (two-dimensional image) of the real face in infrared light and an image (two-dimensional image) of the head model in infrared light. Therefore, in the embodiments of this application, whether a feature of a two-dimensional image of an object that is collected by a camera (for example, a first camera 102 or a second camera 103) in infrared light matches a feature of the real face in infrared light may be further determined, to determine whether the two-dimensional image of the object collected by the electronic device is an image of a real face. That is, infrared anti-counterfeiting authentication may be performed on the two-dimensional image of the object collected by the electronic device.

A reason why there is a great difference between the image of the real face in infrared light and the image of the head model in infrared light is that reflectance (reflectance) of infrared light on real skin and silica gel greatly differ from each other. For example, FIG. 1D shows a fluctuation diagram of reflectance of light of various wavelengths on real white skin, real black skin, white silica gel, and black silica gel. As shown in FIG. 1D, there is a relatively large difference in reflectance of the infrared light on the real white skin and the black silica gel, there is a relatively large difference in reflectance of infrared light on the real white skin and the white silica gel, and there is also a difference in reflectance of the infrared light on the real black skin and the black silica gel.

The electronic device provided in the embodiments of this application may include an infrared projector and two dual-pass cameras (for example, a first camera and a second camera). The infrared projector is disposed between the two dual-pass cameras. A distance between the two dual-pass cameras is a first length. Generally, a distance between centers of two cameras is referred to as a distance between the two cameras.

Figure 1B:
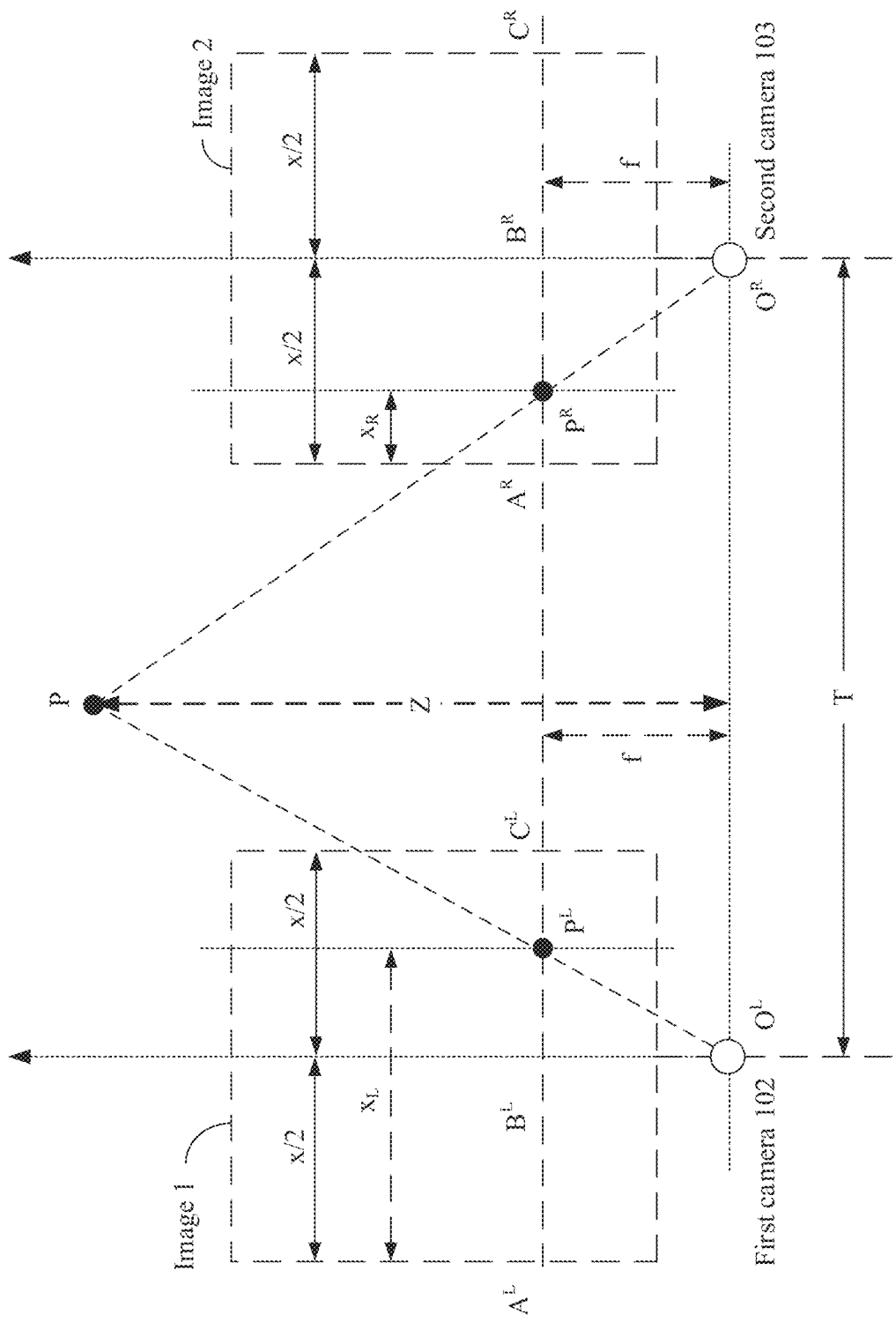
FIG. 1B is a schematic diagram 1 of a principle of calculating depth information according to an embodiment of this application.

FIG. 1A is a partial schematic diagram of an electronic device 100 according to an embodiment of this application. As shown in FIG. 1A, the electronic device 100 may include an infrared projector 101, a first camera 102, and a second camera 103. A distance between the first camera 102 and the second camera 103 is a first length T.

The infrared projector 101 is configured to emit infrared light with a light spot. A dual-pass camera means that the camera not only can receive visible light, but also can receive infrared light. For example, the dual-pass camera may receive visible light and 940 nanometers (nm) infrared light. 940 nm is a wavelength of the infrared light. Certainly, the foregoing two dual-pass cameras may be replaced with two all-pass cameras. An all-pass camera means that the camera can receive a plurality of types of light, including visible light, infrared light, and light of another wavelength. In contrast, a common red-green-blue (red green blue, RGB) camera can receive visible light, but cannot receive infrared light.

The RGB camera can only collect images in visible light. Therefore, in relatively poor light (for example, at night), the RGB camera cannot collect a clear two-dimensional face image, and the electronic device cannot perform facial recognition. However, in the embodiments of this application, the first camera 102 and the second camera 103 not only can receive visible light, but also can receive infrared light. In addition, the infrared projector 101 may emit infrared light to an object. In this way, the first camera 102 or the second camera 103 can collect image information in visible light and infrared light, and then perform facial recognition based on the image information. To be specific, according to the method in the embodiments of this application, facial recognition can be performed in relatively poor light (for example, on a cloudy day or at night).

As shown in FIG. 1A, the electronic device 100 may further include an ambient optical sensor 105. The ambient optical sensor 105 is configured to sense luminance of ambient light, and work with the infrared projector 101, the first camera 102, and the second camera 103 to collect face image information (including a two-dimensional image and an image used to calculate depth information of an object) used to perform facial recognition.

In the embodiments of this application, the first camera 102 may be a left-side dual-pass camera, and the second camera 103 may be a right-side dual-pass camera; or the first camera 102 may be a right-side dual-pass camera, and the second camera 103 may be a left-side dual-pass camera. In FIG. 1A, a partial structure of the electronic device 100 is described by using an example in which the first camera 102 is a left-side dual-pass camera and the second camera 103 is a right-side dual-pass camera.

It should be noted that, in the embodiments of this application, the first camera 102 and the second camera 103 may receive infrared light of a same type. The infrared light of the same type is infrared light of a same wavelength. In other words, the first camera 102 and the second camera 103 have a same capability of receiving infrared light. For example, the first camera 102 and the second camera 103 may receive 940 nm infrared light. In addition, in the embodiments of this application, the infrared light emitted by the infrared projector 101 and the infrared light that can be received by the first camera 102 and the second camera 103 are also infrared light of a same type.

In the embodiments of this application, a purpose of emitting the infrared light with the light spot by the infrared projector 101 is not only to enable the electronic device 100 to perform facial recognition in relatively poor light, but also to increase a quantity of features in images of an object collected by the first camera 102 and the second camera 103. This improves accuracy of the depth information of the object calculated by the electronic device 100 and accuracy of facial recognition performed by the electronic device 100.

Specifically, after the infrared light with the light spot is irradiated onto the photographed object, the image information collected by the first camera 102 and the second camera 103 not only may include an image of the photographed object, but also may include a texture feature formed when the infrared light with the light spot is irradiated onto the photographed object. In other words, a quantity of features in the images of the photographed object that are collected by the first camera 102 and the second camera 103 can be increased.

In the embodiments of this application, a principle that increasing the quantity of features of the object collected by the first camera 102 and the second camera 103 can improve accuracy of calculating the depth information of the photographed object by the electronic device 100 is described herein.

Specifically, a method for calculating the depth information of the photographed object by the electronic device 100 may include: The first camera 102 and the second camera 103 of the electronic device 100 separately collect image information of the photographed object. The electronic device 100 recognizes a same feature in the image information (namely, first image information) collected by the first camera 102 and the image information (namely, second image information) collected by the second camera 103, calculates parallax of the first camera 102 and the second camera 103 for the same feature, and then calculate a depth of a point based on the parallax, a hardware parameter of the first camera 102, and a hardware parameter of the second camera 103. Depths of points at which plurality of features of the photographed object are located may constitute the depth information of the photographed object.

The electronic device 100 may calculate a depth of each feature of the photographed object based on parallax of the binocular camera for a same feature, with reference to a hardware parameter of the binocular camera, and by using a triangulation principle, to obtain the depth information of the photographed object.

In the embodiments of this application, a method for calculating the depth information by the electronic device 100 based on the parallax is described herein by using an example.

As shown in FIG. 1B, $O^L$ is a location of the first camera 102, $O^R$ is a location of the second camera 103, and a distance between $O^L$ and $O^R$ is the first length T, in other words, $O^LO^R$=T. A lens focal length of the first camera 102 and a lens focal length of the second camera 103 are both f.

A feature P is a feature of the photographed object. A vertical distance from a point at which the feature P is located to a connection line between the first camera 102 and the second camera 103 is Z. In other words, depth information of P is Z. The first camera 102 collects an image 1 of the photographed object, and the feature P is at a point $P^L$ in the image 1. The second camera 103 collects an image 2 of the photographed object, and the feature P is at a point $P^R$ in the image 2. A feature corresponding to the point $P^L$ in the image 1 and a feature corresponding to the point $P^R$ in the image 2 are both the feature P of the photographed object.

As shown in FIG. 1B, $A^LC^L=A^RC^R=x$, and $A^LB^L=B^LC^L=A^RB^R=B^RC^R=x/2$. A distance between the feature $P^L$ and a feature $A^L$ is $x_L$, that is, a distance between the feature $P^L$ and a leftmost end of the image 1 is $x_L$, in other words, $A^LP^L=x_L$. A distance between the feature $P^R$ and a feature $A^R$ is $x_R$, that is, a distance between the feature $P^R$ and a leftmost end of the image 2 is $x_R$, in other words, $A^RP^R=x_R$. A difference between $A^LP^L$ and $A^RP^R$ is parallax between the first camera 102 and the second camera 103 for the feature P, in other words, the parallax d of the feature P is equal to $x_L-x_R$.

Because $P^LP^R$ is parallel to $O^LO^R$, the following formula (1) may be obtained according to a triangle principle:

$$\frac{P^LP^R}{O_LO_R} = \frac{Z-f}{Z} \quad \text{formula (1)}$$

where $P^LP^R = O_LO_R - B^LP^L - P^RB^R$, $O^LO^R = T, B^LP^L = A^LP^L - A^LB^L = x_L - x/2,$ $P^RB^R = x/2 - x_R$, and $P^LP^R =$ $T - (x_L - x/2) - (x/2 - x_R) = T - (x_L - x_R) = T - d.$ The following can be obtained by substituting $P^LP^R$=T−$(x_L-x_R)$=T−d and $O^LO^R$=T into the formula (1):

$$\frac{T - (x_L - x_R)}{T} = \frac{T-d}{T} = \frac{Z-f}{Z}$$

$$Z = \frac{f \times T}{d}$$

It can be learned from $$Z = \frac{f \times T}{d}$$

that the depth Z of the feature P may be calculated by using the distance T between the two cameras, the lens focal length f of the two cameras, and the parallax d.

It can be learned from the foregoing descriptions that a larger quantity of features and a more prominent feature in image information collected by the first camera 102 (namely, the first image information, for example, the image 1) and image information collected by the second camera 103 (namely, the second image information, for example, the image 2) indicate a larger quantity of same features recognized by the electronic device 100 in the first image information and the second image information. A larger quantity of same features recognized by the electronic device 100 indicates that the electronic device 100 can calculate depths of more points at which features are located. Because the depth information of the photographed object includes the depths of the plurality of points of the photographed object, a larger quantity of depths of points calculated by the electronic device 100 indicates more accurate depth information of the photographed object.

Figure 1C:
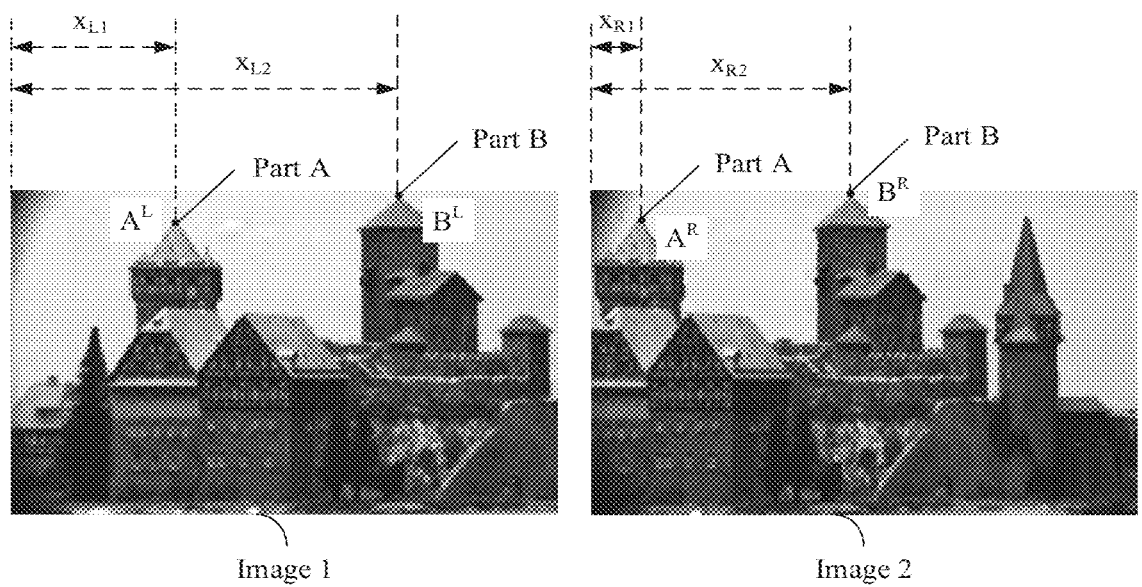
FIG. 1C is a schematic diagram of an example of a same feature in two pieces of image information collected by a binocular camera according to an embodiment of this application.
Figure 1D:
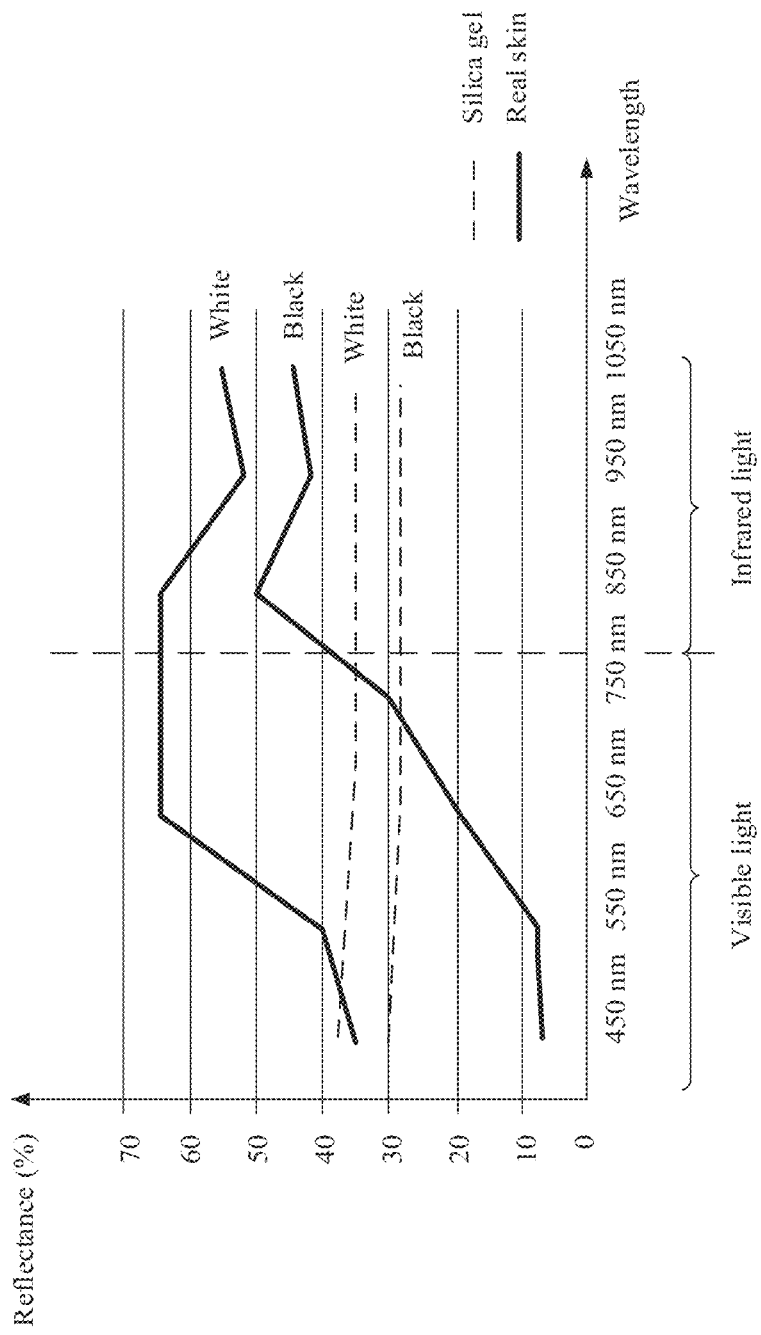
FIG. 1D is a schematic diagram of comparison between light reflectance of real skin and silica gel according to an embodiment of this application.

A same feature in the two pieces of image information is information corresponding to a same feature in the two pieces of image information. For example, if a point $A^L$ in the first image information corresponds to a part A of the object and a point $A^R$ in the second image information also corresponds to the part A of the object, the point $A^L$ and the point $A^R$ are same features in the two pieces of image information. For example, the first image information includes an image 1 of a building shown in FIG. 1C, and the second image information includes an image 2 of the building shown in FIG. 1C. A point $A^L$ in the image 1 corresponds to a part A of the building, and a point $A^R$ in the image 2 also corresponds to the part A of the building. A point $B^L$ corresponds to a part B of the building, and a point $B^R$ also corresponds to the part B of the building. Parallax of the binocular camera for the part A of the building is $x_{L1}-x_{R1}$. Parallax of the binocular camera for the part B of the building is $x_{L2}-x_{R2}$.

To sum up, when there are more features in the first image information and the second image information, it is easier to obtain more same features from the two pieces of image information, so that the depth information of the photographed object that is obtained by the electronic device 100 is more accurate.

In the embodiments of this application, the dual-pass camera may be obtained by improving an RGB camera, so that hardware costs of the electronic device 100 can be reduced. Specifically, an antireflection coating may be plated on each of two sides of each lens of the RGB camera, to improve a capability of the lens to sense infrared light, so that the lens can receive infrared light as much as possible; and a cut-off coating may be plated on a light filter of the RGB camera, to filter out light other than infrared light and visible light, and increase a transmittance of infrared light. An RGB camera including the antireflection coating and the cut-off coating not only can receive visible light, but also can receive infrared light. The RGB camera improved in the foregoing manner may be used as a dual-pass camera.

It should be noted that, in some embodiments, the partial schematic diagram of the electronic device 100 shown in FIG. 1A may be a partial schematic diagram of a front side of the electronic device 100. In other words, the infrared projector 101, the first camera 102, and the second camera 103 are disposed on the front side of the electronic device 100.

In addition to the first camera 102 and the second camera 103, the electronic device 100 may further include one or more other cameras. The one or more other cameras may include a third camera 104, and the third camera is an RGB camera. The third camera is configured to collect a two-dimensional image of a first object. The electronic device 100 may display, on a display, the two-dimensional image collected by the third camera. The third camera 104, the first camera 102, the second camera 103, and the infrared projector are disposed on a same side of the electronic device 100. That is, the third camera 104 may also be disposed on the front side of the electronic device 100. The third camera 104 is a front-facing camera of the electronic device 100.

In some other embodiments, the partial schematic diagram of the electronic device 100 shown in FIG. 1A may be a partial schematic diagram of a rear side of the electronic device 100. In other words, the infrared projector 101, the first camera 102, the second camera 103, and the RGB camera 104 are disposed on the rear side of the electronic device 100. The RGB camera 104 is a rear-facing camera of the electronic device 100.

The front side of the electronic device 100 is a side on which the electronic device 100 displays a graphical user interface (for example, a home screen of the electronic device 100, namely, a desktop), in other words, a side on which a display panel is located is usually referred to as the front side. The rear side of the electronic device 100 is a side facing a direction opposite to a direction that the front side faces. Usually, the front side of the electronic device is a side facing a user when the electronic device is normally used by the user, and a side against the user is referred to as the rear side.

Certainly, the one or more other cameras may further include another RGB camera, black-and-white camera, or the like. The another RGB camera or black-and-white camera or the like may be a front-facing camera or a rear-facing camera of the electronic device 100. This is not limited in the embodiments of this application.

For example, in the embodiments of this application, the electronic device may be a portable computer (for example, a mobile phone), a notebook computer, a wearable electronic device (for example, a smartwatch), a tablet computer, an augmented reality (augmented reality, AR)/virtual reality (virtual reality, VR) device, a vehicle-mounted device, or the like that includes the infrared projector, the RGB camera (namely, the third camera), and the two dual-pass cameras (namely, the first camera and the second camera). A specific form of the electronic device is not particularly limited in the following embodiments.

Figure 1E:
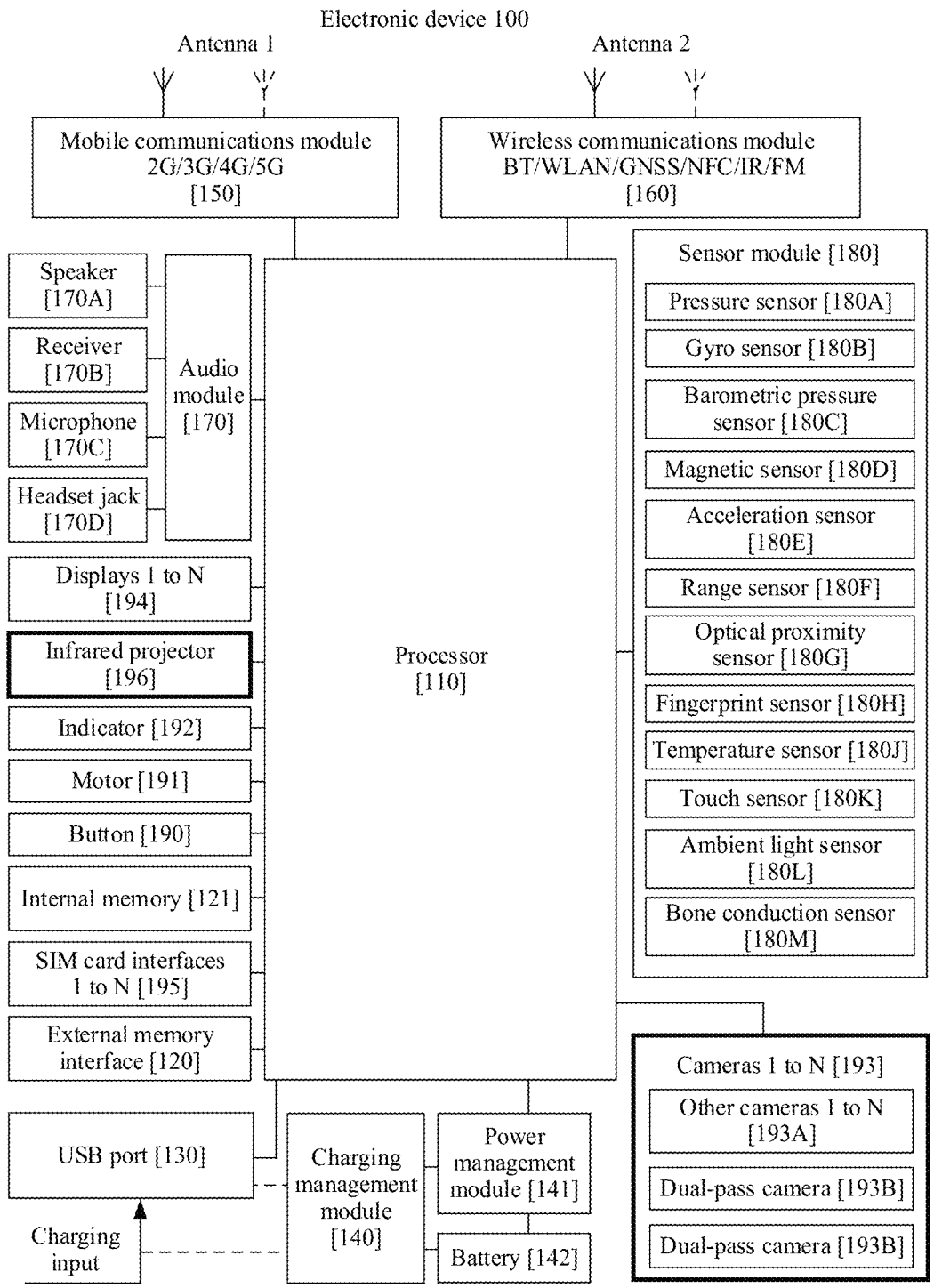
FIG. 1E is a schematic diagram of a hardware structure of an electronic device according to an embodiment of this application.

FIG. 1E is a schematic structural diagram of an electronic device 100 according to an embodiment of this application. The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

The electronic device 100 may further include an infrared projector 196 (for example, the infrared projector 101 shown in FIG. 1A). The infrared projector 196 is configured to emit infrared light with a light spot. For example, the infrared projector 196 may emit infrared light with a wavelength of 940 nm, where the infrared light has a light spot. For a shape and an arrangement of light spots, refer to subsequent related descriptions in the embodiments of this application. Details are not described herein again.

The camera 193 may include two dual-pass cameras (for example, the first camera 102 and the second camera 103 shown in FIG. 1A) 193B and 193C, and 1 to N other cameras 193A. The 1 to N other cameras 193A may include the third camera 104 shown in FIG. 1A, namely, an RGB camera. The dual-pass cameras 193B and 193C may receive visible light and infrared light. The RGB camera is configured to collect an RGB image, for example, a face image (namely, a two-dimensional face image).

The sensor module 180 may include a plurality of sensors such as a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, and a bone conduction sensor 180M.

It can be understood that the structure shown in the embodiments of the present invention does not constitute a specific limitation on the electronic device 100. In some other embodiments of this application, the electronic device 100 may include more or fewer components than those shown in the figure. Some components may be combined, some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural processing unit (Neural-network processing unit, NPU). Different processing units may be independent devices, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may further be disposed in the processor 110, and is configured to store an instruction and data. In some embodiments, the memory in the processor 110 is a cache memory. The memory may store an instruction or data that is just used or cyclically used by the processor 110. If the processor 110 needs to use the instruction or the data again, the processor 110 may directly invoke the instruction or the data from the memory, to avoid repeated access and reduce a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identity module, SIM) interface, a universal serial bus (universal serial bus, USB) port, and/or the like.

The I2C interface is a two-way synchronous serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C interface, to implement a touch function of the electronic device 100.

The I2S interface may be used for audio communication. In some embodiments, the processor 110 may include a plurality of groups of 2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be configured to: perform audio communication, and sample, quantize, and encode an analog signal. In some embodiments, the audio module 170 may be coupled to the wireless communications module 160 through the PCM bus interface. In some embodiments, the audio module 170 may alternatively transfer an audio signal to the wireless communications module 160 through the PCM interface, to implement a function of answering a call through a Bluetooth headset. Both the I2S interface and the PCM interface may be configured to perform audio communication.

The UART interface is a universal serial data bus, and is used for asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral device such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, or the like. The GPIO interface may alternatively be configured as the I2C interface, the I2S interface, the UART interface, the MIPI interface, or the like.

The USB port 130 is a port that conforms to a USB standard specification, and may be specifically a mini USB port, a micro USB port, a USB Type C port, or the like. The USB port 130 may be configured to connect to the charger to charge the electronic device 100, or may be configured to transmit data between the electronic device 100 and a peripheral device, or may be configured to connect to a headset to play audio through the headset, or may be configured to connect to another electronic device such as an AR device.

It can be understood that an interface connection relationship between the modules shown in the embodiments of the present invention is merely an example for description, and does not constitute a limitation on the structure of the electronic device 100. In some other embodiments of this application, the electronic device 100 may alternatively use an interface connection manner that is different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB port 130. In some embodiments of wireless charging, the charging management module 140 may receive a wireless charging input through a wireless charging coil of the electronic device 100. The charging management module 140 may further supply power to the electronic device through the power management module 141 while charging the battery 142.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication bands. Different antennas may be further multiplexed, to increase antenna utilization. For example, the antenna 1 may be multiplexed as a diversity antenna of a wireless local area network. In some other embodiments, the antenna may be used in combination with a tuning switch.

The mobile communications module 150 can provide a solution, applied to the electronic device 100, to wireless communication including 2G/3G/4G/5G, and the like. The mobile communications module 150 may include at least one filter, a switch, a power amplifier, a low noise amplifier (Low Noise Amplifier, LNA), and the like. The mobile communications module 150 may receive an electromagnetic wave through the antenna 1, perform processing such as filtering or amplification on the received electromagnetic wave, and transfer the electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some functional modules in the mobile communications module 150 may be disposed in the processor 110. In some embodiments, at least some functional modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 110, and is disposed in a same device as the mobile communications module 150 or another functional module.

The wireless communications module 160 may provide a wireless communication solution that is applied to the electronic device 100 and that includes a wireless local area network (wireless local area networks, WLAN) (such as a Wi-Fi network), Bluetooth (Bluetooth, BT), a global navigation satellite system (global navigation satellite system, GNSS), frequency modulation (frequency modulation, FM), NFC, infrared (infrared, IR) technology, and the like. The wireless communications module 160 may be one or more devices integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLO-NASS), a BeiDou navigation satellite system (beidou navigation satellite system, BDS), a quasi-zenith satellite system (quasi-zenith satellite system, QZSS), and/or a satellite-based augmentation system (satellite based augmentation systems, SBAS).

The electronic device 100 implements the display function through the GPU, the display 194, the application processor, and the like. The GPU is a microprocessor for image processing, and is connected to the display 194 and the application processor. The GPU is configured to perform mathematical and geometric calculation, and perform graphics rendering. The processor 110 may include one or more GPUs that execute a program instruction to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), mini-LED, a micro-LED, a micro-OLED, a quantum dot light emitting diode (quantum dot light emitting diodes, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is mainly configured to process data fed back by the camera 193. For example, during photographing, a shutter is pressed, light is transmitted to a photosensitive element of the camera through a lens. The photosensitive element of the camera converts an optical signal into an electrical signal, and transmits the electrical signal to the ISP for processing. The ISP converts the electrical signal into an image that is visible to the eye. The ISP may further perform algorithm optimization on noise, luminance, and complexion of the image. The ISP may further optimize parameters such as exposure and a color temperature of a photographing scenario. In some embodiments, the ISP may be disposed in the camera 193.

The camera 193 is configured to collect a static image or a video. An optical image of an object is generated through the lens, and is projected onto the photosensitive element. The photosensitive element may be a charge-coupled device (charge coupled device, CCD) or a complementary metal-oxide-semiconductor (complementary metal-oxide-semiconductor, CMOS) photoelectric transistor. The photosensitive element converts an optical signal into an electrical signal, and transmits the electrical signal to the ISP. The ISP converts the electrical signal into a digital image signal, and outputs the digital image signal to the DSP for processing. The DSP converts the digital image signal into a standard image signal in a format such as RGB or YUV. In some embodiments, the electronic device 100 may include one or N cameras 193, where N is a positive integer greater than 1.

The digital signal processor is configured to process a digital signal. In addition to a digital image signal, the digital signal processor may further process another digital signal. For example, when the electronic device 100 selects a frequency, the digital signal processor is configured to perform Fourier transform on frequency energy.

The video codec is configured to compress or decompress a digital video. The electronic device 100 may support one or more video codecs. Therefore, the electronic device 100 may play or record videos in a plurality of encoding formats, for example, MPEG (moving picture experts group, MPEG)-1, MPEG-2, MPEG-3, and MPEG-4.

The NPU is a neural-network (neural-network, NN) computing processor. The NPU quickly processes input information by referring to a biological neural network structure, for example, by referring to a mode of transfer between human brain neurons, and may further continuously perform self-learning. Intelligent cognition of the electronic device 100 such as image recognition, facial recognition, speech recognition, and text understanding, can be implemented by using the NPU.

The external memory interface 120 may be configured to connect to an external memory card such as a micro SD card, to extend a storage capability of the electronic device 100. The external memory card communicates with the processor 110 through the external memory interface 120, to implement a data storage function, for example, to store files such as music and a video in the external memory card.

The internal memory 121 may be configured to store computer-executable program code, and the executable program code includes an instruction. The processor 110 runs the instruction stored in the internal memory 121, to implement various functional applications and data processing of the electronic device 100. The internal memory 121 may include a program storage area and a data storage area. The program storage area may store an operating system, an application required by at least one function (for example, a sound playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory device, or a universal flash storage (universal flash storage, UFS).

The electronic device 100 may implement audio functions such as music playback and recording functions through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "horn", is configured to convert an audio electrical signal into a sound signal. The electronic device 100 may listen to music or answer a hands-free call through the speaker 170A.

The receiver 170B, also referred to as an "earpiece", is configured to convert an audio electrical signal into a sound signal. When the electronic device 100 is used to answer a call or listen to voice information, the receiver 170B may be placed close to a human ear to listen to a voice.

The microphone 170C, also referred to as a "mike" or a "mic", is configured to convert a sound signal into an electrical signal. When making a call or sending voice information, a user may make a sound near the microphone 170C through the mouth of the user, to enter a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, reduce noise, identify a sound source, implement a directional recording function, and the like.

The headset jack 170D is configured to connect to a wired headset. The headset jack 170D may be the USB port 130, or may be a 3.5 mm open mobile electronic device platform (open mobile terminal platform, OMTP) standard interface or a cellular telecommunications industry association of the USA (cellular telecommunications industry association of the USA, CTIA) standard interface.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be used for an incoming call vibration prompt, or may be used for a touch vibration feedback. For example, touch operations performed on different applications (for example, photographing and audio playback) may also correspond to different vibration feedback effects. Touch operations performed on different areas on the display 194 may correspond to different vibration feedback effects of the motor 191. Different application scenarios (for example, a time reminder scenario, an information receiving scenario, an alarm clock scenario, and a game scenario) may also correspond to different vibration feedback effects. A touch vibration feedback effect may alternatively be customized.

The indicator 192 may be an indicator light, which may be configured to indicate a charging status and a power change, or may be configured to indicate a message, a missed call, a notification, and the like.

The SIM card interface 195 is configured to connect to a SIM card. The SIM card may be inserted in the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into one SIM card interface 195. The plurality of cards may be of a same type or different types. The SIM card interface 195 may also be compatible with different types of SIM cards. The SIM card interface 195 may also be compatible with an external storage card. The electronic device 100 interacts with a network by using the SIM card, to implement a call function, a data communication function, and the like. In some embodiments, the electronic device 100 uses an eSIM, namely, an embedded SIM card. The eSIM card may be embedded in the electronic device 100, and cannot be separated from the electronic device 100.

Figure 1F:
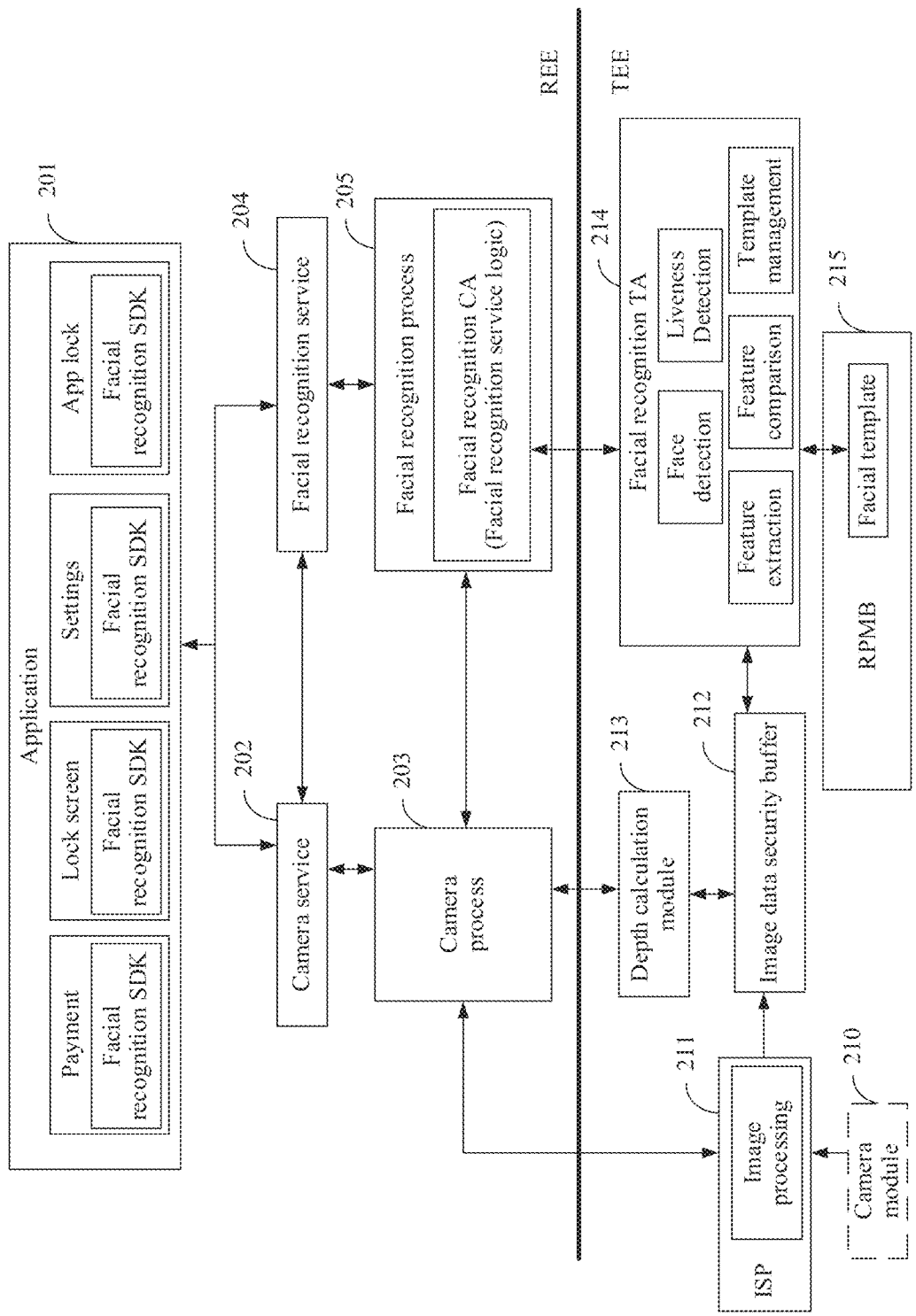
FIG. 1F is a schematic architectural diagram of a software system of an electronic device according to an embodiment of this application.

FIG. 1F is a schematic architectural diagram of a software system of an electronic device 100 according to an embodiment of this application. As shown in FIG. 1F, the software system of the electronic device 100 may include a plurality of applications 201, a camera service 202, a camera process 203, a facial recognition service 204, a facial recognition process 205, an ISP module 211, an image data security buffer (buffer) 212, a depth calculation module 213, and a facial recognition TA (Trust APP) 214, and a replay protected memory block (replay protected memory block, RPMB) 215. The RPMB 215 is a storage area with a security feature. The RPMB 215 is configured to store a facial template, namely, an original image in the embodiments of this application.

As shown in FIG. 1F, the plurality of applications 201 may include facial recognition software development kits (software development kit, SDK) of applications such as a payment application, a screen locking application, a setting application, and an application lock. The plurality of applications 201 may trigger the electronic device 100 to perform facial recognition in different scenarios.

When receiving facial recognition requests initiated by the plurality of applications 210, the electronic device 100 may enable the camera service 202 to create the camera process 203, and enable the facial recognition service 204 to create the facial recognition process 205.

After the camera service 202 is enabled, the camera module 210 may be enabled and initialized, and the camera module 210 may collect image information. In the embodiments of this application, the camera module 210 may include a first camera 102 and a second camera 103. The image information collected by the camera module 210 may include first image information collected by the first camera 102 and second image information collected by the second camera 103.

The facial recognition process 205 may transmit initialization parameters such as automatic focus (auto focus, AF), automatic exposure (automatic exposure, AE), and automatic white balance (automatic white balance, AWB) of the camera module 210 to the camera process 203. The camera process 203 may initialize the camera module 210 according to the initialization parameters. The camera process 203 may transmit an initialization result of the camera module 210 to the facial recognition process 205.

The facial recognition process 205 includes a facial recognition CA (Client APP), and the facial recognition CA may be used to determine facial recognition service logic. The facial recognition service logic may include a sequence of performing two-dimensional image authentication, depth anti-counterfeiting authentication, and infrared anti-counterfeiting authentication by the facial recognition TA 214. The facial recognition process 205 may indicate the facial recognition service logic to the facial recognition TA 214. For example, the facial recognition process 205 may indicate the facial recognition TA 214 to first perform the two-dimensional image authentication, then perform the depth anti-counterfeiting authentication, and finally perform the infrared anti-counterfeiting authentication.

The image information collected by the camera module 210 is a raw (raw) image. Therefore, the image information collected by the camera module 210 may be used to perform the facial recognition only after image processing (for example, noise reduction) is performed on the image information. As shown in FIG. 1F, the camera process 203 may indicate the ISP 211 to perform the image processing (for example, noise reduction) on the image information collected by the camera module 210.

The ISP 211 may perform the image processing on the first image information and the second image information, and store the processed first image information and second image information in the image data security buffer 212. The facial recognition process 205 may indicate the depth calculation module 213 to calculate depth information (which may be referred to as a depth map, that is, a depth map) of a photographed object based on the processed first image information and second image information in the image data security buffer 212. Then, the depth calculation module 213 may store, in the image data security buffer 212, the depth map obtained through calculation. The depth map in the image data security buffer 212 and an image (for example, the first image information) collected by a primary dual-pass camera may be transmitted to the facial recognition TA 214. The facial recognition TA 214 performs facial recognition by using the depth map and the first image information according to the facial recognition service logic.

The facial recognition TA 214 may perform facial detection, liveness detection (including the depth anti-counterfeiting authentication and the infrared anti-counterfeiting authentication), feature extraction, feature comparison, template management, and the like. The facial detection means that the facial recognition TA 214 may detect whether an image 1 includes a face image. If the image 1 includes a face image, the facial recognition TA 214 can perform operations such as the liveness detection, the feature extraction, the feature comparison, and the template management. The feature extraction means that the facial recognition TA 214 extracts a facial feature from the first image information. The feature comparison means that the facial recognition TA 214 compares the facial template in the RPMB 215 with the facial feature extracted from the image 1, and determines whether the facial feature extracted from the image 1 matches the facial template, that is, performs the two-dimensional image authentication.

In some embodiments, the facial template in the RPMB 215 may be an RGB image collected by a third camera 104 (namely, an RGB camera). Alternatively, the facial template in the RPMB 215 may be third image information collected by the primary dual-pass camera (for example, the first camera 102).

In some embodiments, the facial recognition (namely, the user identity verification) in the embodiments of this application can succeed only if all the two-dimensional image authentication, the depth anti-counterfeiting authentication, and the infrared anti-counterfeiting authentication succeed. Otherwise, the facial recognition (namely, the user identity verification) fails.

The plurality of applications 201, the camera service 202, the facial recognition service 204, the camera process 203, and the facial recognition process 205 have relatively low security requirements. As shown in FIG. 1F, the plurality of applications 201, the camera service 202, the facial recognition service 204, the camera process 203, and the facial recognition process 205 may run in a rich execution environment (rich execution environment, REE) that can execute rich instructions. The ISP 211, the depth calculation module 213, the facial recognition TA 214, and the like have relatively high security requirements, and may run in a TEE. The image data security buffer 212 and the RFMB 215 are also in the TEE.

It should be noted that, in the embodiments of this application, all image information used to perform facial recognition is stored in the REE (for example, the image data security buffer 212 or the RFMB 215). In addition, the facial recognition performed by using the image information is also performed in the REE. In this way, this reduces a possibility that image information used to perform the facial recognition in the electronic device 100 is stolen, and improves security performance of the electronic device 100.

The template management in the facial recognition TA 214 means that the facial recognition TA 214 may update a facial template stored in the RPMB 215. The updating a facial template stored in the RPMB 215 may include: adding a new facial template in the RPMB 215, or replacing the facial template stored in the RPMB 215 with a new facial template.

Specifically, if the facial recognition (namely, the user identity verification) performed by the facial recognition TA 214 succeeds, image quality of a two-dimensional face image used to perform this facial recognition is higher than a first quality threshold, frequency of performing facial recognition on the two-dimensional face image is higher than a preset frequency threshold, and the two-dimensional face image is different from the facial template stored in the RPMB 215 to some extent, the facial recognition TA 214 may use the two-dimensional face image as a new facial template, and update the facial template stored in the RPMB 215.

In the following scenarios, the facial recognition TA 214 stores, in the RPMB 215, a new facial template that meets the foregoing requirements. In a scenario (1), when a user wears different clothes in different occasions, there is a specific difference between two-dimensional face images of the user collected by the electronic device 100 for facial recognition. In a scenario (2), when the user makes up and does not make up, there is a specific difference between two-dimensional face images of the user collected by the electronic device 100 for facial recognition.

Image quality of a two-dimensional image may be represented by definition or integrity of the two-dimensional image, and image quality of a two-dimensional image may alternatively be represented by definition and integrity of the two-dimensional image. Higher definition of the two-dimensional image indicates higher quality of the two-dimensional image. Higher integrity of the two-dimensional image indicates higher quality of the two-dimensional image. The first quality threshold is higher than a second quality threshold in the embodiments of this application.

Figure 2:
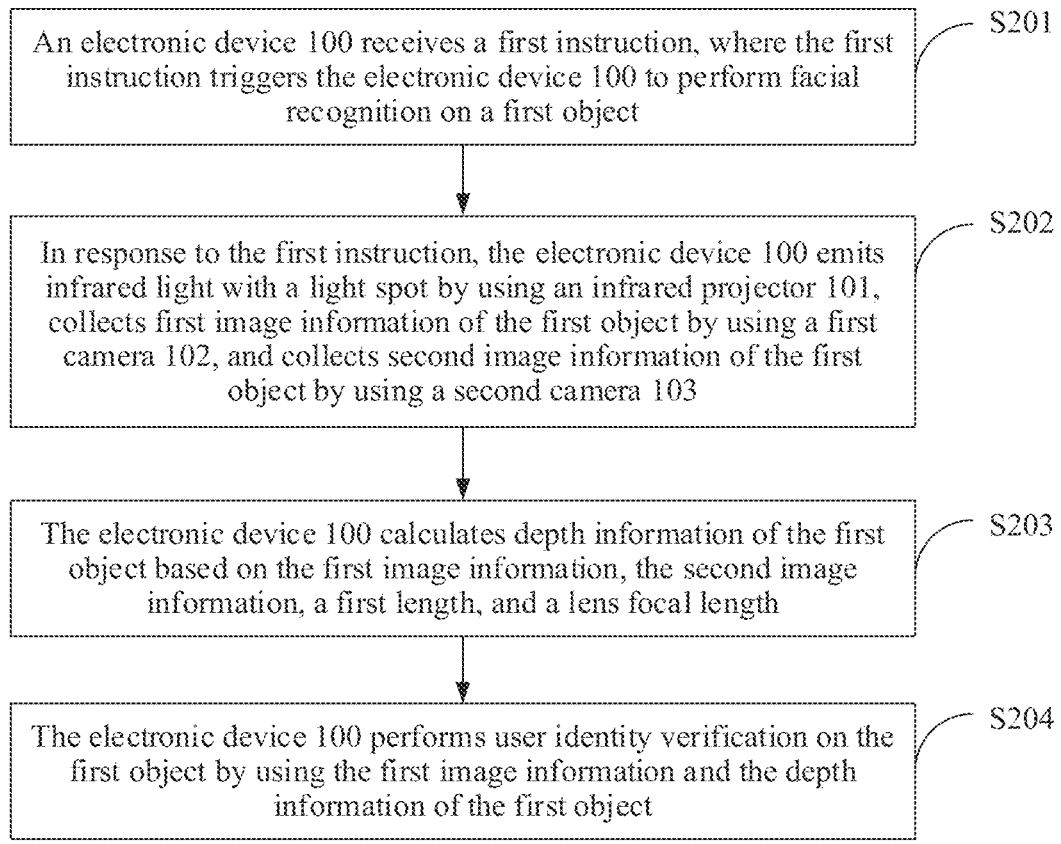
FIG. 2 is a flowchart 1 of a facial recognition method according to an embodiment of this application.

An embodiment of this application provides a facial recognition method, and the method may be applied to the electronic device 100. The electronic device 100 includes an infrared projector 101, a first camera 102, and a second camera 103. As shown in FIG. 1A, both a lens focal length of the first camera 102 and a lens focal length of the second camera 103 are f, and a first length is T. As shown in FIG. 2, the facial recognition method may include S201 to S204.

S201. The electronic device 100 receives a first instruction. The first instruction triggers the electronic device 100 to perform facial recognition on the first object.

The electronic device 100 may receive a first operation of a user, and the first operation is used to trigger the electronic device 100 to execute a first event (for example, unlock the electronic device 100 or complete payment). The electronic device 100 needs to use image information (including a two-dimensional image and depth information of the first object) of the first object to execute the first event. Therefore, in response to the first operation, the electronic device 100 may obtain the first instruction, and the first instruction may trigger the electronic device 100 to obtain the two-dimensional image and the depth information of the first object.

For example, the method in this embodiment of this application may be applied to a plurality of scenarios such as a face-based unlocking scenario and a face-based payment scenario.

In the face-based unlocking scenario, it is assumed that the electronic device 100 has been powered on and a screen of the electronic device 100 is off. The first operation may be a hit operation (for example, a single hit operation) performed by the user on a related physical button of the electronic device 100. For example, the related physical button may be a lock-screen button or a home button. If the electronic device 100 receives the first operation performed by the user on the physical button, it indicates that the user may be intended to unlock the electronic device 100.

Alternatively, the electronic device 100 may include one or more sensors configured to detect a status of the electronic device 100 being held by the user. It is assumed that the electronic device 100 has been powered on and the screen of the electronic device 100 is off or a lock-screen interface is displayed on the electronic device 100. That the electronic device 100 receives the first operation may be specifically as follows: The sensor detects that a current status of the electronic device 100 being held by the user undergoes a change satisfying a preset condition. When the status of the electronic device 100 being held by the user undergoes a change satisfying the preset condition (for example, the electronic device 100 is picked up by the user, and the user holds the electronic device 100 so that an included angle between a display of the electronic device 100 and a horizontal plane falls within a specific range), it indicates that the user may be intended to unlock the electronic device 100.

In other words, the first operation may be used to trigger the electronic device 100 to perform unlocking (that is, perform the first event). Before the electronic device 100 is unlocked, user identity verification needs to be performed. Facial recognition is a manner of user identity verification. To perform the facial recognition, the electronic device 100 may obtain the two-dimensional image and the depth information of the first object.

In this embodiment of this application, the one or more sensors may determine, by detecting whether the electronic device 100 is rotated, the electronic device 100 moves forward relative to the user, or the electronic device 100 moves upward relative to a horizon, whether the status of the electronic device 100 being held by the user undergoes a change satisfying the preset condition. Specifically, the electronic device 100 may detect a motion parameter of the electronic device 100. Then, the electronic device 100 determines, based on the motion parameter, whether the electronic device 100 is rotated, whether the electronic device 100 moves forward relative to the user, and whether the electronic device 100 moves upward relative to the horizon. Finally, the electronic device 100 determines, based on a determining result, whether the status of the electronic device 100 being held by the user undergoes a change satisfying the preset condition.

For example, in this embodiment, that "a current status of the electronic device 100 being held by the user undergoes a change satisfying a preset condition" may specifically include: After the sensor detects that the electronic device 100 is rotated and moves upward, the included angle between the display of the electronic device 100 and the horizontal plane falls within a preset range.

It should be noted that, because different users have different photographing habits, the electronic device 100 may collect statistics on status change parameters collected by the sensor in a process in which most or all users use the electronic device 100 to collect face images, and determine changes of the status change parameters as changes satisfying the preset condition. In this way, the electronic device 100 may determine, in response to that the changes of the status change parameters collected by the sensor in the electronic device 100 are changes satisfying the preset condition, that a possibility that the user wants to unlock the electronic device 100 is relatively high. In this case, S202 may be performed.

Figure 3A:
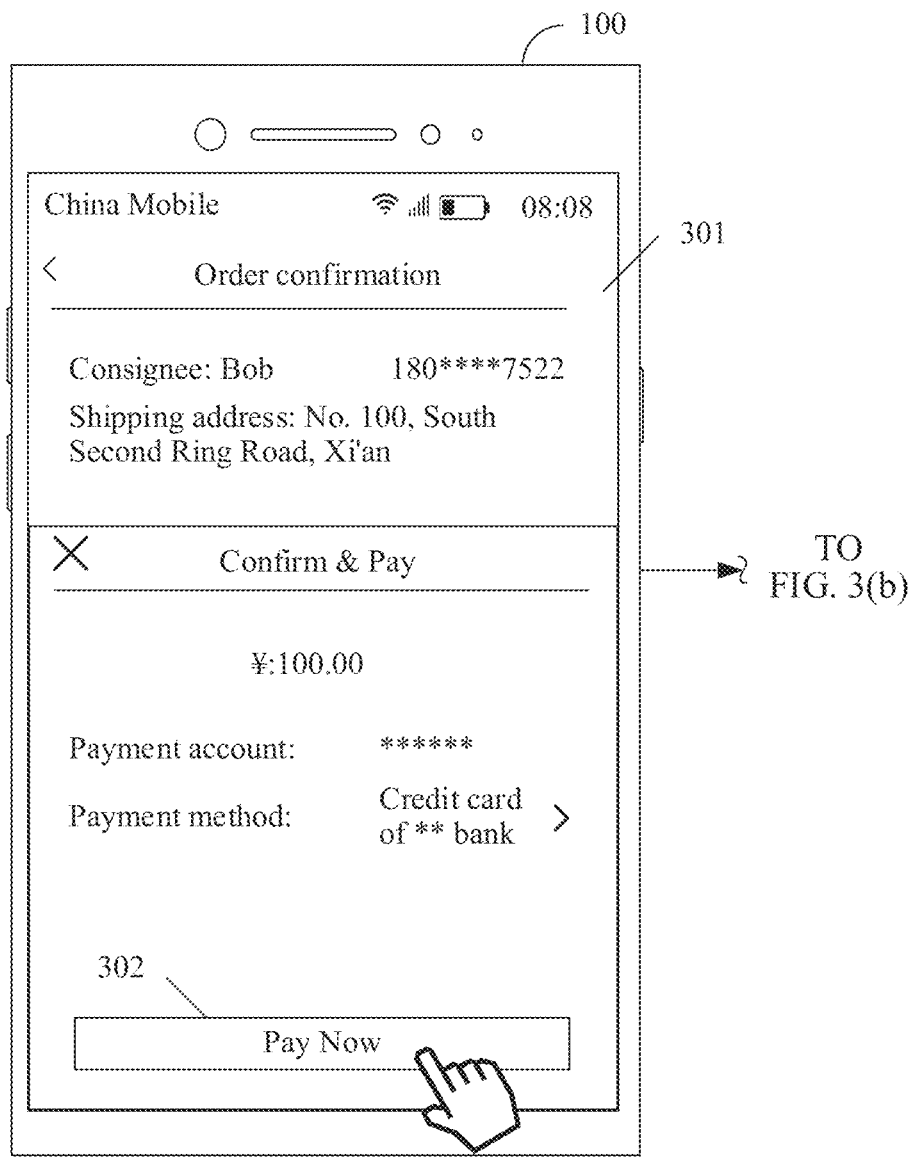

For example, in the face-based payment scenario, the first operation may be a tap operation (for example, a single tap operation) performed by the user on a payment button on a payment interface. For example, a payment interface 301 shown in FIG. 3(a) includes a "Pay Now" payment button 302, and the first operation may be a single tap operation performed by the user on the "Pay Now" button 302. Alternatively, the first operation may be a preset gesture entered by the user on the payment interface, for example, an S-shaped gesture. In response to the first operation, the electronic device 100 may pay for an order (that is, perform the first event). However, before the electronic device 100 pays for the order, user identity verification needs to be performed. Facial recognition is a manner of user identity verification. To perform the facial recognition, the electronic device 100 may obtain the depth information of the first object. In response to the single tap operation performed by the user on the "Pay Now" button 302, the electronic device 100 may display a facial recording interface 303 shown in FIG. 3(b).

S202. In response to the first instruction, the electronic device 100 emits infrared light with a light spot by using the infrared projector 101, collects first image information of the first object by using the first camera 102, and collects second image information of the first object by using the second camera 103.

In response to the first instruction, the electronic device 100 may enable the infrared projector 101, and enable and initialize the first camera 102 and the second camera 103. After the electronic device 100 enables the infrared projector 101, the infrared projector 101 may emit the infrared light with the light spot. After the electronic device 100 enables and initializes the first camera 102 and the second camera 103, the first camera 102 and the second camera 103 may collect the image information of the object (namely, the first object).

That the electronic device 100 initializes the first camera 102 and the second camera 103 may specifically include: The electronic device 100 adjusts initialization parameters (AE, AEB, and AF) of images collected by the first camera 102 and the second camera 103 to initialization parameters prestored in the electronic device 100. The prestored initialization parameters are initialization parameters of the first camera 102 and the second camera 103 used when the electronic device 100 records a two-dimensional face image used to perform the facial recognition. If same initialization parameters of the cameras (for example, the first camera 102 and the second camera 103) are used when the cameras collect images twice, facial recognition failures caused by a relatively large difference between the images collected twice due to different initialization parameters can be reduced.

In this embodiment of this application, the infrared projector 101 emits the infrared light with the light spot to the first object, and the infrared light with the light spot is irradiated onto the first object. This can increase a quantity of features (namely, texture features) of the first object, and increase a rate of recognizing each feature of the first object by the first camera 102 and the second camera 103.

In this embodiment of this application, the infrared light with the light spot that is emitted by the infrared projector 101 and a principle of emitting the infrared light with the light spot by the infrared projector 101 are described herein.

A wavelength of infrared light ranges from 760 nm to 1000 nm. Generally, infrared light is invisible to human eyes. However, some infrared light (for example, 850 nm infrared light) has a prominent red light feature, and a small amount of red light is still visible to human eyes. If the infrared projector 101 emits this type of infrared light to the first object, the user may see the infrared light irradiated onto the first object, and this affects visual experience of the user.

To prevent the visual experience of the user from being affected because the infrared projector 101 emits the infrared light to the first object, the infrared light emitted by the infrared projector 101 may be infrared light that is completely invisible to human eyes. For example, the infrared light emitted by the infrared projector 101 may be 890 nm-990 nm infrared light, and is specifically, for example, 940 nm infrared light.

Exposure of some cameras (for example, a rolling shutter (rolling shutter) camera) is performed line by line. Therefore, if exposure of the first camera 102 and the second camera 103 is performed line by line, the infrared projector 101 needs to be enabled to emit the infrared light with the light spot during an entire exposure period of the first camera 102 and the second camera 103. Otherwise, there may be no light spot on some images in the image information collected by the first camera 102 and the second camera 103 during the exposure. In this case, it is required that an operating power of the infrared projector 101 not be excessively high, to avoid that the infrared projector 101 heats up and has a relatively high temperature due to an excessively high operating power of the infrared projector 101, thereby affecting efficiency of emitting the infrared light by the infrared projector 101 (that is, affecting luminance of the infrared light), and further affecting an effect of a texture feature formed when the infrared light with the light spot is irradiated onto the object.

Certainly, the operating power of the infrared projector 101 cannot be excessively low either. If the operating power of the infrared projector 101 is excessively low, efficiency of emitting the infrared light by the infrared projector 101 is also affected, and further, an effect of a texture feature formed when the infrared light with the light spot is irradiated onto the object is affected.

To sum up, to ensure the effect of the texture feature formed when the infrared light is irradiated onto the object, the power of the infrared projector 101 should not be excessively high or excessively low. To stabilize the power of the infrared projector 101, an operating current of the infrared projector 101 may range from 100 mA to 200 mA. For example, the operating current of the infrared projector 101 may be 150 mA.

Generally, an infrared projector may include three parts: (1) an infrared light source; (2) a collimating mirror; and (3) a diffractive optical element (diffractive optical elements, DOE).

The infrared light source may be a laser light source. For example, the laser light source may be a vertical cavity surface emitting laser (vertical cavity surface emitting laser, VCSEL). The VCSEL may emit the foregoing infrared light.

The collimating mirror may be a 1P lens or a 2P lens. That the collimating mirror is a 1P lens means that the collimating mirror includes one lens. The 2P lens means that the collimating mirror includes two lenses. The collimating mirror is configured to convert non-parallel light into approximately parallel light sources. This conversion can reduce a noise level of a texture of infrared light emitted by the infrared projector, that is, can reduce light of a non-texture part. In other words, this conversion can make a bright dot in the infrared light emitted by the infrared projector brighter and a dark dot in the infrared light emitted by the infrared projector darker.

In relatively strong visible light in the daytime, the texture feature formed when the infrared light with the light spot is irradiated onto the first object is almost invisible in the image information collected by the first camera 102 and the second camera 103. In this case, when recognizing a same feature in the two pieces of image information, the electronic device 100 may perform determining based on a feature of the first object. Therefore, a bright dot obtained by the collimating mirror by converting the light has no impact on depth calculation.

In this embodiment of this application, a collimating mirror may be omitted in the infrared projector 101. To be specific, in this embodiment of this application, the infrared projector 101 may not include a collimating mirror, and include only an infrared light source and a DOE. The collimating mirror is configured to make light emitted by the VCSEL become approximately parallel light after passing through the collimating mirror. In this way, when there is a collimating mirror, after light passes through the DOE, a light spot diameter is small, and a contrast is high (to be specific, luminance of a light spot region is high, and luminance of a non-light spot region is low). Therefore, when intensity of visible light is very low or in case of pure darkness (for example, at night), the first object illuminated by a projector turns black or is invisible in a region without a spot or a light spot. This is because light spots and light of a projector with a collimating mirror is more concentrated, and a place without a light spot is theoretically light-less or has only faint ambient light. If the collimating mirror is removed from the infrared projector, because light is not parallel light before entering the DOE, a contrast of a light spot is low, and a part of light still exists in a non-light spot region. A projector without a collimating mirror is a noise in projector design. However, in this embodiment of this application, accuracy of measuring depth information can be improved. For the projector without the collimating mirror, in case of weak visible light or pure darkness, in a region that is of the first object and onto which a light spot is irradiated, the first object may be illuminated by the light spot; in a region not illuminated by a light spot, because of this noise, relatively weak light is also irradiated onto the first object. In this case, the first object is visible as a whole. Therefore, a feature of the first object can be more prominent, and accuracy of measuring depth information can be improved.

The DOE is configured to convert, by using a Fourier optical principle, parallel light into a required light output form. The output form may be a point, a line, or a surface. In this embodiment of this application, the DOE may be disposed to control the infrared projector to emit the infrared light with the light spot. A shape, a quantity, and an arrangement of light spots may all be implemented by disposing the DOE.

In some embodiments, in relatively strong visible light in the daytime, the texture feature formed when the infrared light with the light spot is irradiated onto the first object is almost invisible in the image information collected by the dual-pass camera. Therefore, the infrared projector 101 may be disabled in relatively strong visible light (for example, the light is greater than 2 lux) in the daytime. In this case, when recognizing a same feature in the two pieces of image information, the electronic device 100 may perform determining based on a feature of the first object.

Figure 4:
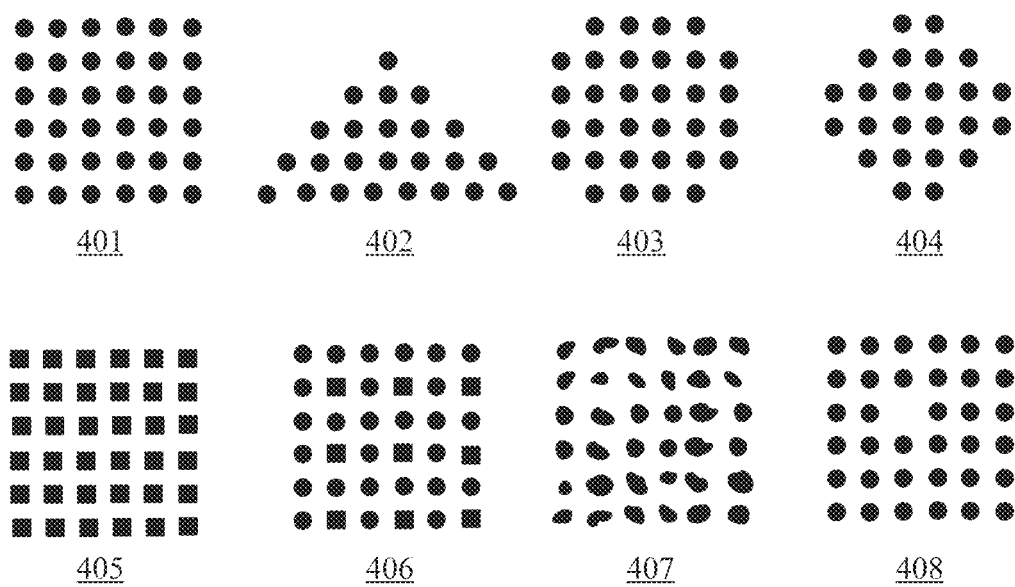
FIG. 4 is a schematic diagram of an example of a speckle lattice according to an embodiment of this application.

Specifically, the infrared light emitted by the infrared projector 101 may include a plurality of light spots. The plurality of light spots may include a plurality of speckle lattice groups. A first speckle lattice group in the plurality of speckle lattice groups includes one or more speckle arrays. The first speckle lattice group is any one of the plurality of speckle lattice groups. The speckle lattice includes a plurality of speckles. FIG. 4 is a schematic diagram of an example of a plurality of speckle lattices according to an embodiment of this application. For example, a speckle lattice 401 shown in FIG. 4 is a speckle lattice including a plurality of circular speckles.

In some embodiments, shapes of a plurality of speckles in a first speckle lattice in the plurality of speckle lattices may be the same. The first speckle lattice is any one of the plurality of speckle lattices. For example, speckles in the speckle lattice 401, a speckle lattice 402, a speckle lattice 403, a speckle lattice 404, and a speckle lattice 408 shown in FIG. 4 are all circular. All speckles in a speckle lattice 405 shown in FIG. 4 are rectangular.

In some other embodiments, at least two of a plurality of speckles in a speckle lattice have different shapes. For example, a speckle lattice 406 shown in FIG. 4 includes a circular speckle and a rectangular speckle. A speckle lattice 407 shown in FIG. 4 includes a plurality of speckles of different shapes.

It should be noted that different speckle lattices may have different shapes. For example, as shown in FIG. 4, the speckle lattice 401 is a rectangular speckle lattice, the speckle lattice 402 is a triangular speckle lattice, the speckle lattice 403 is an octagonal speckle lattice, and the speckle lattice 404 is another octagonal speckle lattice. Because the speckle lattice 401, the speckle lattice 402, the speckle lattice 403, and the speckle lattice 404 have different shapes, the speckle lattice 401, the speckle lattice 402, the speckle lattice 403, and the speckle lattice 404 are different speckle lattices.

In different speckle lattices, at least one of a quantity of speckles, a shape of a speckle, and a shape of a speckle lattice is different. For example, although the speckle lattice 401 and the speckle lattice 408 shown in FIG. 4 have a same shape, the speckle lattice 401 and the speckle lattice 408 include different quantities of speckles (the speckle lattice 401 includes one more speckle than the speckle lattice 408). Therefore, the speckle lattice 401 and the speckle lattice 408 are different speckle lattices. For example, although the speckle lattice 401 and the speckle lattice 405 shown in FIG. 4 have a same shape and the speckle lattice 401 and the speckle lattice 405 each include a same quantity of speckles, a shape (circular) of a speckle in the speckle lattice 401 is different from a shape (rectangular) of a speckle in the speckle lattice 405. Therefore, the speckle lattice 401 and the speckle lattice 405 are different speckle lattices. For another example, although speckles included in the speckle lattice 402 and the speckle lattice 404 shown in FIG. 4 have a same shape and the two speckle lattices each include a same quantity of speckles, a shape (triangular) of the speckle lattice 402 is different from a shape (octagonal) of the speckle lattice 404. Therefore, the speckle lattice 402 and the speckle lattice 404 are different speckle lattices.

FIG. 4 is merely an example schematic diagram of an example of some speckle lattices. Speckle lattices in the plurality of light spots in the infrared light include but are not limited to the speckle lattices shown in FIG. 4.

Figure 5:
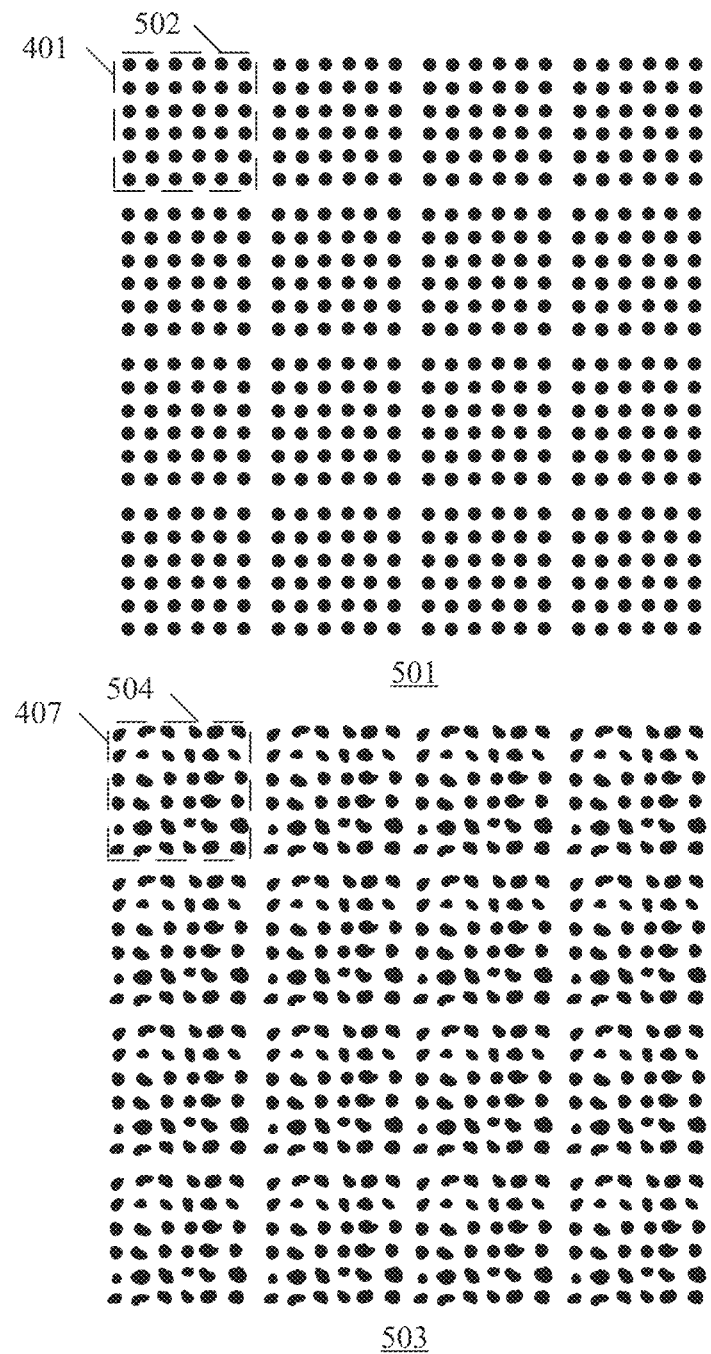
FIG. 5 is a schematic diagram 1 of an example of a spot in infrared light and a speckle lattice group in the spot according to an embodiment of this application.

In some embodiments, the plurality of light spots include a plurality of same speckle lattice groups. Each speckle lattice group includes one speckle lattice. For example, it is assumed that the infrared light emitted by the infrared projector 101 has a plurality of light spots 501 shown in FIG. 5. The plurality of light spots 501 include a plurality of same speckle lattice groups 502. The speckle lattice group 502 includes one speckle lattice 401. For another example, it is assumed that the infrared light emitted by the infrared projector 101 has a plurality of light spots 503 shown in FIG. 5. The plurality of light spots 503 include a plurality of same speckle lattice groups 504. The speckle lattice group 504 includes one speckle lattice 407.

In some other embodiments, the plurality of light spots include a plurality of same speckle lattice groups. Each speckle lattice group includes a plurality of speckle lattices. At least two of the plurality of speckle lattices are different.

Figure 6A:
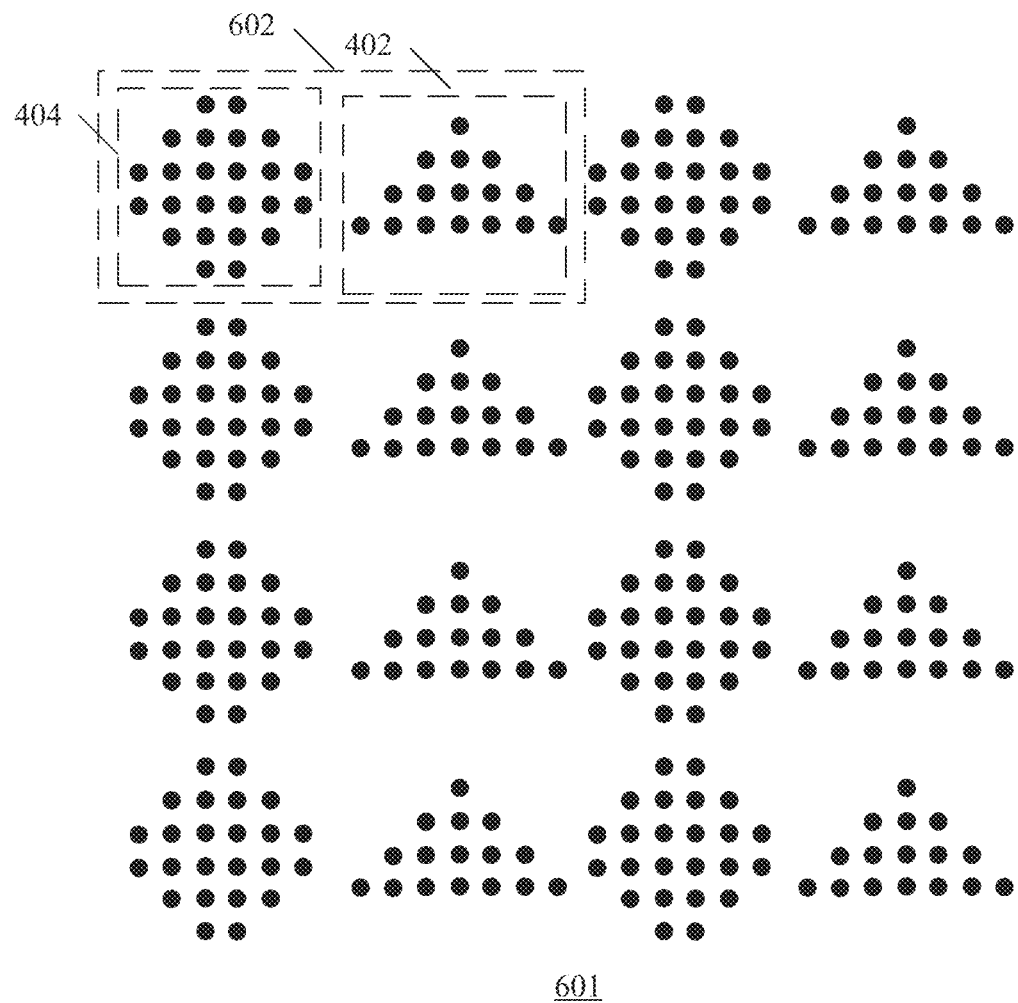
FIG. 6A is a schematic diagram 2 of an example of a spot in infrared light and a speckle lattice group in the spot according to an embodiment of this application.

For example, it is assumed that the infrared light emitted by the infrared projector 101 has a plurality of light spots 601 shown in FIG. 6A. The plurality of light spots 601 include a plurality of same speckle lattice groups 602. The speckle lattice group 602 includes a speckle lattice 402 and a speckle lattice 404. The speckle lattice 402 is different from the speckle lattice 404.

Figure 6B:
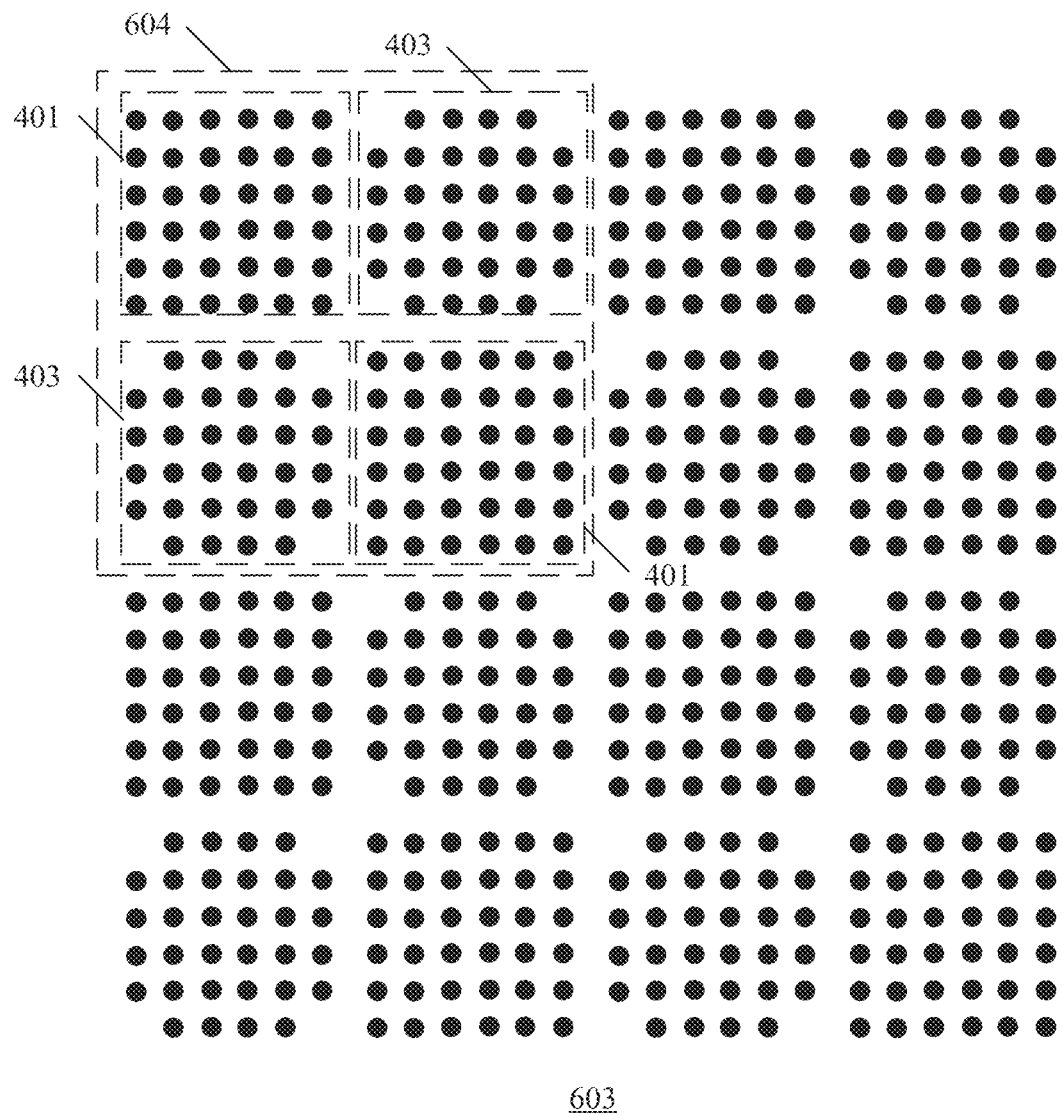
FIG. 6B is a schematic diagram 3 of an example of a spot in infrared light and a speckle lattice group in the spot according to an embodiment of this application.

For another example, it is assumed that the infrared light emitted by the infrared projector 101 has a plurality of light spots 603 shown in FIG. 6B. The plurality of light spots 603 include a plurality of same speckle lattice groups 604. The speckle lattice group 604 includes two speckle lattices 401 and two speckle lattices 403. The speckle lattices 401 are different from the speckle lattices 403.

Figure 6C:
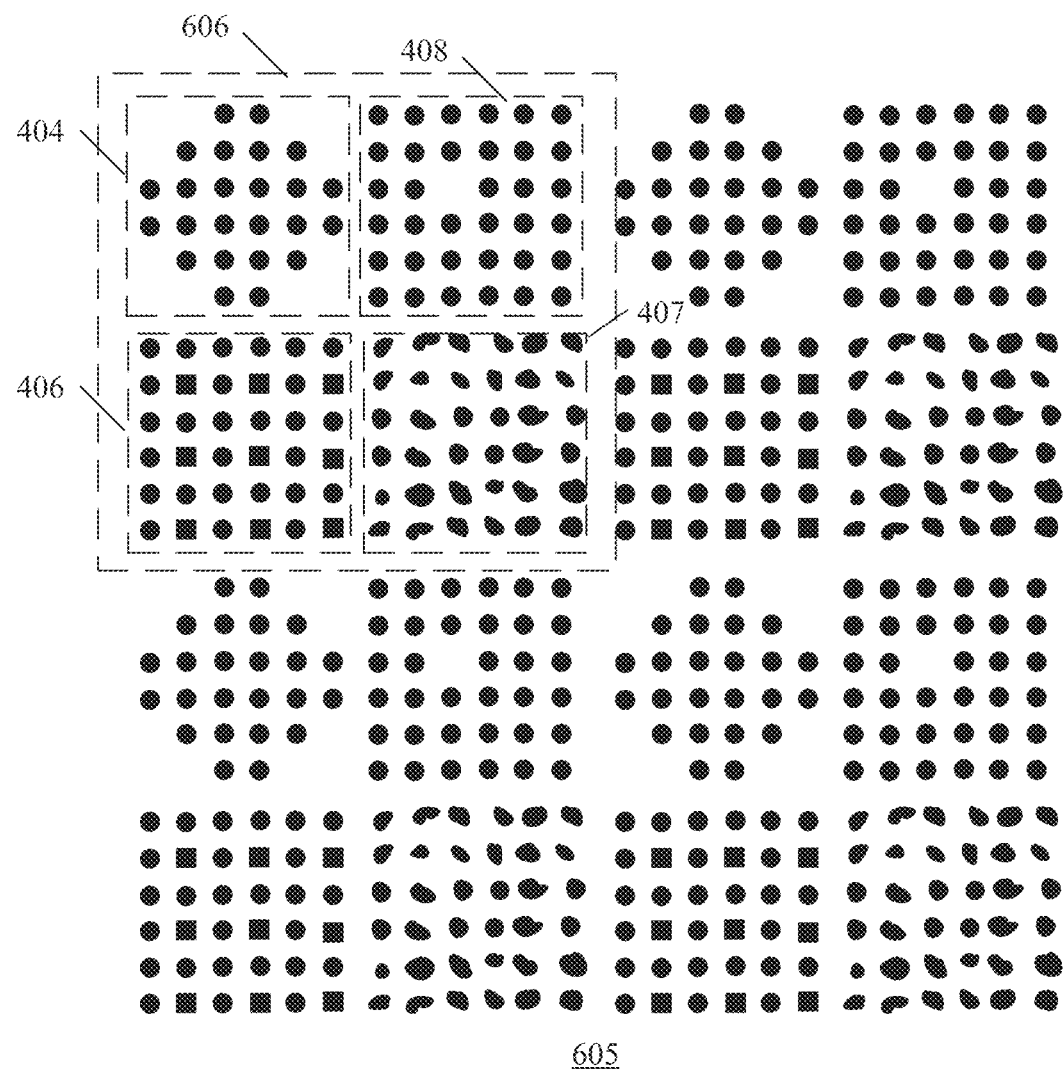
FIG. 6C is a schematic diagram 4 of an example of a spot in infrared light and a speckle lattice group in the spot according to an embodiment of this application.

For another example, it is assumed that the infrared light emitted by the infrared projector 101 has a plurality of light spots 605 shown in FIG. 6C. The plurality of light spots 605 include a plurality of same speckle lattice groups 606. The speckle lattice group 606 includes a speckle lattice 404, a speckle lattice 408, a speckle lattice 406, and a speckle lattice 407. The speckle lattice 404, the speckle lattice 408, the speckle lattice 406, and the speckle lattice 407 are different from each other.

Figure 7A:
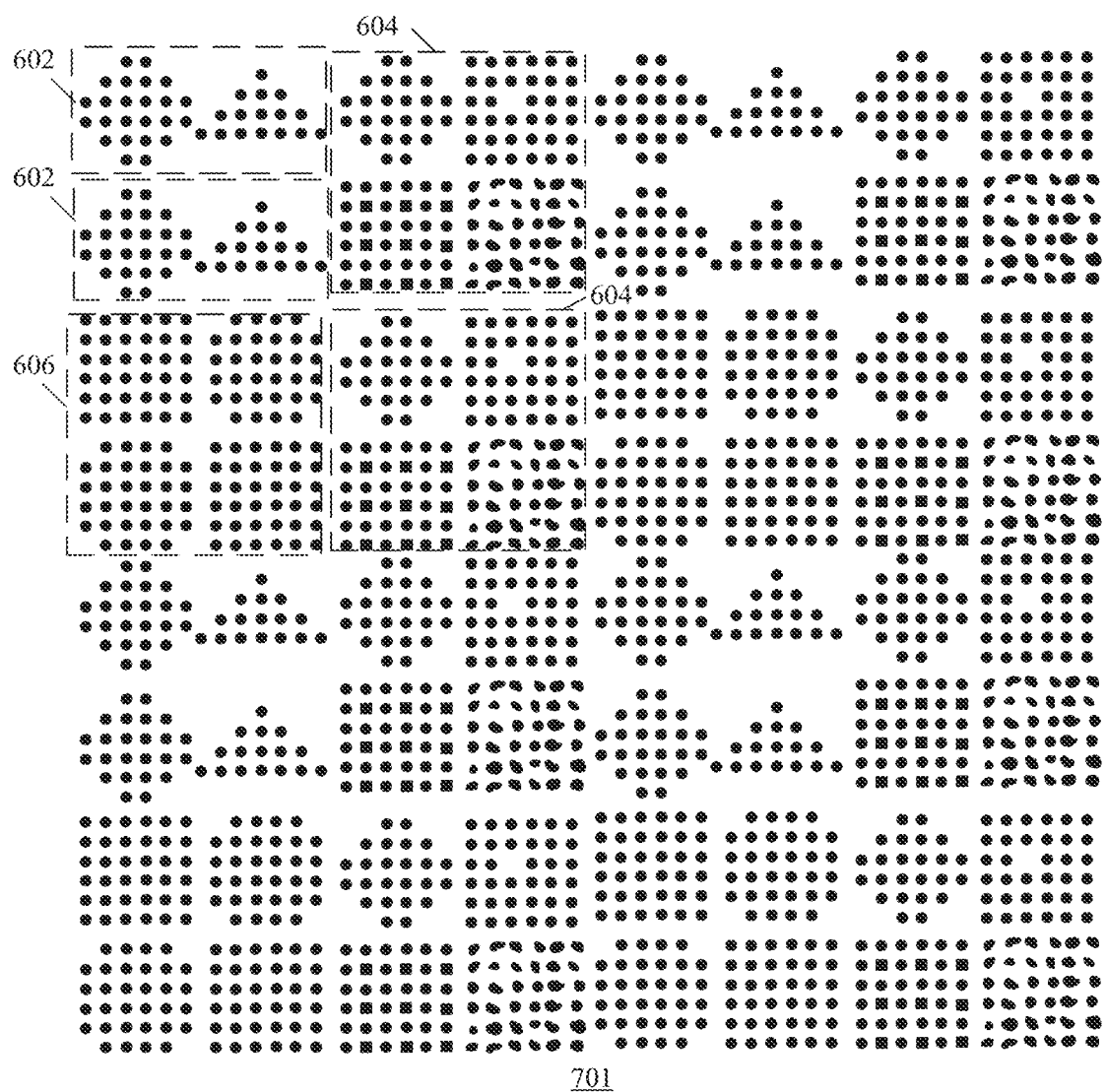
FIG. 7A is a schematic diagram 5 of an example of a spot in infrared light and a speckle lattice group in the spot according to an embodiment of this application.

In some other embodiments, the plurality of light spots include a plurality of speckle lattice groups. The plurality of speckle lattice groups include at least two different speckle lattice groups. For example, it is assumed that the infrared light emitted by the infrared projector 101 has a plurality of light spots 701 shown in FIG. 7A. The plurality of light spots 701 include a plurality of different speckle lattice groups, for example, a speckle lattice group 602, a speckle lattice group 604, and a speckle lattice group 606.

Figure 7B:
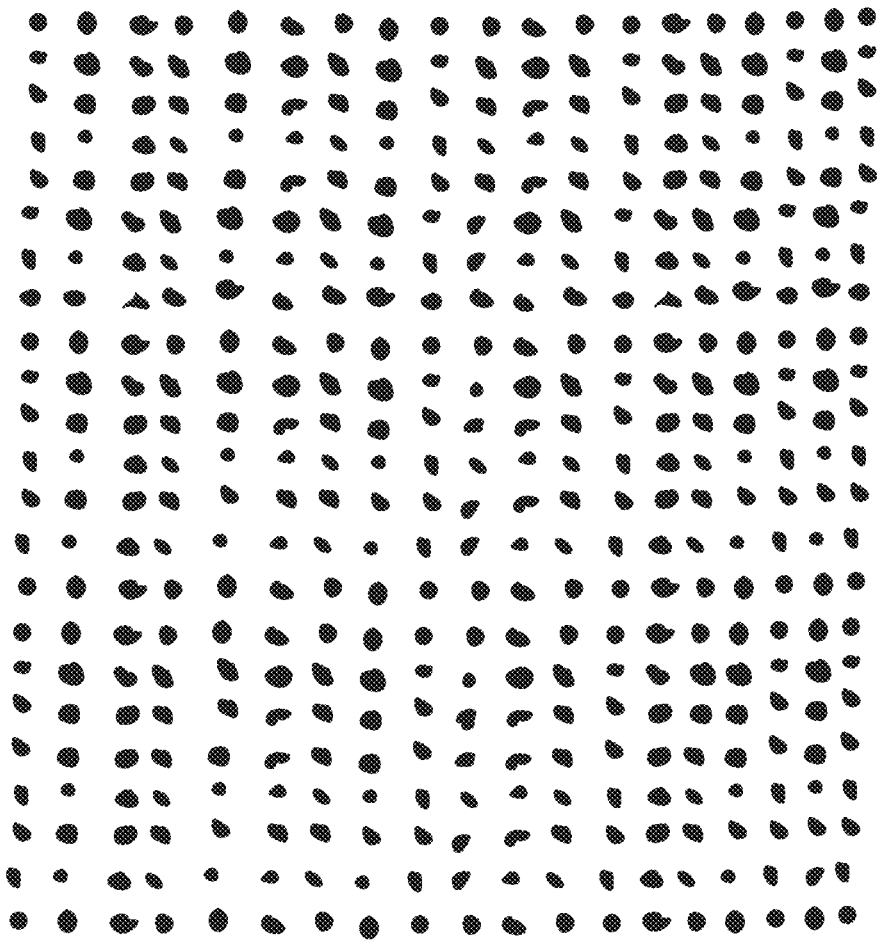
FIG. 7B is a schematic diagram of an example of a spot in infrared light according to an embodiment of this application.

In some other embodiments, the plurality of light spots include a plurality of speckles of different shapes. The plurality of speckles of different shapes are randomly arranged. For example, as shown in FIG. 7B, a plurality of light spots 702 include a plurality of speckles of different shapes.

It should be noted that FIG. 5, FIG. 6A, FIG. 6B, FIG. 6C, or FIG. 7A is merely an example schematic diagram of an example of the plurality of light spots in the infrared light. A quantity of speckle lattices in the plurality of light spots in the infrared light is not limited to the quantity of speckle lattices shown in FIG. 5, FIG. 6A, FIG. 6B, FIG. 6C, or FIG. 7A.

Generally, a quantity of speckles in the infrared light emitted by the infrared transmitter 101 is approximately 3000. Certainly, a larger quantity of speckles in the infrared light emitted by the infrared transmitter 101 indicates a larger increase in a quantity of features of the first object when the infrared light is irradiated onto the first object, and more convenience for the electronic device 100 to calculate the depth information of the first object. For example, depth information of the first object that is calculated by the electronic device 100 when the quantity of speckles in the infrared light emitted by the infrared transmitter 101 is approximately 7000 is more accurate than depth information of the first object that is calculated by the electronic device 100 when the quantity of speckles is approximately 3000.

It can be understood that, when speckle lattice groups in the infrared light emitted by the infrared transmitter 101 are periodically repeated, texture features formed when the infrared light is irradiated onto the first object are also repeated. In this embodiment of this application, repetition frequency of speckle lattices may be represented by a quantity of same speckle lattices that appear in a preset area. A larger quantity of same speckle lattice groups that appear in the preset area indicates higher repetition frequency of speckle lattices and a smaller repetition interval of the speckle lattices. In this case, a feature matching error easily occurs when the electronic device 100 recognizes a same feature in the image information collected by the first camera 102 and the image information collected by the second camera 103. In this embodiment of this application, feature matching means recognizing a same feature in the image information collected by the first camera 102 and the image information collected by the second camera 103. A smaller quantity of same speckle lattice groups that appear in the preset area indicates lower repetition frequency of speckle lattices and a larger repetition interval of the speckle lattices.

Figure 7C:
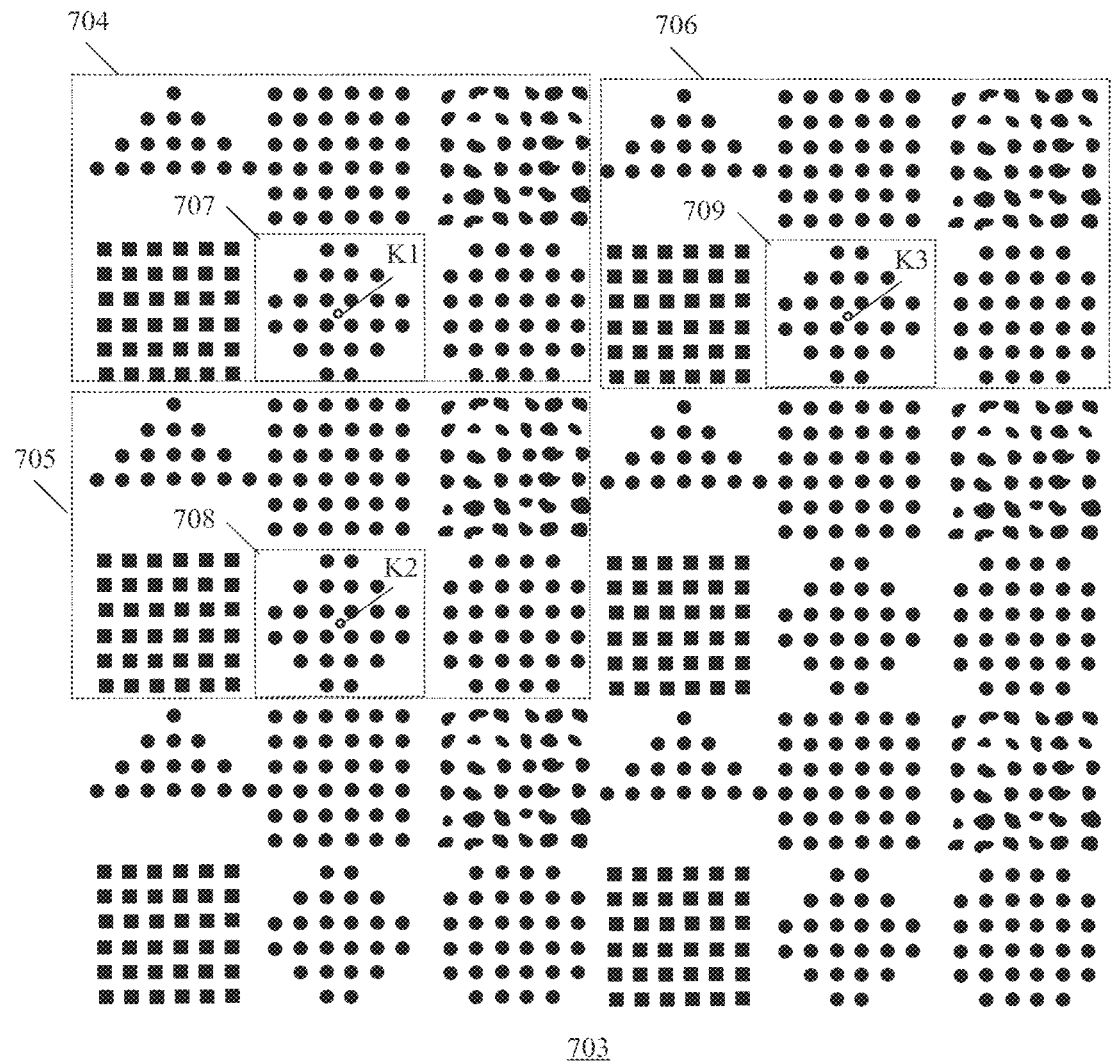
FIG. 7C is a schematic diagram 6 of an example of a spot in infrared light and a speckle lattice group in the spot according to an embodiment of this application.

The repetition interval, reflected on an image, of speckle lattices is a shortest distance between two same speckle lattices. For example, a distance between two speckle lattices may be a distance between center points of the two speckle lattices. For example, as shown in FIG. 7C, a plurality of light spots 703 includes a plurality of repeated speckle lattice groups, for example, a speckle lattice group 704, a speckle lattice group 705, and a speckle lattice group 706. The speckle lattice group 704, the speckle lattice group 705, and the speckle lattice group 706 are the same. A point K1 is a center point of a speckle lattice 707 in the speckle lattice group 704. A point K2 is a center point of a speckle lattice 708 in the speckle lattice group 705. A point K3 is a center point of a speckle lattice 709 in the speckle lattice group 706. A repetition interval of speckle lattices shown in FIG. 7C may be represented by a shortest distance of a distance between the point K1 and the point K2 and a distance between the point K1 and the point K3. Because the distance between the point K1 and the point K2 is shorter than the distance between the point K1 and the point K3, the repetition interval of the speckle lattices shown in FIG. 7C may be represented by the distance between the point K1 and the point K2.

In this embodiment of this application, lower repetition frequency of speckle lattices indicates lower repetition of texture features formed when the infrared light is irradiated onto the first object, and higher accuracy of the depth information of the first object that is calculated by the electronic device 100.

The electronic device 100 calculates the depth information of the first object according to a triangulation principle by using a formula $$Z = \frac{f \times T}{d}.$$

To be specific, the depth information of the first object is calculated based on a distance (namely, the first length T) between the first camera 102 and the second camera 103, the lens focal length f of the first camera 102 and the second camera 103, and parallax d.

To ensure that the infrared light with the light spot that is emitted by the infrared projector 101 may be irradiated onto the first object, and the first object onto which the infrared light with the light spot is irradiated can be photographed by the first camera 102 and the second camera 103, in this embodiment of this application, a coverage area of a field of view (field of view, FOV) of the infrared projector 101, a coverage area of an FOV of the first camera 102, and a coverage area of an FOV of the second camera 103 partially or completely overlap. A size of an FOV may represent a field of vision of an optical device (for example, a camera).

A larger overlapping region of the coverage areas of the FOVs of the infrared projector 101, the first camera 102, and the second camera 103 indicates a larger quantity of texture features collected by the first camera 102 and the second camera 103. To make an overlapping region of the coverage areas of the FOVs of the infrared projector 101, the first camera 102, and the second camera 103 relatively large, as shown in FIG. 1A, the infrared projector 101 may be disposed between the first camera 102 and the second camera 103.

It can be understood that the distance (namely, the first length) between the first camera 102 and the second camera 103 also affects a size of the overlapping region. For example, a larger first length indicates a smaller overlapping region of the coverage areas of the FOVs of the first camera 102 and the second camera 103. However, if the first length is excessively small, parallax between the first camera 102 and the second camera 103 for each feature of the first object is also very small, and is close to zero. Therefore, the first length cannot be excessively large or excessively small. If the first length is excessively large or excessively small, accuracy of the depth information calculated by the electronic device 100 is affected.

It is learned from an experiment that when the first length T is any length ranging from 20 mm to 30 mm, the depth information calculated by the electronic device 100 is relatively accurate. Therefore, in this embodiment of this application, the first length T may be any length ranging from 20 mm to 30 mm. For example, the first length T may be 29.5 mm. It should be noted that how to set the distance between the two cameras may be affected by a camera parameter. Therefore, that the first length T is 20 mm to 30 mm is merely an example.

After the infrared projector 101 emits the infrared light with the light spot, if the first camera 102 and the second camera 103 are required to be able to collect image information including the light spot, the first camera 102 and the second camera 103 are required to be able to receive the infrared light. For example, the first camera 102 and the second camera 103 may be configured to receive 890 nm-990 nm infrared light, for example, 940 nm infrared light.

It can be learned from the foregoing descriptions that, in this embodiment of this application, the first camera 102 and the second camera 103 are required to be able to sense infrared light (that is, receive infrared light). However, a common RGB camera can sense only visible light, but cannot sense infrared light. Whereas, costs of disposing an infrared camera with an infrared light sensing function in the electronic device 100 are relatively high, and use of the infrared camera increases power consumption of the electronic device 100.

To reduce hardware costs of the electronic device 100 and reduce power consumption of the electronic device 100, in this embodiment of this application, a common RGB camera may be improved to obtain the first camera 102 and the second camera 103 that can sense infrared light.

Figure 8A:
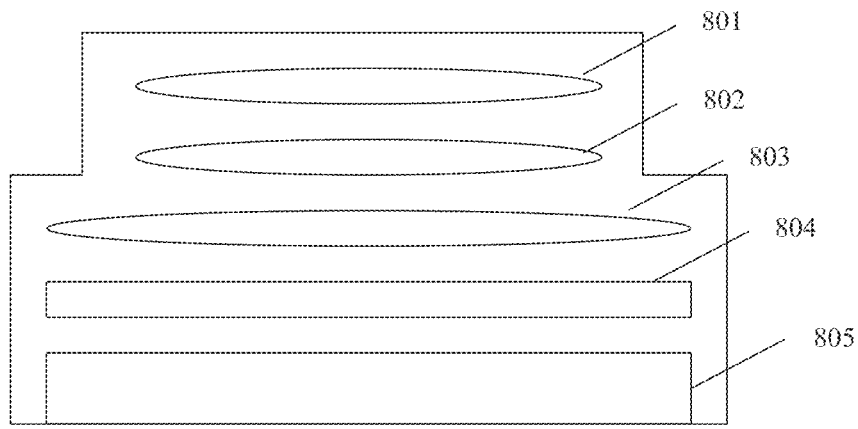
FIG. 8(a) and FIG. 8(b) are a schematic structural diagram of a dual-pass camera module according to an embodiment of this application.

FIG. 8(a) is a schematic structural diagram of a common RGB camera module according to an embodiment of this application. As shown in FIG. 8(a), in this embodiment of this application, a rolling shutter camera is used as an example to describe a manner of improving a common RGB camera to obtain the first camera 102 and the second camera 103 in this embodiment of this application.

Figure 8B:
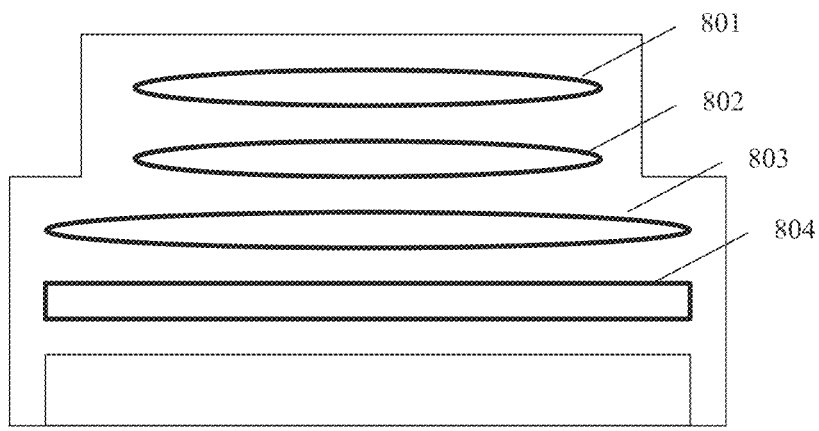

As shown in FIG. 8(*a*), an RGB camera module 800 may include a 3P lens, a light filter (also referred to as a filter) 804, and a sensor (sensor) 805. The 3P lens means that the RGB camera includes three lenses: a lens 801, a lens 802, and a lens 803. The sensor 805 may be a 2M sensor. 2M means that a highest resolution of the RGB camera can reach 2 megapixels.

To enable the RGB camera module 800 shown in FIG. 8(*a*) to sense both visible light and infrared light, the RGB camera module 800 shown in FIG. 8(*a*) may be improved as follows: An antireflection coating is plated on each of two sides of each lens (for example, the lens 801, the lens 802, and the lens 803) of the RGB camera module 800 shown in FIG. 8(*a*), to obtain a lens 801, a lens 802, and a lens 803 shown in FIG. 8(*b*). A cut-off coating is plated on the light filter 804, to obtain a light filter 804 shown in FIG. 8(*b*). In this embodiment of this application, the sensor 805 in the RGB camera module 800 may not be improved. In this embodiment of this application, a cut-off coating may be plated on each of two sides of the light filter 804; or a cut-off coating may be plated on one side of the light filter 804.

It should be noted that, to enable the first camera 102 and the second camera 103 to sense the infrared light emitted by the infrared projector 101, the first camera 102 and the second camera 103 need to have a capability of sensing the infrared light emitted by the infrared projector 101. Therefore, the antireflection coating may be an antireflection coating corresponding to a wavelength of the infrared light emitted by the infrared projector 101. For example, the antireflection coating may be an antireflection coating for 890 nm-990 nm infrared light, for example, an antireflection coating for 940 nm infrared light.

The antireflection coating is plated on each of the two sides of each lens (for example, the lens 801, the lens 802, and the lens 803), so that the capability of the lens 801, the lens 802, and the lens 803 to sense the infrared light emitted by the infrared projector 101 can be improved, and the lens 801, the lens 802, and the lens 803 can receive, as much as possible, the infrared light emitted by the infrared projector 101.

The cut-off coating may be used to filter out light other than the infrared light emitted by the infrared projector 101 and visible light, and increase a transmittance of the infrared light.

For example, the cut-off coating may be used to filter out infrared light with a wavelength of 850 nm. It can be understood that, because the infrared light with the wavelength of 850 nm has a prominent red light feature, a severe infrared exposure phenomenon may occur. Therefore, the cut-off coating is used to filter out the infrared light with the wavelength of 850 nm, so that a possibility of occurrence of an infrared exposure phenomenon can be reduced. The infrared exposure phenomenon is a problem of incomplete light filtering. For example, sometimes, only infrared light (namely, an infrared ray) may be expected to be used for lighting, and therefore a filter may be added to a light source to filter out light other than the infrared ray. In this case, a small amount of infrared light may still be visible to human eyes due to incomplete light filtering. This phenomenon is referred to as the infrared exposure phenomenon.

In this embodiment of this application, the common RGB camera to be improved includes but is not limited to the foregoing rolling shutter camera. A reason for improving the rolling shutter camera to obtain the foregoing first camera is that exposure of the rolling shutter camera is performed line by line, and costs are relatively low. In this embodiment of this application, the rolling shutter camera is improved to obtain the first camera 102 and the second camera 103, so that costs can be further reduced.

S203. The electronic device 100 calculates the depth information of the first object based on the first image information, the second image information, the first length, and the lens focal length.

It can be learned from the foregoing formula $$Z = \frac{f \times T}{d}$$

that a depth Z of a point at which each feature of the first object is located is inversely proportional to parallax d between the first camera 102 and the second camera 103 for the point, the depth Z of the point at which each feature is located is directly proportional to the lens focal length f, and the depth Z of the point at which each feature is located is directly proportional to the first length T.

The first length T and the lens focal length f are hardware parameters of the first camera 102 and the second camera 103. The first length T and the lens focal length f are fixed. In this case, a value of the depth Z of each point of the first object depends on a value of the parallax d between the first camera 102 and the second camera 103 for the point.

For example, as shown in FIG. 10A-1, it is assumed that the first camera 102 is a left-side dual-pass camera, and the second camera 13 is a right-side dual-pass camera. A smiling face, a triangle, a cylinder, and a crescent moon separately represent different features of the first object. Distances from locations of the smiling face, the triangle, the cylinder, and the crescent moon to the cameras gradually increase. As shown in FIG. 10A-2, $O^L$ is a location of the first camera 102, $O^R$ is a location of the second camera 103, and a distance between $O^L$ and $O^R$ is T (namely, the first length).

As shown in FIG. 10A-2, the first camera 102 collects an image A, and the second camera 103 collects an image B. A coordinate of the crescent moon on an x-axis of a coordinate system with $O_1$ (an upper left corner of the image A) as an origin (which is referred to as a coordinate system L for short) is $x_{L1}$, a coordinate of the cylinder on the x-axis of the coordinate system L is $x_{L2}$, a coordinate of the triangle on the x-axis of the coordinate system L is $x_{L3}$, and a coordinate of the smiling face on the x-axis of the coordinate system L is $x_{L4}$. A coordinate of the crescent moon on an x-axis of a coordinate system with $O_r$ (an upper left corner of the image B) as an origin (which is referred to as a coordinate system R for short) is $x_{R1}$, a coordinate of the cylinder on the x-axis of the coordinate system R is $x_{R2}$, a coordinate of the triangle on the x-axis of the coordinate system R is $x_{R3}$, and a coordinate of the smiling face on the x-axis of the coordinate system R is $x_{R4}$.

Parallax between the first camera 102 and the second camera 103 for the crescent moon is d1, and $d1=x_{L1}-x_{R1}$. Parallax between the first camera 102 and the second camera 103 for the cylinder is d2, and $d2=x_{L2}-x_{R2}$. Parallax between the first camera 102 and the second camera 103 for the triangle is d3, and $d3=x_{L3}-x_{R3}$. Parallax between the first camera 102 and the second camera 103 for the smiling face is d4, and $d4=x_{L4}-x_{R4}$.

In this embodiment of this application, the smiling face shown in FIG. 10A-2 is used as an example herein to describe the parallax d4 ($d4=x_{L4}-x_{R4}$) between the first camera 102 and the second camera 103 for the smiling face.

Figure 10B:
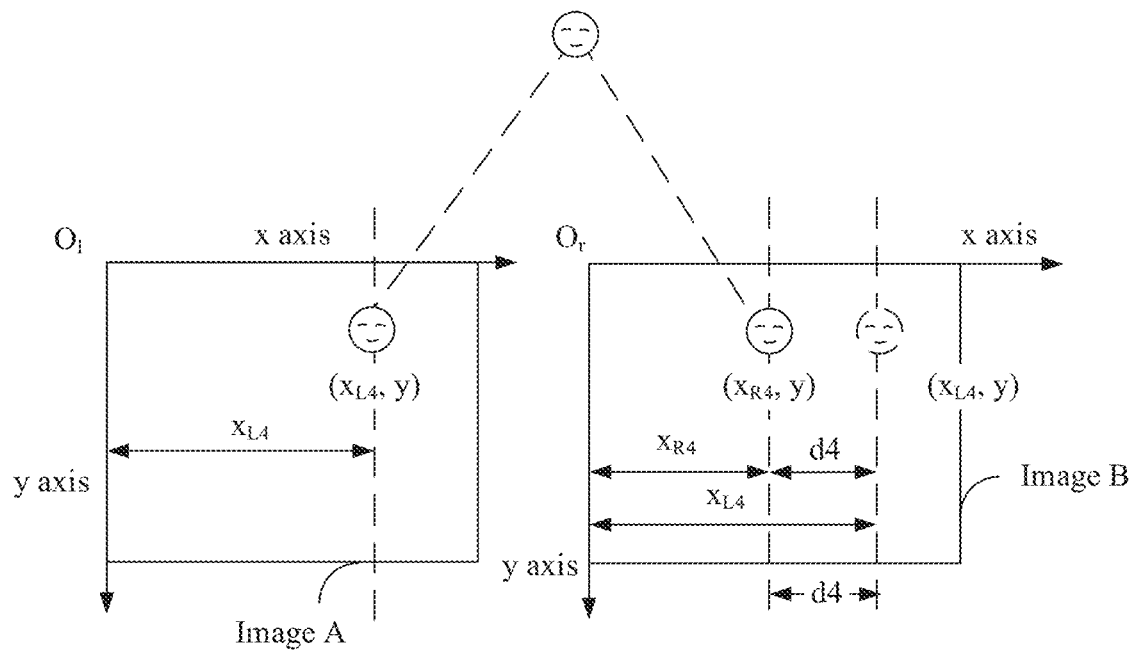
FIG. 10B is a schematic diagram of a principle of calculating parallax according to an embodiment of this application.
Figure 10C:
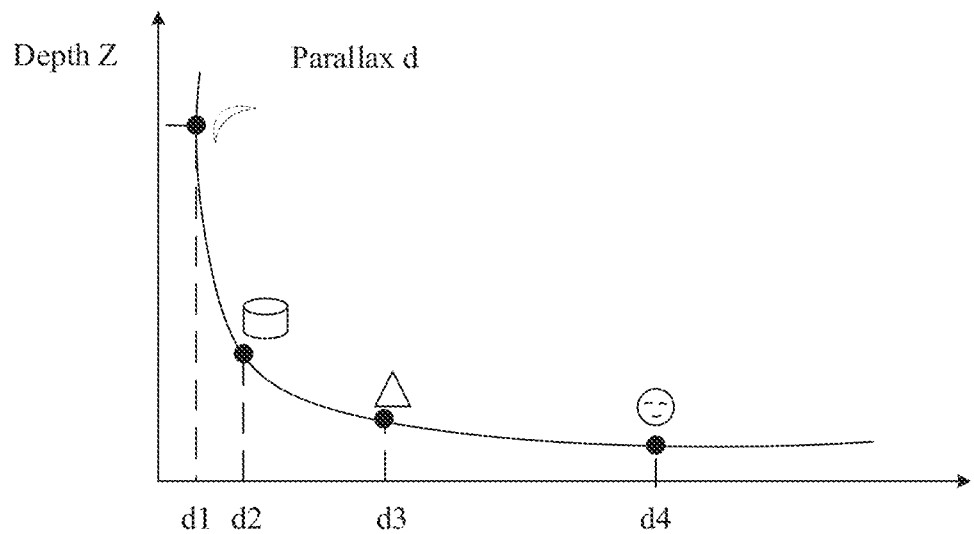
FIG. 10C is a schematic diagram of a relationship between parallax and a depth according to an embodiment of this application.

As shown in FIG. 10B, coordinates of the smiling face collected by the first camera 102 in a coordinate system of the image A are ($x_{L4}$, y), and coordinates of the smiling face collected by the second camera 103 in a coordinate system of the image B are ($x_{R4}$, y). As shown in FIG. 10B, a difference between the coordinates ($x_{L4}$, y) and the coordinates ($x_{R4}$, y) on an x-axis is d4, where $d4=x_{L4}-x_{R4}$, that is, the parallax d4 between the first camera 102 and the second camera 103 for the smiling face is equal to $x_{L4}-x_{R4}$.

d1<d2<d3<d4. The depth Z of each feature (namely, the point at which the feature is located) of the first object is inversely proportional to the parallax d between the first camera 102 and the second camera 103 for the point. Therefore, a schematic diagram of a relationship between the parallax d and the depth z may be obtained, as shown in FIG. 10C. As shown in FIG. 10C, as the parallax d gradually increases, the depth z gradually decreases.

Figure 9:
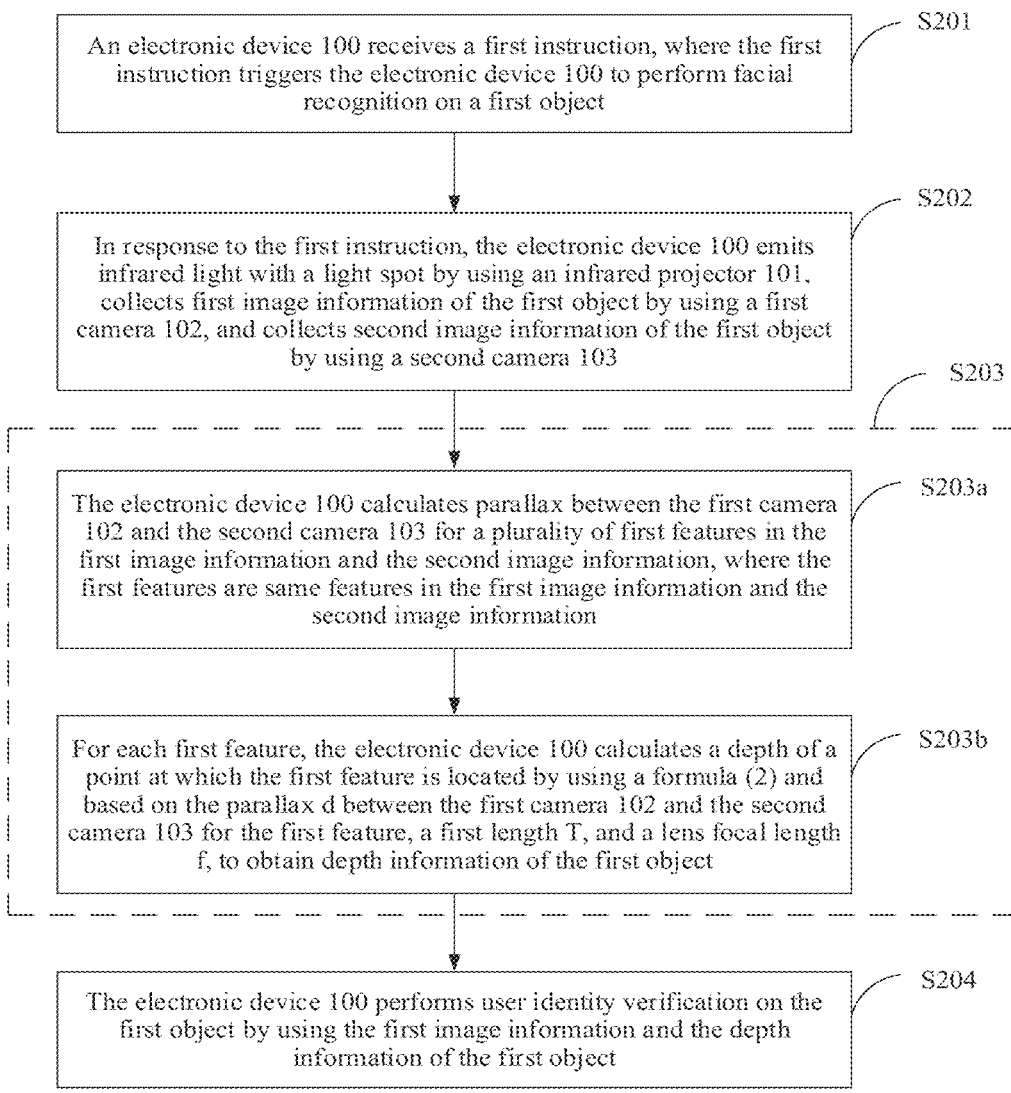
FIG. 9 is a flowchart 2 of a facial recognition method according to an embodiment of this application.

To sum up, the electronic device 100 may first calculate parallax d between the first camera 102 and the second camera 103 for a feature of the first object; then calculate a depth Z of a point at which the feature is located based on the parallax d of the feature, the first length T, and the lens focal length f; and then obtain the depth information of the first object based on depths of a plurality of points. Specifically, as shown in FIG. 9, S203 shown in FIG. 2 may include S203a and S203b.

S203a. The electronic device 100 calculates parallax between the first camera 102 and the second camera 103 for a plurality of first features in the first image information and the second image information, where the first features are same features in the first image information and the second image information.

Figure 11A:
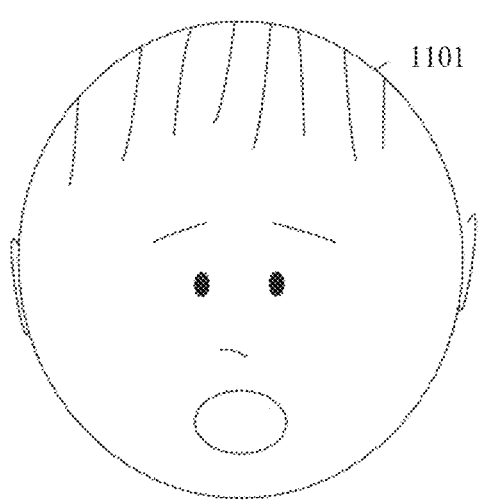
FIG. 11(a) to FIG. 11(c) are a schematic diagram of an example of a first object and infrared light with a light spot according to an embodiment of this application.
Figure 11B:
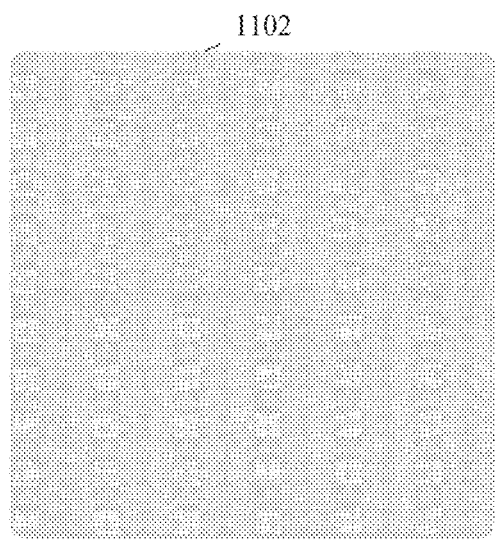
Figure 11C:
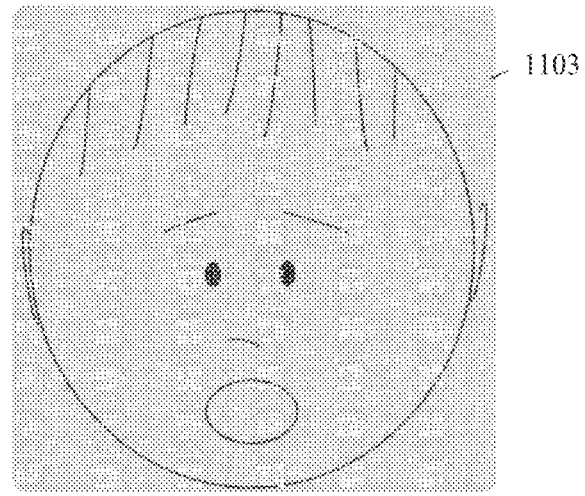

A quantity of texture features of the first object may be increased when the infrared light with the light spot that is emitted by the infrared transmitter 101 is irradiated onto the first object. For example, it is assumed that the first object is a face 1101 shown in FIG. 11(a), and infrared light 1102 shown in FIG. 11(b) that is emitted by the infrared transmitter 101 includes a light spot shown in FIG. 7C. After the infrared light 1102 emitted by the infrared transmitter 101 is irradiated onto the face 1101, a face 1103 onto which the light spot is irradiated may be obtained, as shown in FIG. 11(c). Compared with the face 1101, the face 1103 onto which the light spot is irradiated has more feature textures.

A difference lies in that, points at which same features in image information of the face 1103 collected by the first camera 102 (namely, the first image information) and image information of the face 1103 collected by the second camera 103 (namely, the second image information) are located are at different locations on an x-axis of a coordinate system, that is, the first camera 102 and the second camera 103 have parallax.

The electronic device 100 may recognize the first image information collected by the first camera 102 and the second image information collected by the second camera 103, and determine same features in the first image information and the second image information. The same features in the first image information and the second image information may include the feature of the first object and the texture feature formed when the infrared light with the light spot is irradiated onto the first object. To be specific, in this embodiment of this application, when recognizing the same feature in the first image information and the second image information, the electronic device 100 not only can recognize a same feature of the first object in the first image information and the second image information, but also can recognize a same feature that is in the first image information and the second image information and that is among texture features formed when the infrared light with the light spot is irradiated onto the first object. That is, when recognizing the same feature in the two pieces of image information, the electronic device 100 may perform determining based on the feature of the first object or the texture feature, or may perform determining by combining the two features. For example, if determining can be performed based on only the feature of the first object or only the texture feature, the two features do not need to be combined. Alternatively, when it is difficult or impossible to determine, based on the feature of the first object, whether a feature is a same feature, it may be determined, based on both the texture feature and the feature of the first object, whether the feature is a same feature.

In relatively strong visible light in the daytime, the texture feature formed when the infrared light with the light spot is irradiated onto the first object is almost invisible in the image information collected by the first camera 102 and the second camera 103. However, because the visible light is relatively strong, the feature of the first object is relatively prominent when the visible light is irradiated onto the first object. In this case, when recognizing a same feature in the two pieces of image information, the electronic device 100 may perform determining based on the feature of the first object.

It should be noted that, although speckles in the foregoing speckle lattice may have a same shape (for example, the speckle lattice includes a plurality of dots), locations of the speckles in the speckle lattice are different. Therefore, the electronic device 100 may recognize, based on the speckle lattice and the locations of the speckles in the speckle lattice, a same feature represented by speckles of a same shape in the first image information and the second image information.

In some embodiments, the plurality of first features include all same features in the first image information and the second image information. The electronic device 100 may recognize all the same features in the first image information and the second image information, and then perform S203b for each feature to calculate a depth of the feature, to obtain the depth information of the first object.

In some other embodiments, the plurality of first features are some of same features in the first image information and the second image information. In this embodiment, the electronic device 100 may select a plurality of first features from the first image information based on preset feature frequency, then search the second image information for features that are the same as the plurality of first features, and finally perform S203b for each first feature to calculate a depth of the first feature, to obtain the depth information of the first object.

The feature frequency may be a quantity of same first features that appear in a preset area. The feature frequency, reflected on an image, may be a distance (referred to as a feature distance) between two adjacent first features selected by the electronic device 100. A method for selecting, by the electronic device 100, the plurality of first features from the first image information based on the preset feature frequency may include: The electronic device 100 selects one first feature from all features in the first image information at an interval of one feature distance. Alternatively, the electronic device 100 may select some first features from the first image information randomly or at an interval.

In other words, the electronic device 100 does not need to calculate a depth of a point at which each of same features in the first image information and the second image information is located, but selects one feature at an interval of one feature distance, and calculates a depth of a point at which the selected feature is located.

For example, in this embodiment of this application, the foregoing periodic feature is described herein by using the texture feature that is in the first image information and the second image information and that is formed when the infrared light with the light spot is irradiated onto the first object as an example.

Figure 12:
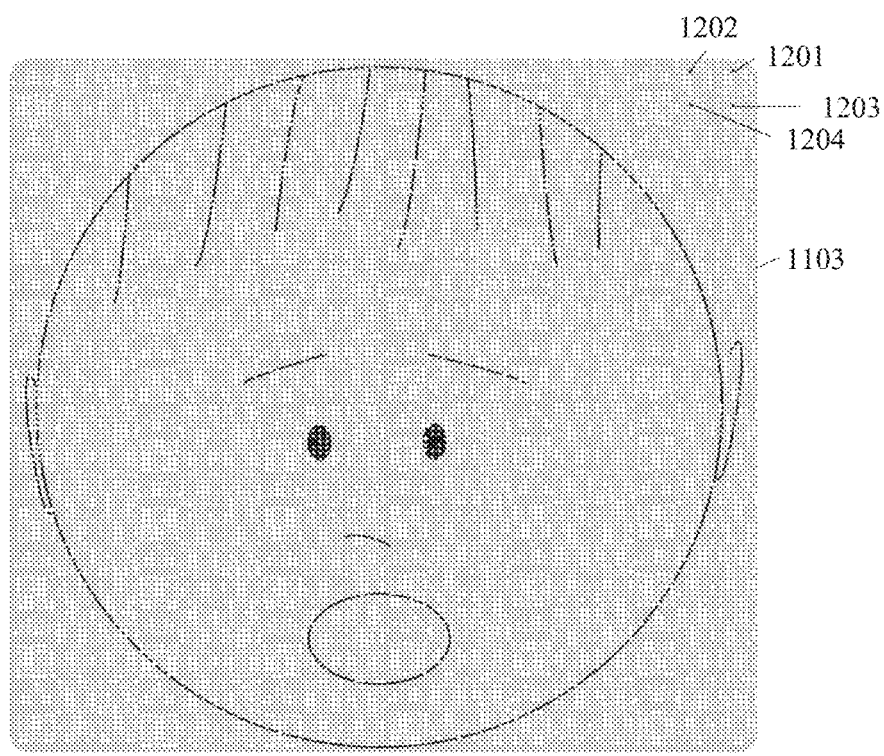
FIG. 12 is a schematic diagram of an example of feature frequency according to an embodiment of this application.

As shown in FIG. 12, the feature distance may be a distance between a speckle 1201 and a speckle 1202, or a distance between the speckle 1202 and a speckle 1204, or a distance between the speckle 1204 and a speckle 1203, or a distance between the speckle 1201 and the speckle 1203. As shown in FIG. 12, in this embodiment of this application, a manner of marking speckles black is used to show some first features in texture features formed when the infrared light with the light spot is irradiated onto the first object. In other words, speckles marked black shown in FIG. 12 are some first features.

Some speckles in a speckle lattice may have a same shape (for example, the speckle lattice includes a plurality of dots). Although the electronic device 100 may distinguish between different speckles based on locations of the speckles in the speckle lattice, it takes a relatively long time for the electronic device 100 to distinguish between different speckles based on the locations of the speckles in the speckle lattice, and power consumption of the electronic device 100 is wasted. The feature distance used when the electronic device 100 selects the first feature may be less than or equal to a repetition interval of the speckle lattices in the plurality of light spots. In other words, the feature frequency is greater than or equal to the repetition frequency of the speckle lattices in the plurality of light spots. In this way, it can be ensured that two adjacent first features selected by the electronic device 100 from the first image information correspond to speckles in different speckle lattices, so that the electronic device 100 can distinguish between the two adjacent first features. This can reduce a possibility of a feature matching error, and improve accuracy of the depth information calculated by the electronic device 100.

S203b. For each first feature, the electronic device 100 calculates a depth of a point at which the first feature is located by using a formula (2) and based on the parallax d between the first camera 102 and the second camera 103 for the first feature, the first length T, and the lens focal length f, to obtain the depth information of the first object.

The formula (2) is $$Z = \frac{f \times T}{d}.$$

In this embodiment of this application, the electronic device 100 may emit the infrared light with the light spot by using the infrared projector 101. In this way, images of the first object that are collected by the first camera 102 and the second camera 103 may not only include the feature of the first object, but also include the texture feature formed when the infrared light with the light spot is irradiated onto the first object. That is, a quantity of features in the images of the first object that are collected by the first camera 102 and the second camera 103 can be increased. After the quantity of features in the images of the first object that are collected by the first camera 102 and the second camera 103 is increased, the electronic device 100 can more accurately recognize a same feature in the image information collected by the first camera 102 and the image information collected by the second camera 103, determine parallax between the first camera 102 and the second camera 103 for the same feature, and calculate a depth of a point at which each feature is located, to obtain the depth information of the first object. This can improve accuracy of the depth information of the first object that is calculated by the electronic device 100.

It should be noted that the foregoing embodiments are described by using an example in which the lens focal length of the first camera 102 is the same as that of the second camera 103. However, in another implementation, the lens focal length of the first camera 102 may be alternatively different from that of the second camera 103. When the lens focal lengths of the two cameras are different, the foregoing formula for calculating the depth Z is modified for calculating a depth. A specific calculation formula may be a formula in the prior art.

S204. The electronic device 100 performs user identity verification on the first object by using the first image information and the depth information of the first object.

Further, before the electronic device 100 performs the user identity verification on the first object by using the first image information and the depth information of the first object, the electronic device 100 may first determine whether the first image information includes a face image. For example, as shown in FIG. 1F, the electronic device 100 may perform facial detection in the facial recognition TA 214. If the first image information includes a face image, the electronic device 100 may perform S204. If the first image information does not include a face image, the user identity verification performed by using the first image information fails, and the electronic device 100 may re-collect image information of the first object, instead of continuing to perform the user identity verification by using the first image information. In this way, a calculation amount of the electronic device 100 can be reduced, and power consumption of the electronic device 100 can be reduced.

The electronic device 100 may determine, through positioning of key points, whether the first image information includes a face image. For example, the key points may include features that match features of organs such as a nose, a mouth, and an eye of a person. That is, the electronic device 100 may determine, by determining whether the first image information includes image features of organs such as a nose, a mouth, and an eye of a person, whether the first image information includes a face image.

Further, if the first image information includes a face image, before performing the user identity verification, the electronic device 100 may determine whether a posture of a face displayed in the face image in the first image information meets a preset requirement. For example, the preset requirement may be that the posture of the face displayed in the face image in the first image information is a front face or a side face whose angle with the front face is less than a specific value. Generally, a two-dimensional image that is stored in the electronic device 100 and that is used to perform facial recognition is an image that records the front face or a plurality of side faces whose angles with the front face are less than the specific value. Therefore, the user identity verification performed by the electronic device 100 by using the two-dimensional image that meets the preset requirement may succeed. In this case, the electronic device 100 may perform S204.

If the posture of the face displayed in the face image in the first image information does not meet the preset requirement, the user identity verification performed by using the first image information fails. In this case, the electronic device 100 may re-collect image information of the first object, instead of continuing to use the first image information to perform the user identity verification. In this way, a calculation amount of the electronic device 100 can be reduced, and power consumption of the electronic device 100 can be reduced.

Further, before performing the user identity verification on the first object by using the first image information and the depth information of the first object, the electronic device 100 may further determine whether image quality of the first image information is higher than or equal to a second quality threshold. If the image quality of the first image information is higher than or equal to the second quality threshold, the electronic device 100 may perform S204. If the image quality of the first image information is lower than the second quality threshold, the user identity verification performed by using the first image information fails, and the electronic device 100 may re-collect image information of the first object, instead of continuing to perform the user identity verification by using the first image information. In this way, a calculation amount of the electronic device 100 can be reduced, and power consumption of the electronic device 100 can be reduced.

Figure 13:
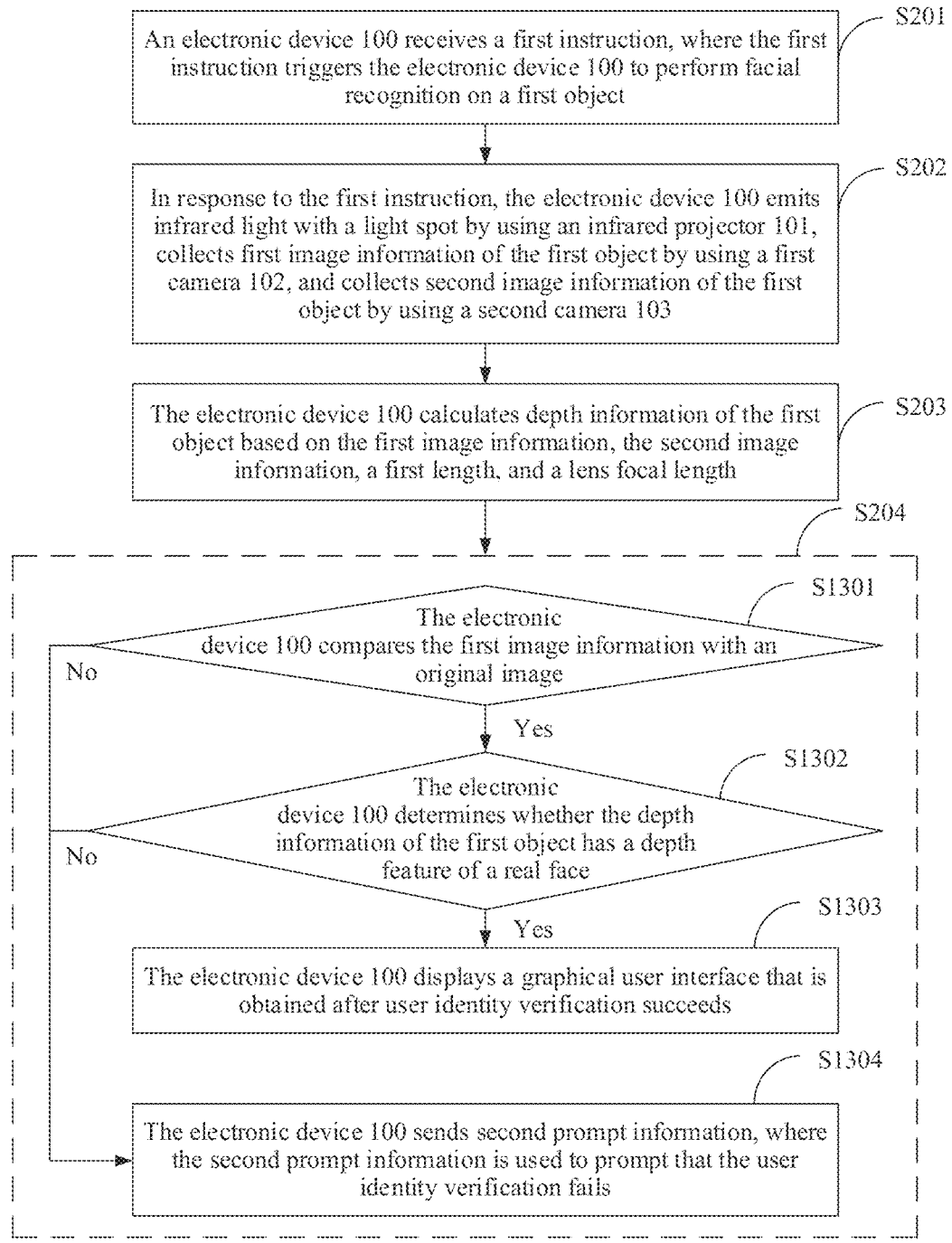
FIG. 13 is a flowchart 3 of a facial recognition method according to an embodiment of this application.

In some embodiments, the facial recognition performed by the electronic device 100 may include two-dimensional image authentication and depth anti-counterfeiting authentication. For example, as shown in FIG. 1F, the facial recognition TA 214 not only includes feature extraction and feature comparison (namely, the two-dimensional image authentication), but also includes liveness detection (for example, the depth anti-counterfeiting authentication). Specifically, as shown in FIG. 13, S204 shown in FIG. 2 may include S1301 to S1304.

S1301. The electronic device 100 compares the first image information with an original image.

The original image is a two-dimensional image that is stored in the electronic device 100 and that is used to perform the user identity verification. For example, the original image may be a facial template in the RPMB 215 shown in FIG. 1F. The electronic device 100 may compare the first image information with the facial template in the RPMB 215 shown in FIG. 1F, to determine whether the first image information matches the facial template.

In some embodiments, the electronic device 100 may perform the feature extraction in the facial recognition TA 214 in FIG. 1F, to extract a facial feature in the first image information. Correspondingly, the facial template in the RPMB 215 shown in FIG. 1F may include a facial feature of the original image recorded by the electronic device 100. The electronic device 100 may compare the facial feature extracted from the first image information with the facial template in the RPMB 215 shown in FIG. 1F, to determine whether the extracted facial feature matches the facial template.

Specifically, if the first image information matches the original image, it indicates that the first image information includes a two-dimensional image of an object (namely, a second object) corresponding to the original image when the electronic device 100 records the original image. In this case, the electronic device 100 may perform the depth anti-counterfeiting authentication on the depth information of the first object. That is, the electronic device 100 may perform S1302.

If the first image information does not match the original image, it indicates that the first image information does not include the two-dimensional image of the second object. In this case, the electronic device 100 may determine that the user identity verification fails, and the electronic device 100 may perform S1304.

S1302. The electronic device 100 determines whether the depth information of the first object has a depth feature of a real face.

A depth map obtained by performing S203 by the electronic device 100 is a depth map including the depth information of the first object (for example, a face). In addition to the depth information of the first object, the depth map further includes depth information of a background. The electronic device 100 may mark depths of the facial feature on the depth map. The electronic device 100 may determine whether the plurality of marked depths of the facial feature (namely, the depth information of the first object) have the depth feature of the real face.

Alternatively, the electronic device 100 may extract depths of the facial feature from the depth map, to obtain a facial depth map. The facial depth map includes a plurality of depths of the facial feature (namely, the depth information of the first object). Then, the electronic device 100 may determine whether the plurality depths of the facial feature have the depth feature of the real face.

If the depth information of the first object has the depth feature of the real face, it indicates that the first object photographed by the electronic device 100 is the real face instead of the photo including the two-dimensional face image, and the electronic device 100 may determine that the user identity verification succeeds. In this case, the electronic device 100 may perform S1303.

If the depth information of the first object does not have the depth feature of the real face, it indicates that the first object photographed by the electronic device 100 is not the real face. The first object may be the photo including the two-dimensional face image. In this case, the electronic device 100 may determine that the user identity verification fails, and the electronic device 100 may perform S1304.

S1303. The electronic device 100 displays a graphical user interface that is obtained after the user identity verification succeeds.

Figure 3C:
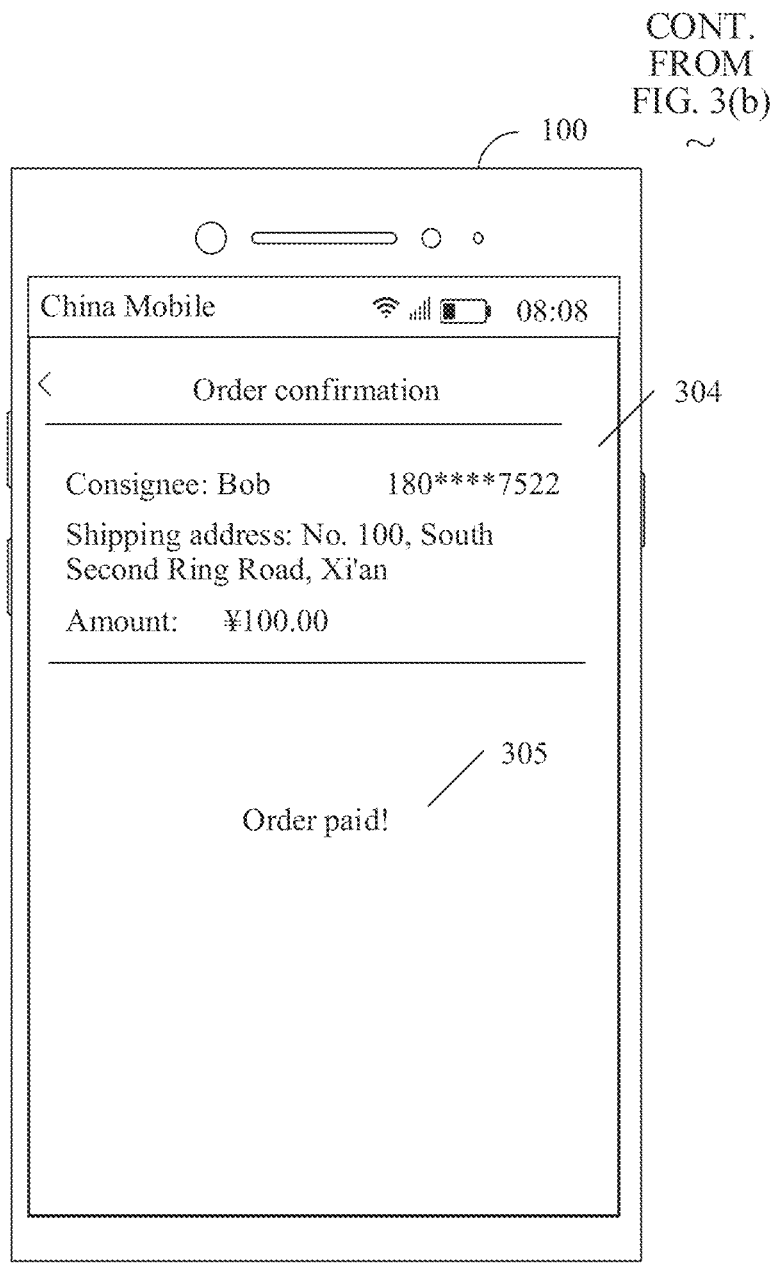

For example, in a face-based unlocking scenario, the electronic device 100 may perform S1303 to display a graphical user interface obtained after the electronic device 100 is unlocked. For example, when the electronic device 100 is a mobile phone, after the user identity verification succeeds, the mobile phone may display a home screen (namely, a desktop) of the mobile phone. The home screen includes icons of a plurality of applications installed on the mobile phone, or the mobile phone may display an interface displayed before the mobile phone is locked. In a face-based payment scenario, the electronic device 100 may perform S1303 to display a graphical user interface indicating that payment succeeds. For example, as shown in FIG. 3(c), if the user identity verification succeeds, the electronic device 100 may display a payment success interface 304. The payment success interface 304 includes prompt information 305 "Order paid!".

S1304. The electronic device 100 sends second prompt information. The second prompt information is used to prompt that the user identity verification fails.

Figure 3D:
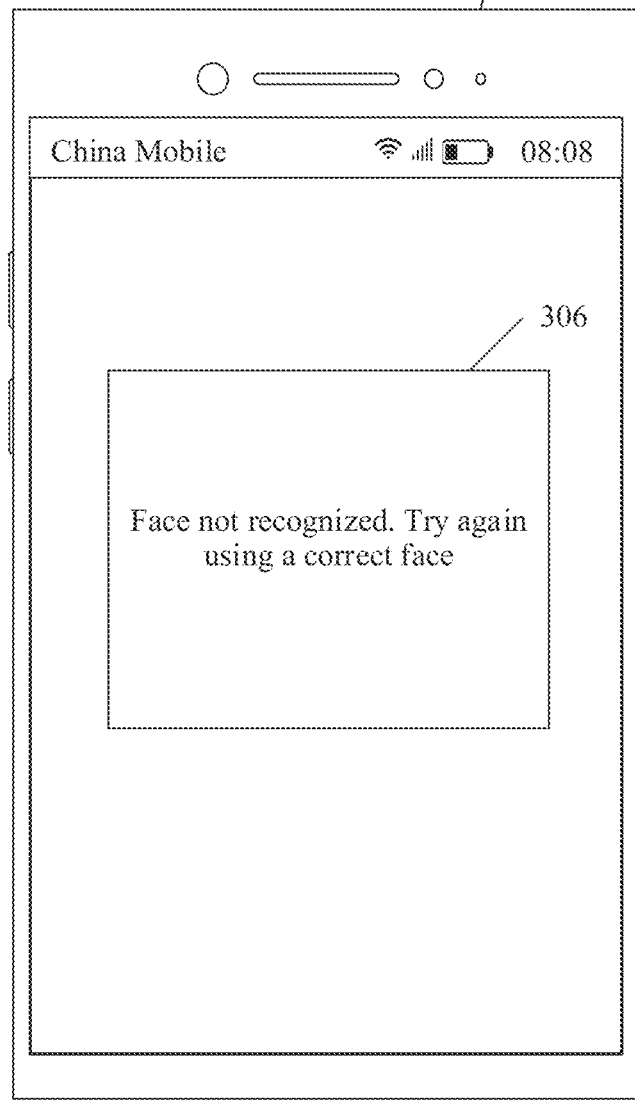

In some embodiments, the second prompt information may be one or more of voice prompt information, text prompt information, and vibration prompt information. For example, as shown in FIG. 3(d), if the user identity verification fails, the electronic device 100 may send the second prompt information 306 "Face not recognized. Try again using a correct face!"

It should be noted that a sequence of performing S1301 and S1302 by the electronic device 100 may be determined by the facial recognition CA in the facial recognition process 205 shown in FIG. 1F. The facial recognition CA in the facial recognition process 205 shown in FIG. 1F may randomly determine the sequence of performing S1301 and S1302 by the electronic device 100. Alternatively, the sequence of performing S1301 and S1302 by the electronic device 100 may be preconfigured in the electronic device 100.

In some other embodiments, the sequence of performing S1301 and S1302 by the electronic device 100 is not limited. For example, the electronic device 100 may first perform S1302. After S1302, if the depth information of the first object does not have the depth feature of the real face, S1304 is to be performed. If the depth information of the first object has the depth feature of the real face, S1301 is to be performed. After S1301, if the first image information matches the original image, S1303 is to be performed. If the first image information does not match the original image, S1304 is to be performed.

For another example, the electronic device 100 may perform S1301 and S1302 at the same time. In this embodiment, if the first image information matches the original image, and the depth information of the first object has the depth feature of the real face, the electronic device 100 may perform S1303. If the first image information does not match the original image, or the depth information of the first object does not have the depth feature of the real face, the electronic device 100 may perform S1304.

According to the facial recognition method provided in this embodiment of this application, when performing the facial recognition, the electronic device 100 not only needs to determine whether a two-dimensional image of an object matches the two-dimensional face image that is stored in the electronic device 100 and that is used to perform the facial recognition, but also needs to determine whether depth information of the object has the depth feature of the real face, that is, determine whether the two-dimensional image of the object is an image of the real face. Depth information of a photo does not have the depth feature of the real face. Therefore, according to the method in the embodiments of this application, user identity verification performed by the electronic device 100 on the photo fails, so that information in the electronic device can be prevented from being leaked, or a property loss caused to the user can be avoided, thereby ensuring information security of the electronic device, and improving security performance of the electronic device.

The first object may be a head model of the second object. The second object is an object photographed by the electronic device 100 when the electronic device 100 records the two-dimensional image (the original image) used to perform the facial recognition. That is, the original image is a two-dimensional image of the second object. Depth information of the head model of the second object is highly similar to depth information of the second object (for example, the real face). Therefore, after the two-dimensional image authentication and the depth anti-counterfeiting authentication, the electronic device 100 may not recognize that the first object is not the real face.

Based on this, in some other embodiments, the facial recognition performed by the electronic device 100 may not only include the two-dimensional image authentication and the depth anti-counterfeiting authentication, but also include infrared anti-counterfeiting authentication. For example, the liveness detection shown in FIG. 1F not only includes the depth anti-counterfeiting authentication, but also includes the infrared anti-counterfeiting authentication.

A principle of the infrared anti-counterfeiting authentication is as follows: There is a great difference between images of the head model and the real face in infrared light. In this embodiment of this application, the infrared anti-counterfeiting authentication may be performed on the first image information based on this feature.

Figure 14:
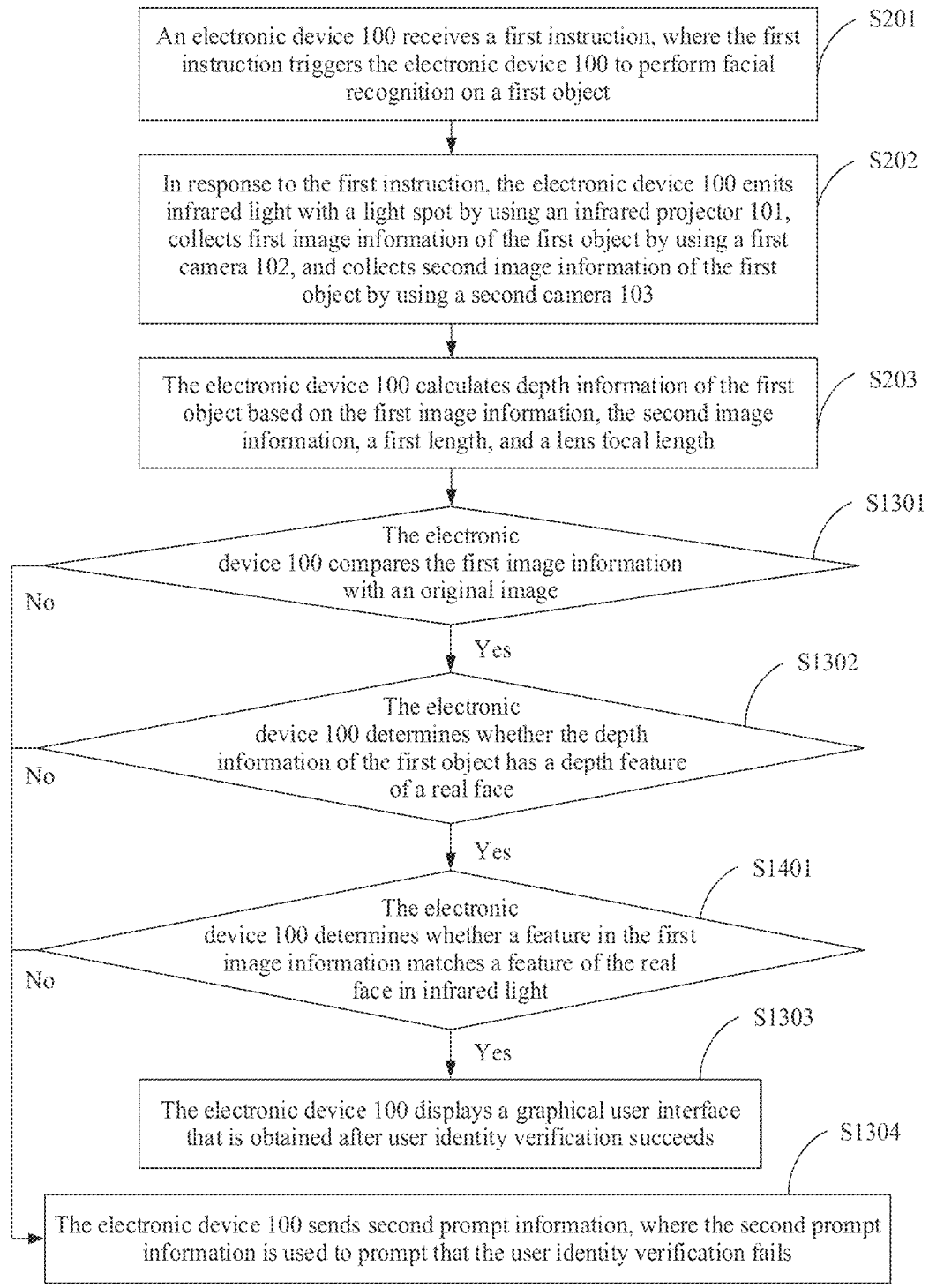
FIG. 14 is a flowchart 4 of a facial recognition method according to an embodiment of this application.

For example, as shown in FIG. 14, after S1302 shown in FIG. 13, the method in this embodiment of this application may further include S1401. After S1401, the method in this embodiment of this application may further include S1303 or S1304.

S1401. The electronic device 100 determines whether the feature in the first image information matches a feature of the real face in infrared light.

If the feature in the first image information matches the feature of the real face in infrared light, it indicates that the first object photographed by the electronic device 100 is the real face instead of the photo including the two-dimensional face image, and the electronic device 100 may determine that the user identity verification succeeds. In this case, the electronic device 100 may perform S1303.

If the feature in the first image information does not match the feature of the real face in infrared light, it indicates that the first object photographed by the electronic device 100 is not the real face. The first object may be a head model. In this case, the electronic device 100 may determine that the user identity verification fails, and the electronic device 100 may perform S1304.

In some embodiments, the facial template in the RPMB 215 is an RGB image collected by a third camera 104 (namely, an RGB camera). In this case, the first image information in S1301 and S1401 may be replaced with an RGB image.

It should be noted that a sequence of performing S1301, S1302, and S1401 by the electronic device 100 may be determined by the facial recognition CA in the facial recognition process 205 shown in FIG. 1F. The facial recognition CA in the facial recognition process 205 shown in FIG. 1F may randomly determine the sequence of performing S1301, S1302, and S1401 by the electronic device 100. Alternatively, the sequence of performing S1301, S1302, and S1401 by the electronic device 100 may be preconfigured in the electronic device 100.

In some other embodiments, the sequence of performing S1301, S1302, and S1401 by the electronic device 100 is not limited. For example, the electronic device 100 may first perform S1302. After S1302, if the depth information of the first object does not have the depth feature of the real face, S1304 is to be performed. If the depth information of the first object has the depth feature of the real face, S1301 is to be performed. After S1301, if the first image information does not match the original image, S1304 is to be performed. If the first image information matches the original image, S1401 is to be performed. After S1401, if the feature in the first image information matches the feature of the real face in infrared light, S1303 is to be performed. If the feature in the first image information does not match the feature of the real face in infrared light, S1304 is to be performed.

For another example, the electronic device 100 may first perform S1401. After S1401, if the feature in the first image information does not match the feature of the real face in infrared light, S1304 is to be performed. If the feature in the first image information matches the feature of the real face in infrared light, S1301 is to be performed. After S1301, if the first image information does not match the original image, S1304 is to be performed. If the first image information matches the original image, S1302 is to be performed. After S1302, if the depth information of the first object has the depth feature of the real face, S1303 is to be performed. If the depth information of the first object does not have the depth feature of the real face, S1304 is to be performed.

In some other embodiments, the electronic device 100 may perform S1301, S1302, and S1401 at the same time. In this embodiment, if the first image information matches the original image, the depth information of the first object has the depth feature of the real face, and the feature in the first image information matches the feature of the real face in infrared light, the electronic device 100 may perform S1303. If the first image information does not match the original image, the depth information of the first object does not have the depth feature of the real face, or the feature in the first image information does not match the feature of the real face in infrared light, the electronic device 100 may perform S1304.

In this embodiment of this application, the electronic device 100 may perform the user identity verification through triple recognition: the two-dimensional image recognition, the depth anti-counterfeiting authentication, and the infrared anti-counterfeiting authentication. According to the method in this embodiment of this application, user identity verification performed by the electronic device on the photo and the head model fails, so that information in the electronic device can be prevented from being leaked, or a property loss caused to the user can be avoided, thereby ensuring information security of the electronic device, and improving security performance of the electronic device.

Figure 15:
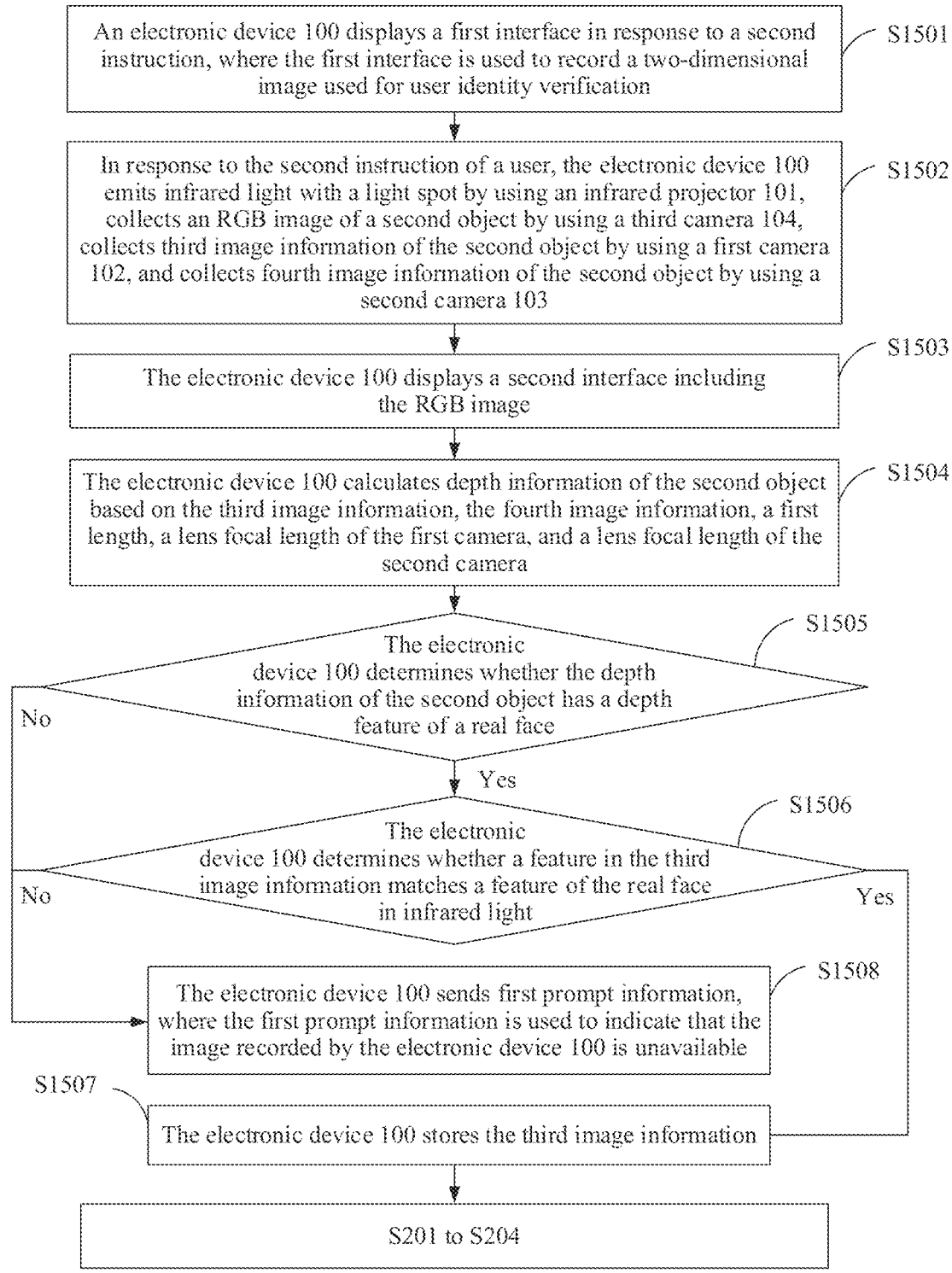
FIG. 15 is a flowchart 5 of a facial recognition method according to an embodiment of this application.

It can be understood that, before performing S201 to S204, the electronic device 100 may record the two-dimensional image (namely, the original image) used to perform the user identity verification. Before S201, the method in this embodiment of this application may further include S1501. For example, as shown in FIG. 15, before S201 to S204, the method in this embodiment of this application may further include S1501.

S1501. The electronic device 100 displays a first interface in response to a second instruction. The first interface is used to record the two-dimensional image used to perform the user identity verification.

In some embodiments, the electronic device 100 may display the first interface when the electronic device 100 is powered on for the first time, to guide the user to record the two-dimensional image used to perform the user identity verification.

Figure 16A:
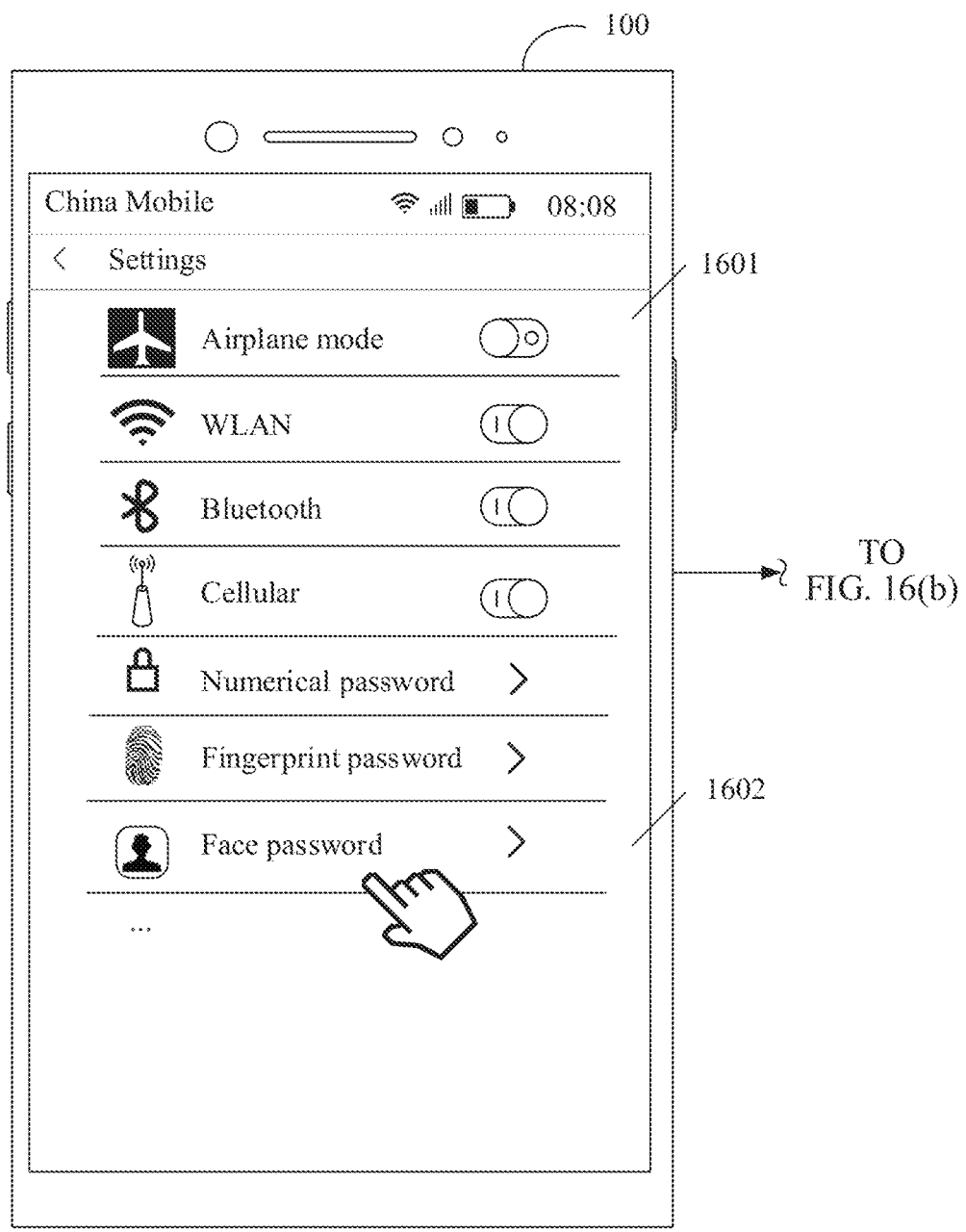
FIG. 16(a) to FIG. 16(c) are a schematic diagram 2 of an example of a graphical user interface according to an embodiment of this application.

In some other embodiments, the electronic device 100 may receive a tap operation performed by the user on a "Settings" application icon, and display a setting interface. The electronic device 100 may receive a tap operation (for example, a single tap operation) performed by the user on a security option in the setting interface. A name of the security option varies with brands and models. For example, the security option may be referred to as a "face password" option, a "facial recognition" option, or the like. For example, as shown in FIG. 16(a), the electronic device 100 may display a setting interface 1601. The setting interface 1601 includes a "face password" option 1602 (namely, the security option). Certainly, the setting interface 1601 may further include an "airplane mode" option, a "Bluetooth" option, a "cellular" option, a "numerical password" option, a "fingerprint password" option, and the like. For functions of these options, refer to descriptions of corresponding options in a setting interface of an electronic device in a conventional technology. Details are not described herein in this embodiment of this application.

Figure 16B:
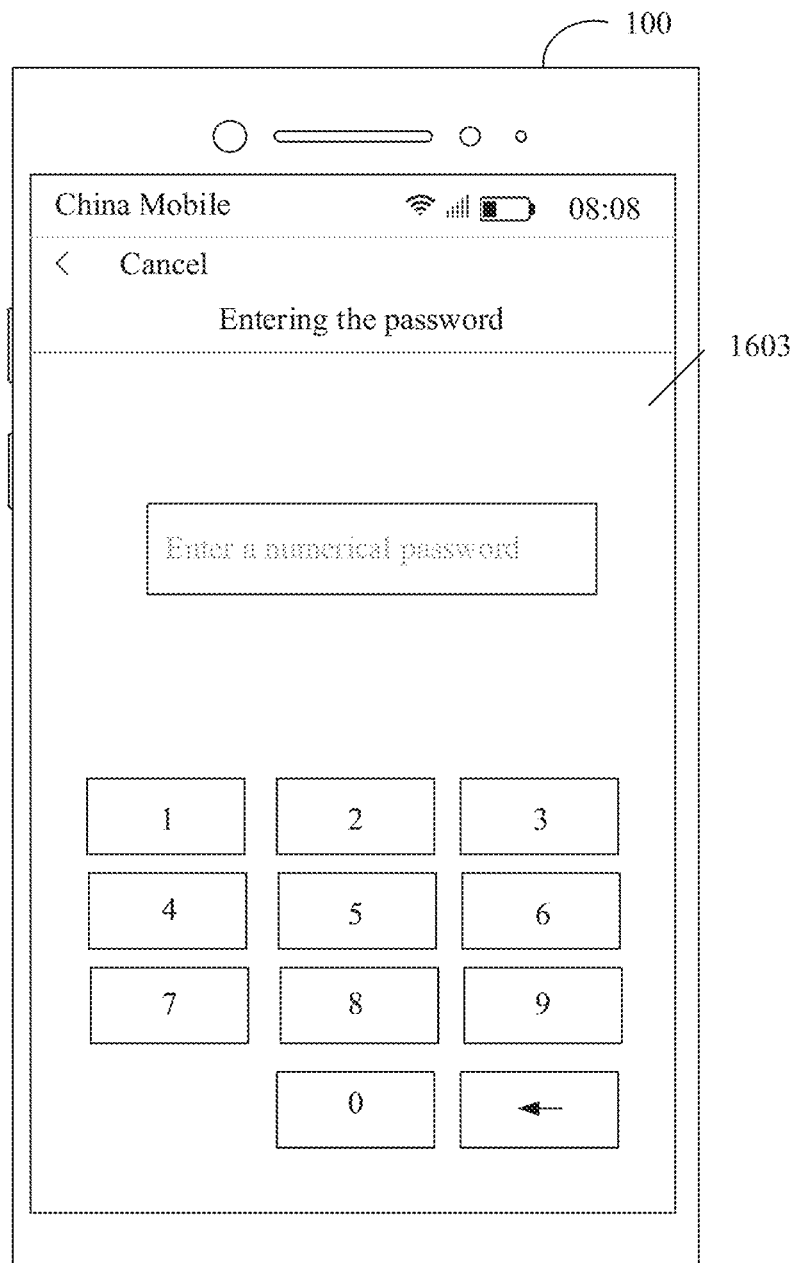
Figure 16C:
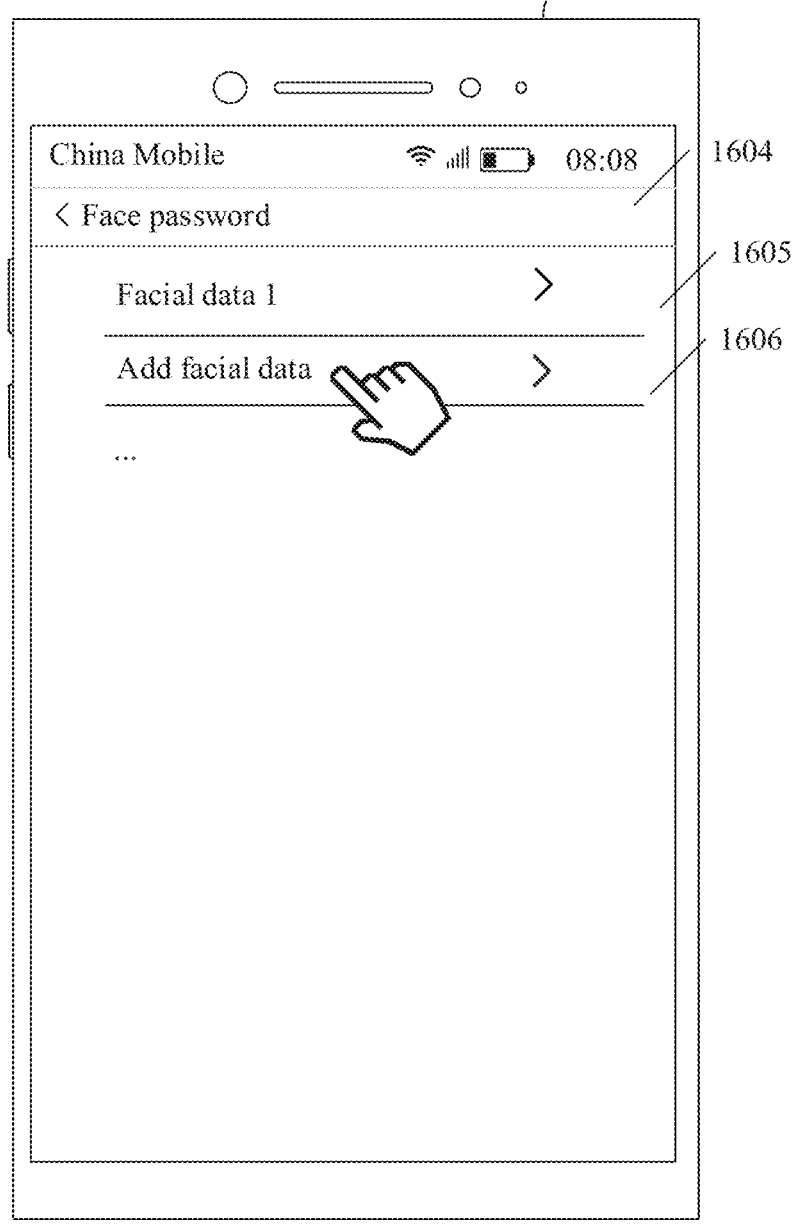

In response to the tap operation (for example, the single tap operation) performed by the user on the security option in the setting interface, the electronic device 100 may display a password entering interface. The password entering interface is used to enter a numerical password (namely, a lock screen password of the electronic device 100). The electronic device 100 can display a face password setting interface only after verification on the numerical password succeeds (namely, the electronic device 100 receives a correct lock screen password). For example, as shown in FIG. 16(b), the electronic device 100 may display a password entering interface 1603. If the electronic device 100 receives a numerical password entered by the user in the password entering interface 1603, and verification on the numerical password succeeds, the electronic device 100 may display a face password setting interface 1604 shown in FIG. 16(c).

Figure 17A:
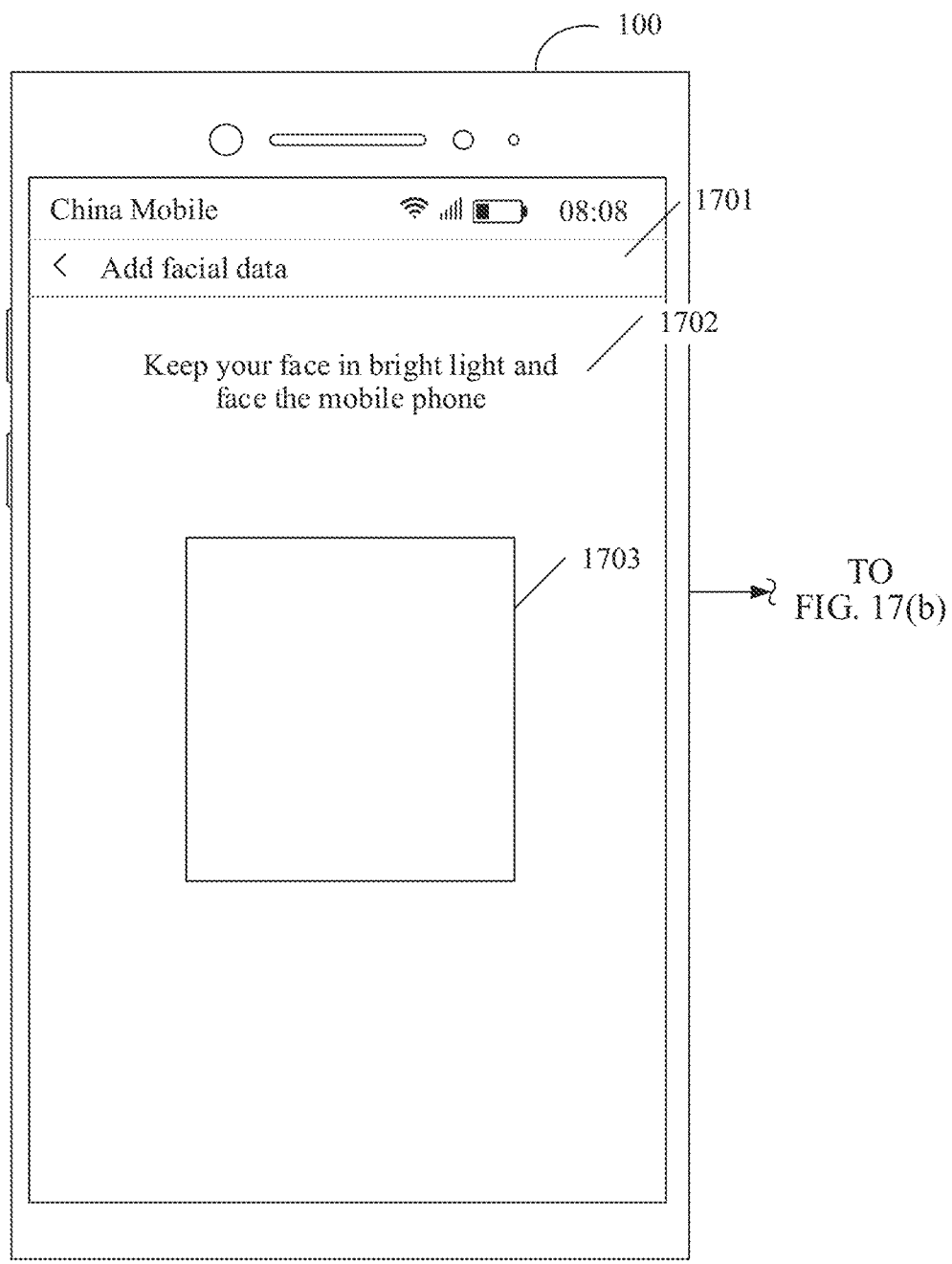
FIG. 17(a) to FIG. 17(c) are a schematic diagram 3 of an example of a graphical user interface according to an embodiment of this application.

The face password setting interface 1604 includes an option 1606 "add facial data". The electronic device 100 may receive a second operation (for example, a single tap operation) performed by the user on the option 1606 "add facial data", and may display a first interface 1701 shown in FIG. 17(a). The first interface 1701 is used to record the two-dimensional image used to perform the user identity verification. If a face password has been set (namely, recorded) in the electronic device 100, the face password setting interface 1604 may further include an option of the recorded face password, for example, an option 1605 "facial data 1".

The first interface 1701 may include a face image display box 1703. The face image display box 1703 is configured to display a face image collected by the third camera 104. The first interface 1701 may further include prompt information that is used to prompt the user to record a face in bright light and prompt the user to pay attention to an angle between the face and the electronic device 100 when the user records the face, for example, "Keep your face in bright light and face the mobile phone." 1702.

It can be understood that, if the electronic device 100 receives the second operation (for example, a single tap operation performed by the user on the option 1606 "add facial data"), it indicates that the user may be willing to record facial data (namely, the two-dimensional face image) used to perform the facial recognition. In other words, the second operation may be used to not only trigger the electronic device 100 to display the first interface, but also trigger the electronic device 100 to execute a second event (for example, start to record facial data). The electronic device 100 needs to execute the second event by using image information (including a two-dimensional image and depth information of the second object) of the second object. Therefore, in response to the second operation, the electronic device 100 may obtain the second instruction, and the second instruction may trigger the electronic device 100 to display the first interface and obtain the two-dimensional image and the depth information of the second object.

In some embodiments, the electronic device 100 includes the first camera 102 and the second camera 103. The first camera 102 and the second camera 103 may sense visible light. The first camera 102 may be used as a primary camera. The electronic device 100 may display, on a display of the electronic device 100, image information collected by the primary camera in visible light. Further, the first camera 102 and the second camera 103 may further sense infrared light, to cooperate with the infrared projector 101 to enable the electronic device 100 to calculate the depth information of the first object. The first camera 102 and the second camera 103 may have a same resolution or different resolutions. For example, the first camera 102 may have a high resolution, for example, 12 megapixels, and the second camera 103 may have a low resolution, for example, 2 megapixels. When the first camera 102 may have a high resolution, the first camera 102 may be directly used to perform photographing. It should be noted that when the two cameras have a same specification (including a same resolution), depth information obtained by using the two cameras is relatively accurate.

However, because the first camera 102 and the second camera 103 can sense infrared light, the image information of the first object that is collected by the electronic device 100 may be slightly red. In this case, the image information that is collected by the primary camera (the first camera 102 or the second camera 103) and that is displayed on the display of the electronic device 100 may be slightly red. This affects visual experience of a user. A slightly red image can be adjusted and corrected to achieve an effect in a normal photographing mode.

To avoid a problem that the image information displayed on the display of the electronic device 100 is slightly red, in some other embodiments, the electronic device 100 may not only include the first camera 102 and the second camera 103, but also include the third camera 104. The third camera 104 is an RGB camera (namely, a common RGB camera). The third camera 104 is configured to collect image information in visible light. The third camera 104 may be disposed between the first camera 102 and the second camera 103, or may be disposed in another location.

In this embodiment, the first camera 102 and the second camera 103 not only can sense visible light, but also can sense infrared light, that is, the first camera 102 and the second camera 103 not only may collect image information in infrared light, but also may be configured to collect image information in visible light. However, the image information collected by the first camera 102 and the second camera 103 is used only to calculate the depth information of the photographed object. The third camera 104 is configured to collect image information in visible light. The image information collected by the third camera 104 is used to be displayed on the display of the electronic device 100. This can avoid a problem that the image information displayed on the display of the electronic device 100 is slightly red, and can ensure visual experience of the user. Specifically, after S1501, the method in this embodiment of this application may include S1502.

S1502. In response to the second instruction of the user, the electronic device 100 emits the infrared light with the light spot by using the infrared projector 101, collects an RGB image of the second object by using the third camera 104, collects third image information of the second object by using the first camera 102, and collects fourth image information of the second object by using the second camera 103.

In response to the second instruction, the electronic device 100 may enable the infrared projector 101, and enable and initialize the first camera 102, the second camera 103, and the third camera 104. After the electronic device 100 enables the infrared projector 101, the infrared projector 101 may emit the infrared light with the light spot. After the electronic device 100 enables and initializes the first camera 102, the second camera 103, and the third camera 104, the first camera 102, the second camera 103, and the third camera 104 may collect the image information of the object (namely, the first object).

In response to the second instruction, the electronic device 100 may further enable an ambient optical sensor 105. The ambient optical sensor 105 may collect luminance of ambient light, and then adjust an AE parameter, an AF parameter, and an AWB parameter of the electronic device based on the luminance of the ambient light. The electronic device 100 may record the AE parameter, the AF parameter, and the AWB parameter as initialization parameters. When performing S202, the electronic device 100 may initialize the first camera 102 and the second camera 103 by using the initialization parameters. If same initialization parameters of the cameras (for example, the first camera 102 and the second camera 103) are used when the cameras collect images twice, facial recognition failures caused by a relatively large difference between the images collected twice due to different initialization parameters can be reduced.

In addition, if the luminance of the ambient light collected by the ambient optical sensor 105 is less than a preset luminance value, the electronic device 100 may send third prompt information. The third prompt information is used to prompt the user to record an image in a bright environment.

The third image information includes a feature of the second object and a texture feature formed when the infrared light with the light spot is irradiated onto the second object. The fourth image information includes the feature of the second object and a texture feature formed when the infrared light with the light spot is irradiated onto the second object.

S1503. The electronic device 100 displays a second interface including the RGB image.

Figure 17B:
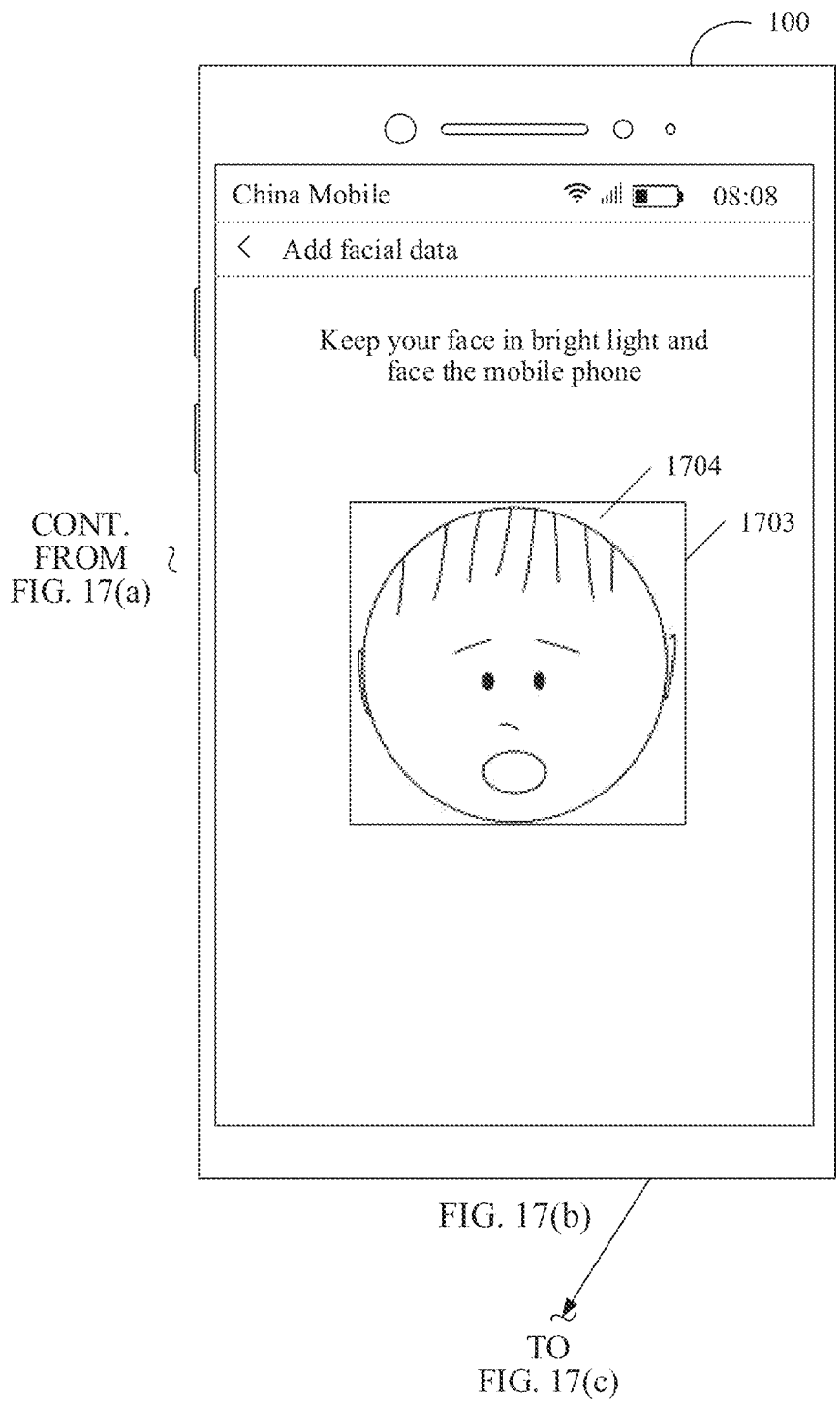

The third camera 104 cannot sense infrared light, and the RGB image is an image collected by the third camera 104. Therefore, the RGB image included in the second interface of the electronic device 104 does not show red, and visual experience of the user is not affected. For example, it is assumed that the image collected by the third camera 104 is a face image 1704 shown in FIG. 17(b). As shown in FIG. 17(b), the electronic device 100 may display the face image 1704 in a face image display box 1703.

It should be noted that, in this embodiment of this application, when recording the two-dimensional face image, the electronic device 100 may prompt the user to move the head in a circle, so as to record facial features of the user from different angles. For example, the electronic device 100 may record facial features of eight orientations including vertical orientation, depression orientations, elevation orientations, and horizontal orientations of a "*" shape that are formed by the frontal face and moving the head in a circle.

S1504. The electronic device 100 calculates the depth information of the second object based on the third image information, the fourth image information, the first length, the lens focal length of the first camera, and the lens focal length of the second camera.

For a method for calculating, by the electronic device 100, the depth information of the second object based on the third image information, the fourth image information, the first length, the lens focal length of the first camera, and the lens focal length of the second camera, refer to the detailed description of S203 in this embodiment of this application. Details are not described herein again in this embodiment of this application.

A sequence of performing S1503 and S1504 by the electronic device 100 is not limited in this embodiment of this application. For example, the electronic device 100 may first perform S1504, and then perform S1503. For example, the electronic device 100 may alternatively first perform S1503, and then perform S1504. For example, the electronic device 100 may alternatively perform S1503 and S1504 at the same time.

S1505. The electronic device 100 determines whether the depth information of the second object has the depth feature of the real face.

For a method for determining, by the electronic device 100, whether the depth information of the second object has the depth feature of the real face, refer to the detailed description of S1302 in this embodiment of this application. Details are not described herein again in this embodiment of this application.

In some embodiments, if the depth information of the second object does not have the depth feature of the real face, the electronic device 100 may determine that the user identity verification fails, and the electronic device 100 may perform S1510. If the depth information of the first object has the depth feature of the real face, the electronic device 100 may determine that the user identity verification succeeds, and the electronic device 100 may perform S1507.

In some other embodiments, before storing the third image information, the electronic device 100 may not only perform depth anti-counterfeiting authentication, but also perform infrared anti-counterfeiting authentication. For example, as shown in FIG. 15, after S1505, if the depth information of the second object does not have the depth feature of the real face, the electronic device 100 may determine that the user identity verification fails, and the electronic device 100 may perform S1510. If the depth information of the first object has the depth feature of the real face, the electronic device 100 may perform S1506.

S1506. The electronic device 100 determines whether the feature in the third image information matches the feature of the real face in infrared light.

For a method for determining, by the electronic device 100, whether the feature in the third image information matches the feature of the real face in infrared light, refer to the detailed description of S1401 in this embodiment of this application. Details are not described herein again in this embodiment of this application.

Specifically, as shown in FIG. 15, if the feature in the third image information matches the feature of the real face in infrared light, the electronic device 100 may perform S1507. If the feature in the third image information does not match the feature of the real face in infrared light, it indicates that the first object photographed by the electronic device 100 is not the real face, and the electronic device 100 may perform S1508.

S1507. The electronic device 100 stores the third image information.

The third image information stored in the electronic device 100 is the original image used to perform the user identity verification.

To improve security performance of the electronic device 100 and protect the original image from being stolen, the electronic device 100 may store the third image information in a TEE of the electronic device. For example, as shown in FIG. 1F, a face model is stored in the TEE. Correspondingly, the electronic device 100 may perform the user identity verification on the first object by using the first image information and the depth information of the first object in the TEE of the electronic device. For example, as shown in FIG. 1F, the ISP 211, the depth calculation module 213, the facial recognition TA 214, and the like have relatively high security requirements, and may run in the TEE.

Figure 17C:
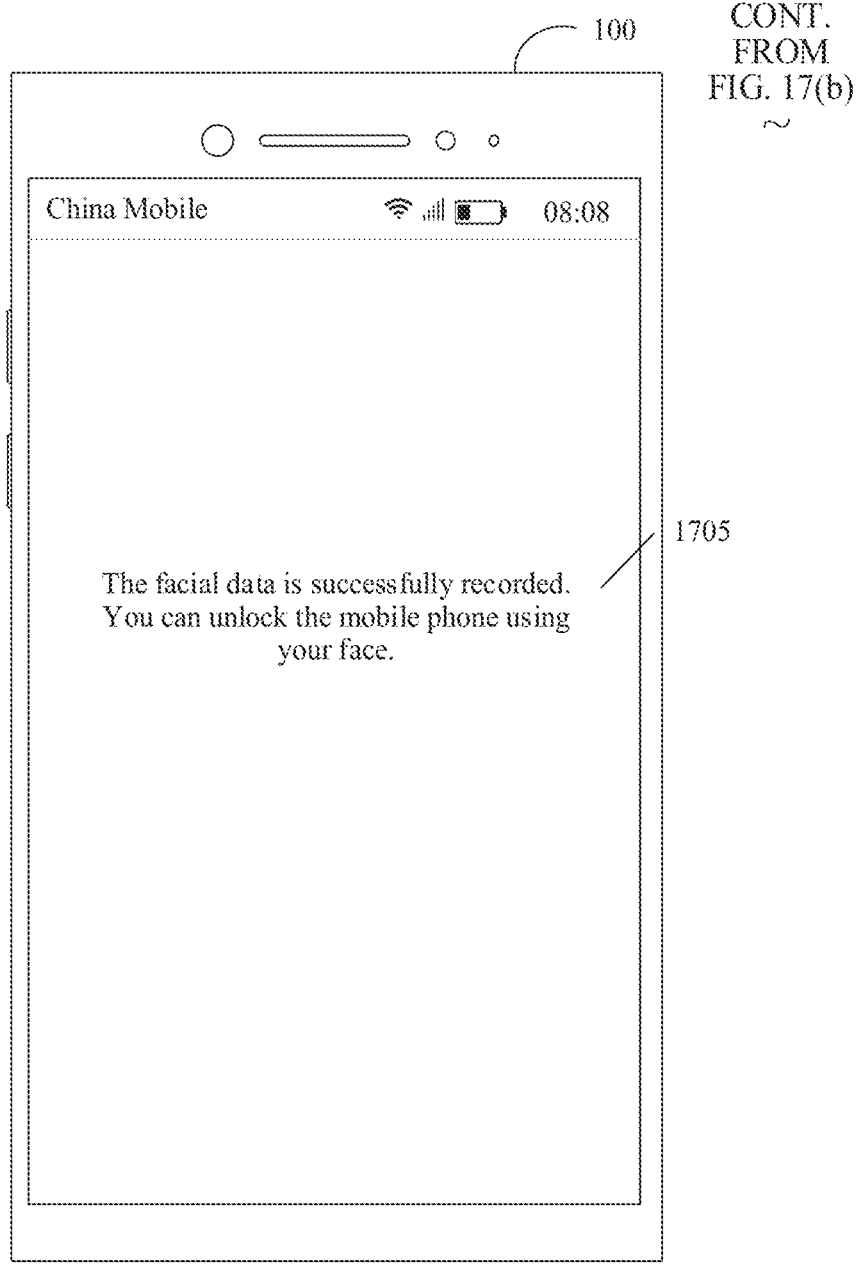

If the depth information of the second object has the depth feature of the real face, and the feature in the third image information matches the feature of the real face in infrared light, the electronic device 100 may display prompt information indicating that facial data is successfully recorded. For example, as shown in FIG. 17(c), the electronic device 100 may display prompt information 1705 "The facial data is successfully entered. You may unlock the mobile phone using the face!"

In some embodiments, the electronic device 100 may perform S1507 to store the RGB image collected by the third camera 104 (namely, the RGB camera). In this case, the RGB image stored in the electronic device 100 is the original image used to perform the user identity verification.

S1508. The electronic device 100 sends first prompt information. The first prompt information is used to indicate that the image recorded by the electronic device 100 is unavailable.

For example, the first prompt information may be one or more of voice prompt information, text prompt information, and vibration prompt information. For example, the electronic device 100 may send first prompt information "The face image is unavailable. Try again!"

It should be noted that a sequence of performing S1505 and S1506 by the electronic device 100 may be determined by the facial recognition CA in the facial recognition process 205 shown in FIG. 1F. The facial recognition CA in the facial recognition process 205 shown in FIG. 1F may randomly determine the sequence of performing S1505 and S1506 by the electronic device 100. Alternatively, the sequence of performing S1505 and S1506 by the electronic device 100 may be preconfigured in the electronic device 100. In some other embodiments, the sequence of performing S1505 and S1506 by the electronic device 100 is not limited.

In the embodiments of this application, when recording the two-dimensional face image used to perform the user identity verification, the electronic device 100 may perform two levels of anti-counterfeiting authentication: the depth anti-counterfeiting authentication and the infrared anti-counterfeiting authentication on the two-dimensional face image. In this way, a possibility that the two-dimensional face image that is stored in the electronic device 100 and that is used to perform the user identity verification is the photo or the two-dimensional face image of the head model can be reduced, thereby ensuring information security of the electronic device, and improving security performance of the electronic device.

In some embodiments, the electronic device 100 may include the RGB camera (namely, the third camera 104) and one dual-pass camera (for example, the first camera 102). In relatively strong light in the daytime, both the RGB camera and the dual-pass camera may collect image information of the first object in visible light. When recognizing a same feature in the two pieces of image information, the electronic device 100 may obtain depth information based on a feature of a target object.

In this embodiment, in relatively weak visible light at night, the electronic device 100 may light up a face through light supplement (for example, enable a flash light or use a screen to supplement light), so that the RGB camera can collect a relatively large quantity of facial features. In addition, the infrared projector 101 emits infrared light, and the dual-pass camera can collect facial features in visible light and infrared light. The electronic device 100 may perform the two-dimensional image authentication based on the image information collected by the RGB camera, perform the depth anti-counterfeiting authentication based on the image information collected by the RGB camera and the image information collected by the dual-pass camera, and perform the infrared anti-counterfeiting authentication based on the image information collected by the dual-pass camera. The terminal may first not enable the infrared projector 101, but first perform the depth anti-counterfeiting authentication based on the image information collected by the RGB camera and the image information collected by the dual-pass camera. After the depth anti-counterfeiting authentication succeeds, the terminal enables the infrared projector 101, and performs the infrared anti-counterfeiting authentication based on the image information collected by the dual-pass camera.

In this embodiment, in relatively weak visible light at night, the image collected by the RGB camera includes a relatively small quantity of features of the first object. Based on this, when learning the depth feature of the real face, the electronic device 100 may learn a depth map obtained through calculation based on image information collected by the RGB camera in bright light and image information collected by the dual-pass camera in dim light (a case in which the infrared projector 101 is enabled in dim light). In this way, in this embodiment, when performing the facial recognition, the electronic device 100 may perform the depth anti-counterfeiting authentication by determining whether depth information obtained through calculation based on the image information collected by the RGB camera and the dual-pass camera has the depth feature of the real face learned by the electronic device 100.

In the foregoing embodiments, the infrared projector 101 may be replaced with an infrared LED lamp. Infrared light emitted by the infrared LED lamp may be infrared light of a same type as the infrared light emitted by the infrared projector 101. The difference is that the infrared LED lamp emits uniform infrared light instead of a light spot. The infrared LED lamp may be enabled or disabled in relatively strong visible light. Even if there is no infrared spot, depth information can be obtained because of the relatively strong light. The infrared LED lamp is enabled in relatively weak visible light or in the dark at night. The two dual-pass cameras collect image information in infrared light, and may further obtain depth information. Because there is no infrared spot, a feature in image information obtained in dim light may be not prominent, and consequently, the depth information is inaccurate. To improve accuracy of the depth information, the flash or the screen may be enabled to supplement light. Therefore, after the infrared projector 101 is replaced with the infrared LED lamp, the depth information can also be obtained all day.

It can be understood that, to implement the foregoing functions, the electronic device includes corresponding hardware structures and/or software modules for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the electronic device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in this embodiment of this application, division into modules is an example, and is merely logical function division. In actual implementation, another division manner may be used.

Figure 18:
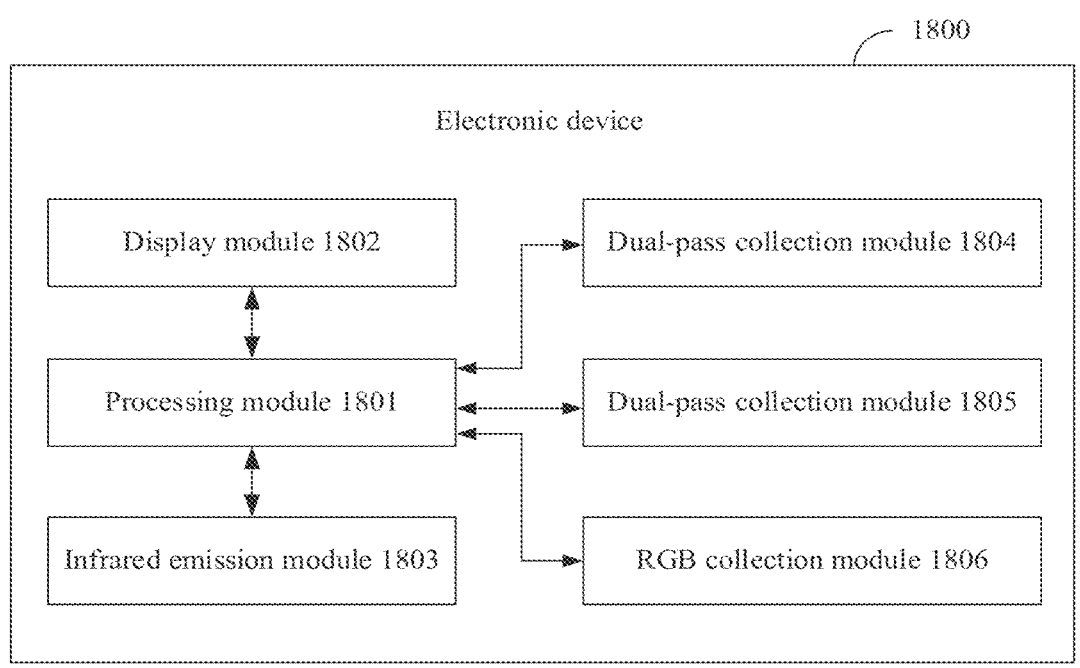
FIG. 18 is a schematic diagram of components of an electronic device according to an embodiment of this application.

When an integrated unit is used, FIG. 18 is a possible schematic structural diagram of an electronic device 1800 in the foregoing embodiments. The electronic device 1800 may include a processing module 1801, a display module 1802, an infrared emission module 1803, a dual-pass collection module 1804, a dual-pass collection module 1805, and an RGB collection module 1806. Optionally, the electronic device 1800 may further include a communications module, and the communications module includes a Bluetooth module, a Wi-Fi module, and the like.

The processing module 1801 is configured to control and manage an action of the electronic device 1800. The RGB collection module 1806 is configured to collect an image of a target object in visible light. The display module 1802 is configured to display an image generated by the processing module 1801 and the image collected by the RGB collection module 1804. The infrared emission module 1803 is configured to emit infrared light with a light spot. The dual-pass collection module 1804 and the dual-pass collection module 1805 are configured to collect an image of the target object in visible light and an image of the target object in infrared light. The communications module is configured to support the electronic device 1800 in communicating with another device. The processing module 1801 is further configured to calculate depth information of the target object based on the image collected by the dual-pass collection module 1804.

Specifically, the processing module 1801 may be configured to support the electronic device 1800 in performing S201, S203, S203*a*, S203*b*, S204, S1301, S1302, S1304, S1401, S1501, S1502, S1504 to S1506 and S1508 in the foregoing method embodiment, and/or another process of the technology described in this specification. In addition, the display module 1802 may be configured to support the electronic device 1800 in performing S1303 and S1503 in the foregoing method embodiment, and/or another process of the technology described in this specification. The infrared emission module 1803 may be configured to support the electronic device 1800 in performing the operation of "emitting infrared light with a light spot" in S202 in the foregoing method embodiment, and/or used in another process of the technology described in this specification. The dual-pass collection module 1804 may be configured to support the electronic device 1800 in performing the operation of "collecting first image information" in S202 in the foregoing method embodiment, and/or another process of the technology described in this specification. The dual-pass collection module 1805 may be configured to support the electronic device 1800 in performing the operation of "collecting second image information" in S202 in the foregoing method embodiment, and/or another process of the technology described in this specification. The RGB collection module 1806 may be configured to support the electronic device 1800 in collecting image information in visible light, and/or used in another process of the technology described in this specification.

Certainly, unit modules in the electronic device 1800 include but are not limited to the processing module 1801, the display module 1802, the infrared emission module 1803, the dual-pass collection module 1804, the RGB collection module 1806, and the like. For example, the electronic device 1800 may further include a storage module. The storage module is configured to store program code and data of the electronic device 1800. For example, the dual-pass collection module 1805 may be configured to support the electronic device 1800 in performing S1507 in the foregoing method embodiment, and/or another process of the technology described in this specification.

The processing module 1801 may be a processor or a controller, for example, may be a central processing unit (Central Processing Unit, CPU), a digital signal processor (Digital Signal Processing, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processor may include an application processor and a baseband processor. The processor may implement or execute various example logical blocks, modules, and circuits described with reference to content disclosed in this application. The processor may alternatively be a combination of processors implementing a computing function, for example, a combination of one or more microprocessors, or a combination of a DSP and a microprocessor. The storage module may be a memory.

For example, the processing module 1801 is one or more processors (for example, the processor 110 shown in FIG. 1F), and the communications module includes a wireless communications module (for example, the wireless communications module 160 shown in FIG. 1F, where the wireless communications module 160 includes a BT (namely, a Bluetooth module) and a WLAN (for example, a Wi-Fi module)). The wireless communications module may be referred to as a communications interface. The storage module may be a memory (the internal memory 121 shown in FIG. 1F). The display module 1802 may be a display (for example, the display 194 shown in FIG. 1F). The infrared emission module 1803 may be an infrared projector (for example, the infrared projector 196 shown in FIG. 1F, namely, the infrared projector 101 in the foregoing embodiment). The dual-pass collection module 1804 and the dual-pass collection module 1805 may be two dual-pass cameras (for example, the dual-pass camera 193B (namely, the first camera 102 in the foregoing embodiment) and the dual-pass camera 193C (namely, the second camera 103 in the foregoing embodiment) shown in FIG. 1F). The RGB collection module 1806 may be an EGB camera in the 1 to N other cameras 193A shown in FIG. 1F, namely, the third camera 104 in the foregoing embodiment. The two dual-pass collection modules 1804 and the RGB collection module 1806 are disposed on a same side of the electronic device 100, for example, a front side or a rear side. The electronic device 1800 provided in this embodiment of this application may be the electronic device 100 shown in FIG. 1F. The one or more processors, the memory, the infrared projector, the first camera, the second camera, the display, the third camera, and the like may be connected, for example, connected through a bus.

An embodiment of this application further provides a computer storage medium. The computer storage medium stores computer program code. When the processor executes the computer program code, the electronic device 1800 performs related method steps in either FIG. 2 or FIG. 9 to implement the method in the foregoing embodiment.

An embodiment of this application further provides a computer program product. When the computer program product is run on a computer, the computer is enabled to perform related method steps in either FIG. 2 or FIG. 9 to implement the method in the foregoing embodiment.

The electronic device 1800, the computer storage medium, or the computer program product provided in the embodiments of this application each are configured to perform the corresponding method provided above. Therefore, for beneficial effects that can be achieved by the electronic device 1200, the computer storage medium, and the computer program product, refer to the beneficial effects in the corresponding method provided above. Details are not described herein again.

The descriptions of the foregoing implementations allow a person skilled in the art to clearly understand that, for the purpose of convenient and brief description, division into the foregoing functional modules is taken as an example for illustration. In an actual application, the foregoing functions may be allocated to different modules for implementation based on a requirement, that is, an inner structure of an apparatus is divided into different functional modules to implement all or some of the functions described above.

In the several embodiments provided in this application, it should be understood that the disclosed apparatuses and methods may be implemented in other manners. For example, the described apparatus embodiments are merely examples. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a ROM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by an electronic device, wherein the method comprises:
   receiving a first instruction of a user, wherein the first instruction triggers the electronic device to perform facial recognition on a first object;
   emitting, by an infrared projector of the electronic device in response to the first instruction, an infrared light with a light spot, wherein the infrared light comprises a plurality of light spots comprising a plurality of speckle lattice groups, wherein one of the speckle lattice groups comprises one or more speckle lattices, and wherein the one or more speckle lattices comprise a speckle array comprising a plurality of speckles;
   collecting, by a first camera of the electronic device in response to the first instruction, first image information of the first object, wherein the first image information comprises a first feature of the first object and a first texture feature formed when the infrared light is irradiated onto the first object;
   collecting, by a second camera of the electronic device in response to the first instruction, second image information of the first object, wherein the second image information comprises a second feature of the first object and a second texture feature formed when the infrared light is irradiated onto the first object;
   calculating first depth information of the first object based on the first image information, the second image information, a first length between the first camera and the second camera, a first lens focal length of the first camera, and a second lens focal length of the second camera; and
   performing a user identity verification on the first object using-based on the first image information and the first depth information; and
   selecting third features from the first image information and the second image information based on a preset feature frequency, wherein the preset feature frequency is greater than or equal to a repetition frequency of the one or more speckle lattices and is represented by a quantity of same third features selected by the electronic device from an image with a preset area, and wherein the repetition frequency is represented by a quantity of same speckle lattices that appear in the preset area.

2. The method of claim 1, further comprising:
   comparing the first image information with an original image, wherein the original image is a two-dimensional image stored in the electronic device used to perform the user identity verification;
   determining whether the first depth information has a depth feature of a real face;
   determining that the user identity verification has succeeded when the first image information matches the original image and when the first depth information has the depth feature; and
   determining that the user identity verification has failed when the first image information does not match the original image or when the first depth information does not have the depth feature.

3. The method of claim 1, further comprising:
   comparing the first image information with an original image, wherein the original image is a two-dimensional image stored in the electronic device and used to perform the user identity verification;
   determining whether the first depth information has a depth feature of a real face;
   determining whether the first feature matches a third feature of the real face in the infrared light; and
   determining that the user identity verification has succeeded when the first image information matches the original image, the first depth information has the depth feature, and the first feature matches the third feature; and
   determining that the user identity verification has failed when the first image information does not match the original image, the first depth information does not have the depth feature, or the first feature does not match the third feature.

4. The method of claim 1, wherein before receiving the first instruction, the method further comprises:
   receiving, from the user, a second instruction;
   displaying, in response to the second instruction, a first interface recording a two-dimensional image to perform the user identity verification;
   emitting, in response to the second instruction and by the infrared projector, the infrared light;
   collecting a red-green-blue (RGB) image of a second object by a third camera of the electronic device;
   collecting, by the first camera, third image information of the second object, wherein the third image information comprises a third feature of the second object and a third texture feature formed when the infrared light is irradiated onto the second object;
   displaying the RGB image in the first interface; and
   storing, in the electronic device, the third image information as an original image to perform the user identity verification.

5. The method of claim 4, further comprising:
   collecting, in response to the second instruction and by the second camera, fourth image information of the second object, wherein the fourth image information comprises the third feature and the third texture feature;
   calculating second depth information of the second object based on the third image information, the fourth image information, the first length, the first lens focal length, and the second lens focal length;
   determining whether the second depth information has a depth feature of a real face; and
   storing, in the electronic device, the third image information when the second depth information has the depth feature.

6. The method of claim 5, further comprising:
   identifying that the second depth information does not have the depth feature; and
   sending, in response to the identifying, first prompt information indicating that the two-dimensional image is unavailable.

7. The method of claim 5, wherein before storing the third image information, the method further comprises:
   determining whether the third feature matches a fourth feature of the real face in the infrared light; and
   storing, in the electronic device, the third image information when the second depth information has the depth feature and the third feature matches the fourth feature.

8. The method of claim 7, further comprising:
   identifying either the second depth information does not have the depth feature or the third feature does not match the fourth feature; and
   sending, in response to the identifying, first prompt information indicating that the two-dimensional image is unavailable.

9. The method of claim 4, further comprising storing the third image information in a trusted execution environment (TEE) of the electronic device.

10. The method of claim 1, further comprising performing the user identity verification on the first object using-based on the first image information and the first depth information in a trusted execution environment (TEE) of the electronic device.

11. The method of claim 1, wherein the first lens focal length and is equal to the second lens focal length.

12. The method of claim 11, further comprising:
calculating a plurality of first parallaxes between the first camera and the second camera for a plurality of features in the first image information and the second image information, wherein the third plurality of features are same features in the first image information and the second image information; and
calculating, for each of the plurality of features, a depth (Z) of a point at which a corresponding feature of the plurality is located according to a formula based on a second parallax for the corresponding feature of the plurality, the first length, and the first and second lens focal length, to obtain the first depth information, wherein the formula is:

$$Z = \frac{f \times T}{d},$$

wherein f is the first and second lens focal length, wherein d is the second parallax, and wherein T is the first length.

13. The method of claim 12, wherein before calculating the plurality of first parallaxes, the method further comprises selecting the plurality of features from the first image information and the second image information based on the preset feature frequency.

14. The method of claim 1, wherein at least two of the speckle lattice groups are different.

15. The method of claim 1, wherein a first speckle lattice group is one of the speckle lattice groups, and wherein at least two of a plurality of speckle lattices in the first speckle lattice group are different.

16. The method of claim 1, wherein a first speckle lattice is one of the one or more speckle lattices, and wherein either all of a plurality of speckles in the first speckle lattice have a same shape or at least two of the speckles in the first speckle lattice have different shapes.

17. The method of claim 1, wherein two sides of each lens of the first camera and the second camera each comprise an antireflection coating, wherein light filters of the first camera and the second camera each comprise a cut-off coating, wherein the antireflection coating increases a transmittance of the infrared light, and wherein the cut-off coating filters out light other than the infrared light and visible light and increases the transmittance.

18. The method of claim 1, wherein the first length ranges between 20 millimeters (mm) and 30 mm.

19. An electronic device, comprising:
an infrared projector;
a first camera;
a second camera, wherein a distance between the first camera and the second camera is a first length;
one or more processors coupled to the infrared projector, the first camera, and the second camera; and
a memory coupled to the one or more processors and configured to store instructions that, when executed by the one or more processors, cause the electronic device to be configured to:
receive a first instruction that triggers the electronic device to perform facial recognition on a first object;
emit, by the infrared projector in response to the first instruction, an infrared light with a light spot, wherein the infrared light comprises a plurality of light spots comprising a plurality of speckle lattice groups, wherein one of the speckle lattice groups comprises one or more speckle lattices, and wherein the one or more speckle lattices comprise a speckle array comprising a plurality of speckles;
collect, by the first camera in response to the first instruction, first image information of the first object, wherein the first image information comprises a first feature of the first object and a first texture feature formed when the infrared light is irradiated onto the first object;
collect, by the second camera in response to the first instruction, second image information of the first object, wherein the second image information comprises a second feature of the first object and a second texture feature formed when the infrared light is irradiated onto the first object;
calculate first depth information of the first object based on the first image information, the second image information, a first length between the first camera and the second camera, a first lens focal length of the first camera, and a second lens focal length of the second camera;
perform a user identity verification on the first object based on the first image information and the first depth information; and
select third features from the first image information and the second image information based on a preset feature frequency, wherein the preset feature frequency is greater than or equal to a repetition frequency of the one or more speckle lattices and is represented by a quantity of same third features selected by the electronic device from an image with a preset area, and wherein the repetition frequency is represented by a quantity of same speckle lattices that appear in the preset area.

20. The electronic device of claim 19, further comprising a third camera, wherein before the first instruction is received, the instructions, when executed by the one or more processors, further cause the electronic device to be configured to:
receive a second instruction;
display, in response to the second instruction, a first interface recording a two-dimensional image to perform the user identity verification;
emit, by the infrared projector in response to the second instruction, the infrared light;
collect a red-green-blue (RGB) image of a second object by the third camera;
collect, by the first camera, third image information of the second object, wherein the third image information comprises a third feature of the second object and a third texture feature formed when the infrared light is irradiated onto the second object;
display the RGB image in the first interface; and store the third image information as an original image to perform the user identity verification.

* * * * *

UNITED STATES PATENT AND TRADEMARK OFFICE
CERTIFICATE OF CORRECTION

PATENT NO. : 12,154,373 B2  
APPLICATION NO. : 17/289666  
DATED : November 26, 2024  
INVENTOR(S) : Guoqiao Chen and Jiangfeng Yuan Page 1 of 1

It is certified that error appears in the above-identified patent and that said Letters Patent is hereby corrected as shown below:

On the Title Page

Item (71) Applicant: "Honor Device Co., Ltd., Guangdong (CN)" should read "Honor Device Co., Ltd., Shenzhen (CN)"

In the Claims

Claim 1, Column 57, Lines 35-36: "object using-based on" should read "object based on"

Claim 10, Column 59, Lines 5-6: "object using-based on" should read "object based on"

Signed and Sealed this  
Thirty-first Day of December, 2024

Derrick Brent  
*Acting Director of the United States Patent and Trademark Office*